US012315418B2

(12) United States Patent
Sakariya et al.

(10) Patent No.: US 12,315,418 B2
(45) **Date of Patent: *May 27, 2025**

(54) DISPLAY PANEL REDUNDANCY SCHEMES

(71) Applicant: Apple Inc., Cupertino, CA (US)

(72) Inventors: Kapil V. Sakariya, Los Altos, CA (US); Tore Nauta, Santa Cruz, CA (US); Hopil Bae, Sunnyvale, CA (US); Henry C. Jen, Los Altos, CA (US); James E. Pedder, Cupertino, CA (US); Sunggu Kang, San Jose, CA (US); Shingo Hatanaka, San Jose, CA (US); Xiang Lu, Campbell, CA (US); Mahdi Farrokh Baroughi, Santa Clara, CA (US); Hasan Akyol, Mountain View, CA (US); Saif Choudhary, San Jose, CA (US); Ion Bita, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,725

(22) Filed: Dec. 15, 2022

(65) Prior Publication Data

US 2023/0222955 A1 Jul. 13, 2023

Related U.S. Application Data

(63) Continuation of application No. 17/338,475, filed on Jun. 3, 2021, now Pat. No. 11,568,789, which is a (Continued)

(51) Int. Cl.
*G09G 3/20* (2006.01)
*G09G 3/32* (2016.01)

(52) U.S. Cl.
CPC ......... *G09G 3/2088* (2013.01); *G09G 3/2014* (2013.01); *G09G 3/32* (2013.01);
(Continued)

(58) Field of Classification Search
CPC ............... G09G 3/2088; G09G 3/2014; G09G 2300/0413; G09G 2300/0426;
(Continued)

(56) References Cited

U.S. PATENT DOCUMENTS 4,851,827 A 7/1989 Nicholas
7,009,440 B2 3/2006 Nogawa et al.
(Continued)

FOREIGN PATENT DOCUMENTS

CN 201251916 Y 6/2009
CN 101587680 A 11/2009
(Continued)

OTHER PUBLICATIONS

PCT International Search Report and Written Opinion for International Application No. PCT/US2016/034878, mailed Aug. 31, 2016, 16 pages.
(Continued)

*Primary Examiner* — Matthew A Eason
*Assistant Examiner* — Sujit Shah
(74) *Attorney, Agent, or Firm* — Aikin & Gallant, LLP

(57) ABSTRACT

Display panel redundancy schemes and methods of operation are described. In an embodiment, and display panel includes an array of drivers (e.g. microdrivers), each of which including multiple portions to independently receive control and pixel bits. In an embodiment, each driver portion is to control a group of redundant emission elements.

14 Claims, 37 Drawing Sheets

Related U.S. Application Data continuation of application No. 16/688,750, filed on Nov. 19, 2019, now Pat. No. 11,056,041, which is a continuation of application No. 15/576,237, filed as application No. PCT/US2016/034878 on May 27, 2016, now Pat. No. 10,535,296.

(60) Provisional application No. 62/173,769, filed on Jun. 10, 2015.

(52) U.S. Cl.
CPC ............... *G09G 2300/0413* (2013.01); *G09G 2300/0426* (2013.01); *G09G 2300/0804* (2013.01); *G09G 2300/0857* (2013.01); *G09G 2310/027* (2013.01); *G09G 2310/0272* (2013.01); *G09G 2310/0291* (2013.01); *G09G 2310/08* (2013.01); *G09G 2330/08* (2013.01)

(58) Field of Classification Search
CPC ..... G09G 2300/0857; G09G 2310/027; G09G 2310/0291; G09G 2310/08; G09G 2330/08
See application file for complete search history.

(56) References Cited

U.S. PATENT DOCUMENTS

| | | | | |
|---|---|---|---|---|
| 8,054,266 | B2 | 11/2011 | Woo et al. | |
| 8,619,008 | B2 | 12/2013 | Cok | |
| 8,786,216 | B2 | 7/2014 | Williams et al. | |
| 10,535,296 | B2 | 1/2020 | Sakariya et al. | |
| 11,056,041 | B2 | 7/2021 | Sakariya et al. | |
| 11,568,789 | B2 * | 1/2023 | Sakariya | G09G 3/32 |
| 2002/0000982 | A1 | 1/2002 | Takagi | |
| 2002/0059302 | A1 | 5/2002 | Ebihara | |
| 2002/0167510 | A1 | 11/2002 | Matsumoto | |
| 2004/0174388 | A1 | 9/2004 | Sempel et al. | |
| 2005/0116656 | A1 | 6/2005 | Shin | |
| 2005/0134614 | A1 | 6/2005 | Tomohara | |
| 2006/0077193 | A1 | 4/2006 | Thielemans et al. | |
| 2006/0256045 | A1 | 11/2006 | Jeon et al. | |
| 2007/0211011 | A1 * | 9/2007 | Lee | G09G 3/2081 345/100 |
| 2007/0222737 | A1 | 9/2007 | Kimura | |
| 2007/0279424 | A1 | 12/2007 | Keeney et al. | |
| 2009/0146131 | A1 | 6/2009 | Happ | |
| 2009/0146931 | A1 | 6/2009 | Kharrati et al. | |
| 2010/0207852 | A1 | 8/2010 | Cok | |
| 2010/0265224 | A1 | 10/2010 | Cok | |
| 2010/0309100 | A1 | 12/2010 | Cok et al. | |
| 2010/0328196 | A1 | 12/2010 | Cok | |
| 2011/0043499 | A1 * | 2/2011 | Cok | H10K 71/70 345/82 |
| 2011/0074799 | A1 | 3/2011 | Wu et al. | |
| 2012/0223875 | A1 * | 9/2012 | Lau | G09G 3/32 345/82 |
| 2012/0228669 | A1 | 9/2012 | Bower et al. | |
| 2013/0120230 | A1 * | 5/2013 | Chen | G02F 1/136259 445/2 |
| 2014/0139498 | A1 | 5/2014 | Hussain et al. | |
| 2014/0168037 | A1 | 6/2014 | Sakariya et al. | |
| 2014/0319486 | A1 | 10/2014 | Hong | |
| 2014/0347401 | A1 | 11/2014 | Hwang et al. | |
| 2015/0015657 | A1 * | 1/2015 | Shikina | G03G 15/04054 347/118 |
| 2015/0103103 | A1 | 4/2015 | Kim et al. | |
| 2015/0138180 | A1 | 5/2015 | Park et al. | |
| 2015/0154933 | A1 * | 6/2015 | Bae | G09G 3/3611 345/618 |
| 2015/0348466 | A1 * | 12/2015 | Park | G09G 3/3233 345/82 |
| 2015/0356928 | A1 | 12/2015 | Xie | |

FOREIGN PATENT DOCUMENTS

| | | | |
|---|---|---|---|
| CN | 203102814 | U | 7/2013 |
| EP | 0838800 | A1 | 4/1998 |
| JP | S60-73580 | A | 4/1985 |
| JP | 07-319427 | A | 12/1995 |
| JP | 08-137413 | A | 5/1996 |
| JP | 2003-022052 | A | 1/2003 |
| JP | 2003-316312 | A | 11/2003 |
| JP | 2004-361794 | A | 12/2004 |
| JP | 2004-537762 | A | 12/2004 |
| JP | 2009003009 | A | 1/2009 |
| JP | 2012-518199 | A | 8/2012 |
| KR | 101201294 | B1 | 11/2012 |
| WO | 97/24706 | A3 | 7/1997 |
| WO | 2010/093850 | A3 | 8/2010 |
| WO | 2012032282 | A1 | 9/2010 |
| WO | 2010/144322 | A1 | 12/2010 |
| WO | 2013070774 | | 5/2013 |

OTHER PUBLICATIONS

Dai, Junli, "High Energy Efficiency LED Lighting Solution", China Electronic Market (Basic Electronics), 09, Sep. 8, 2009, pp. 39-44.

* cited by examiner uDriver control bit loading scheme 1 uDriver control bit loading scheme 2

DISPLAY PANEL REDUNDANCY SCHEMES

RELATED APPLICATIONS

This patent application is a continuation of U.S. application Ser. No. 17/338,475, filed Jun. 3, 2021, which is a continuation of U.S. application Ser. No. 16/688,750, filed Nov. 19, 2019, now U.S. Pat. No. 11,056,041, which is a continuation of U.S. application Ser. No. 15/576,237, filed Nov. 21, 2017, now U.S. Pat. No. 10,535,296, which is a U.S. National Phase Application under 35 U.S.C. § 371 of International Application No. PCT/US2016/034878, filed May 27, 2016, entitled DISPLAY PANEL REDUNDANCY SCHEMES, which claims the benefit of priority of U.S. Provisional Application No. 62/173,769 filed Jun. 10, 2015. International Application No. PCT/US2016/034878 and U.S. Provisional Application No. 62/173,769 are incorporated herein by reference.

BACKGROUND

Field

Embodiments described herein relate to a display system, and more specifically to redundancy schemes and methods for a display panel.

Background Information

Display panels are utilized in a wide range of electronic devices. Common types of display panels include active matrix display panels where each pixel may be driven to display a data frame. High-resolution color display panels, such as computer displays, smart phones, and televisions, may use an active matrix display structure. An active matrix display of m×n display (e.g., pixel) elements may be addressed with m row lines and n column lines or a subset thereof. In conventional active matrix display technologies a switching device and storage device is located at every display element of the display. A display element may be a light emitting diode (LED) or other light emitting material. A storage device(s) (e.g., a capacitor or a data register) may be connected to each display (e.g., pixel) element, for example, to load a data signal therein (e.g., corresponding to the emission to be emitted from that display element). The switches in conventional displays are usually implemented through transistors made of deposited thin films, and thus are called thin film transistors (TFTs). A common semiconductor used for TFT integration is amorphous silicon (a-Si), which allows for large-area fabrication in a low temperature process. A main difference between a-Si TFT and a conventional silicon metal-oxide-semiconductor-field-effect-transistor (MOSFET) is lower electron mobility in a-Si due to the presence of electron traps. Another difference includes a larger threshold voltage shift. Low temperature polysilicon (LTPS) represents an alternative material that is used for TFT integration. LTPS TFTs have a higher mobility than a-Si TFTs, yet mobility is still lower than for MOSFETs.

SUMMARY

A display panel may include an array of drivers (e.g. microdrivers) arranged in rows and columns. In accordance with embodiments described herein the drivers are described and illustrated as driver chips that may be surface mounted on a display substrate of a display panel. In accordance with other embodiments the drivers may represent logic formed within the display substrate, for example, within a monocrystalline silicon substrate. In an embodiment a portion of a display panel includes a first driver arranged in a first row of drivers, and a second driver arranged in a second row of drivers. A plurality of pixels are arranged in a display row between the first and second drivers. In an embodiment, each pixel of the plurality of pixels includes a first group of emission elements (e.g. LEDs) and a redundant group of emission elements (e.g. LEDs). For example, one LED from the first group and one LED from the second group may form a subpixel including a redundant LED. In an embodiment each pixel and subpixel includes a single row of emission elements (e.g. LEDs). In accordance with some embodiments each of the first and second drivers includes a first portion (e.g. slice 1) and a second portion (e.g. slice 0), and the first and second portions are to independently receive (e.g. capture) control bits and pixel bits. In accordance with some embodiments the first portion (slice 1) of the first driver is to drive the first group of LEDs of the plurality of pixels, and the second portion (slice 0) of the second driver is to drive the redundant group of LEDs of the plurality of pixels. The first group of LEDs may include a first LED that is on a first electrode (e.g. anode) line electrically coupled with the first driver, and the second group of LEDs includes a second LED on a second electrode (e.g. anode) line electrically coupled with the second driver. For example, the first and second LEDs may be within a subpixel, or pixel. A common electrode (e.g. cathode) line may be formed on top of and in electrical connection with the first LED and the second LED. In accordance with an embodiment the first portion (slice 1) of the first driver and the second portion (slice 0) of the second driver are to drive the same group of LEDs within the display row. In some embodiments, the first portion (slice 1) of the first driver is to drive a first staggered portion of both the first group of LEDs and the redundant group of LEDs, and the second portion (slice 0) of the second driver is to drive a second staggered portion of both the first group of LEDs and the redundant group of LEDs.

Various routing schemes to and between the drivers are possible in order to support the various redundancy schemes. In an embodiment, the first driver (e.g. top driver above a display row) includes a first data register in its corresponding first portion to store first control bits and first pixel bits from a first data input and a first data clock input. Similarly, the second driver (e.g. bottom driver below the display row) may include a second data register in its corresponding second portion to store second control bits and second pixel bits from a second data input and a second data clock input. In an embodiment, the first data input and the second data input are connected to a first column driver chip (e.g. surface mounted on the display substrate), the first data clock input is connected to a first row driver chip (e.g. surface mounted on the display substrate), and the second data clock input is connected to a second row driver chip (e.g. surface mounted on the display substrate). The first and second row driver chips may be discrete, separate chips. In an embodiment, each of the first and second drivers includes an emission counter reset input to provide an asynchronous reset signal to the emission control logic for the corresponding first and second portions of the corresponding drivers. For example, the emission counter reset input for the first and second drivers may be connected to the first and second row driver chips, respectively. In an embodiment, the display panel includes a plurality of rows of emission clock lines, in which each row of emission clock lines is to control a row of bottom driver second portions (slice 0) and a row of top driver first portions (slice 1) on opposite sides of a display row.

In an embodiment a display panel includes an array of drivers (e.g. microdrivers) arranged in rows and columns and a plurality of emission elements (e.g. LEDs) arranged in a plurality of display rows. Each driver may include a top portion and a bottom portion, where the top portion is to control a display row adjacent the top portion and the bottom portion is to control a display row adjacent the bottom portion. The display panel may additionally include a plurality of rows of emission clock lines. In an embodiment, each row of emission clock lines runs from a single row driver to two rows of drivers. Each emission clock line row is to control a row of bottom driver portions and a row of top driver portions on opposite sides of a display row. Emission clock lines may have a variety of routing paths between the drivers and row drivers. For example, an emission clock routing path may run between top portions of laterally adjacent drivers in a row of drivers, or between bottom portions of laterally adjacent drivers in a row of drivers. Emission clock routing paths may also run between drivers in a pair of rows of drivers that shares the same display row. For example, an emission clock path may run between diagonally located drivers, top to bottom or bottom to top. In an embodiment an emission clock routing path runs between a bottom portion of a first driver in a first row of drivers to a top portion of a second driver in a second row of drivers, where the first row of drivers is above the second row of drivers, and vice versa.

The display panel may additionally include a plurality of rows of data clock lines, and a plurality of rows of emission counter reset lines. In an embodiment, the data clock lines and the emission counter reset lines are to program control bits of adjacent rows of drivers, while the emission clock and emission counter reset lines are to control emission timing. Each data clock line for each corresponding display row may be connected to a bottom portion of a driver above the corresponding display row and a top portion of a driver under the corresponding display row. In an embodiment, each emission counter reset row controls a single row of drivers.

In an embodiment a method of operating a display panel includes selecting a first display row in the display panel with a row selection logic, such as that contained with a row driver, and selecting a number of display columns with column selection logic, such as that contained within one or more column drivers. In an embodiment, selecting the first display row includes sending a first emission clock signal from a row driver to a first row of drivers (e.g. microdrivers) adjacent the first display row, and each driver in the first row of drivers includes a master portion and a spare portion, with each of the master and spare portions including independent logic, for example, to independently receive control bits and pixel bits. In an embodiment a second emission clock signal is sent from the same row driver to a second row of drivers (e.g. microdrivers) adjacent the first display row, and each driver in the second row of drivers includes a master portion and a spare portion, with each of the master and spare portions including independent logic, for example, to independently receive control bits and pixel bits. In an embodiment, the first emission clock signal is sent to master portions in the first row of drivers. In an embodiment, the second emission clock signal is sent to spare portions in the second row of drivers. For example, this may correspond to a default case for operating the display panel in which there are no defective LEDs or drivers.

In an accordance with embodiments, the various redundancy schemes enable different possible control bit loading schemes to the driver portions. In an embodiment, the programming of drivers proceeds one display row at a time. A data clock signal is toggled between a master portion in a first driver in a first row of drivers and a spare portion in a second driver in a second row of drivers. A first emission counter reset signal is asserted to the first driver, and a second emission counter reset signal is asserted to the second driver while asserting the first emission counter reset signal to the first driver.

In an embodiment, the programming of drivers proceeds one portion at a time. A data clock signal is toggled between a master portion in a first driver in a first row of drivers and a spare portion in a second driver in a second row of drivers. A first emission counter reset signal is asserted to the first driver, and a second emission counter reset signal is asserted to the second driver after asserting the first emission counter reset signal to the first driver.

In an embodiment a display panel redundancy scheme includes an array of drivers (e.g. microdrivers) arranged in rows and columns and a plurality of display rows, with each display row being between two rows of drivers. A display row may include a subpixel including a first emission element (e.g. LED) and a redundant emission element. The first emission element may be on a first electrode line to a first driver in a first row of drivers, and the redundant emission element may be on a second electrode line to a second driver in a second row of drivers. The first or second electrode lines may be electrically disconnected from the first and second drivers to support redundancy. For example, the first electrode line is electrically disconnected (e.g. with an antifuse or laser cut) from the first driver, and the second electrode line is electrically connected to the second driver, or vice versa. The first or second electrode lines can also be joined to support redundancy, for example with a joint such as a laser weld. In an embodiment, a joint electrically connects the first electrode line to the second electrode line, or vice versa.

In an embodiment a display panel redundancy scheme includes an array of primary drivers (e.g. primary microdrivers) arranged in columns and primary rows, and a plurality of display rows in which two display rows are arranged between two adjacent primary rows of drivers. In such a configuration, each display row may include a first group of emission elements (e.g. LEDs) on primary electrode lines to be driven by an adjacent row of primary drivers, and a second group of emission elements (e.g. LEDs) on spare electrode lines running to a row of spare driver placement regions. In an embodiment, one or more spare drivers (e.g. spare microdrivers) are located (e.g. surface mounted) in the row of spare driver placement regions.

BRIEF DESCRIPTION OF THE DRAWINGS

Embodiments are illustrated by way of example and not limitation in the Figures of the accompanying drawings.

DETAILED DESCRIPTION

Figure 1A:
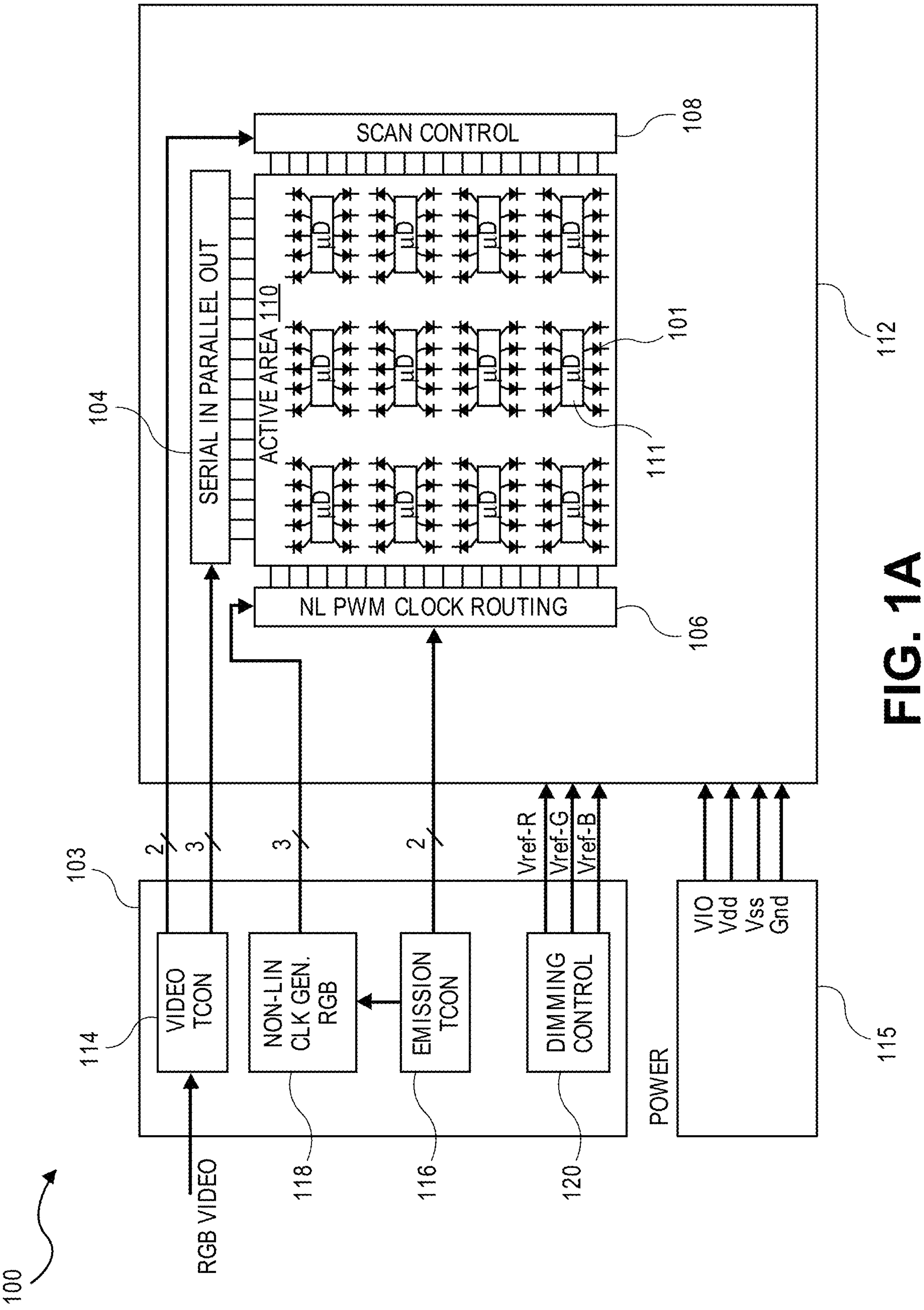
FIG. 1A is a display system with multiple microdrivers in accordance with an embodiment.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In accordance with some embodiments, a display panel is described including an arrangement of drivers (also referred to as microdriver, μD or μDriver) and emission elements. In some embodiments, the microdrivers are microdriver chips. In some embodiments the emission elements are light emitting diodes (LEDs). The LEDs may be micro LEDs (also referred to as μLEDs). Additionally, methods, systems, and apparatuses for controlling an emission of a display panel (e.g., its display elements) are discussed herein. In particular, methods, systems, and apparatuses are described that are particularly applicable to a display panel including an arrangement of microdriver chips and micro LEDs. The term "on" in connection with a device may generally refer to an activated state of the device, and the term "off" used in this connection may refers to a deactivated state of the device. The term "on" used in connection with a signal received by a device may generally refer to a signal that activates the device, and the term "off" used in this connection may generally refer to a signal that deactivates the device. A device may be activated by a high voltage or a low voltage, depending on the underlying principles implementing the device.

In an embodiment, a micro LED may be a semiconductor-based material having a maximum lateral dimension of 1 to 300 μm, 1 to 100 μm, 1 to 20 μm, or more specifically 1 to 10 μm, such as 5 μm. In an embodiment a microdriver may be in the form of a chip, such as a chip that is surface mounted on a display panel. For example, a microdriver chip may have a maximum lateral dimension of 1 to 300 μm, and may fit within the pixel layout of the micro LEDs. In accordance with embodiments, the microdriver chips can replace the switch(s) and storage device(s) for each display element as commonly employed in a TFT architecture. The microdriver chips may include digital unit cells, analog unit cells, or hybrid digital and analog unit cells. Additionally, MOSFET processing techniques may be used for fabrication of the microdriver chips on single crystalline silicon as opposed to TFT processing techniques on a-Si or LTPS.

In one aspect, significant efficiencies may be realized over TFT integration techniques. For example, microdriver chips may utilize less real estate of a display substrate than TFT technology. For example, microdriver chips incorporating a digital unit cell can use a digital storage element (e.g. register) which consumes comparatively less area that an analog storage capacitor. Where the microdriver chips include analog components, MOSFET processing techniques on single crystalline silicon can replace thin film techniques that form larger devices with lower efficiency on a-Si or LTPS. Microdriver chips may additionally require less power than TFTs formed using a-Si or LTPS. It is to be appreciated that while embodiments are described with respect to microdriver chips, that embodiments are not necessarily so limited and that microdrivers may be formed within the display panel substrate using TFT or MOSFET processing techniques to accomplish similar redundancy schemes as described herein.

In one aspect, embodiments describe various redundancy schemes, integration methods, and methods of operating a display panel. For example, the redundancy schemes may include redundant microdrivers, multiple portions (also referred to as slices) within microdrivers, and/or redundant LED arrangements. As used herein, driver (e.g. microdriver) portions or slices are to drive different groups of LEDs adjacent the driver. Each portion or slice may include one or more unit cells. Each portion or slice may independently receive control and pixel bits. While each portion or slice is represented in the figures as a segregated area, this is for illustrational purposes and embodiments are not so limited; areas and circuitry of the portions or slices of each driver may overlap. In one aspect, embodiments describe heterogeneous integration schemes of microdrivers and LEDs on display panel. In another aspect, embodiments describe heterogeneous integration schemes of microdrivers and LEDs, which may both be surface mounted onto a display panel. It is believed that process controls may not always be capable of eliminating defects that may result from heterogeneous integration of multiple, e.g. tens of thousands, micro-sized components onto a display panel. For example, defects may occur during fabrication of the microdriver chips and/or micro LEDs prior to or during transfer and mounting on the display panel, for example through an electrostatic transfer and bonding process. Thus, defects may potentially occur during the initial fabrication processes, resulting in defective devices, or during the transfer and bonding process, resulting in potentially defective devices or defective connections to the display panel. In an exemplary bonding process, the microdriver chips and micro LEDs may be bonded to the display panel using a thermal bumping technique, such as with solder bumping. It is believed that potential defects may possibly result in a reduction of display quality, such as dark spots, bright spots, etc. In accordance with embodiments, the various redundancy schemes may create conditions for absorbing a certain amount of defects, where a redundant element (e.g. microdriver, micro LED, or slice) is capable of compensating for the defect such that the visual effects of the defect during operation of the display panel are eliminated or mitigated.

FIG. 1A is a display system 100 according to one embodiment of the disclosure. Emission controller 103 may receive as an input the content to be displayed on (e.g., all or part of) a display panel 112, e.g., an input signal corresponding to the picture information (e.g., a data frame). Emission controller may include a circuit (e.g., logic) to selectively cause a display element (e.g. LED 101) to emit (e.g., visible to a human eye) light. An emission controller may cause a storage device(s) (e.g., a capacitor or a data register) for (e.g., operating) a display element (e.g., of the plurality of display elements) to receive a data signal (e.g., a signal to turn a display element off or on).

Emission controller 103 may be a field-programmable gate array (FGPA) integrated circuit. Depicted emission controller 103 includes a video timing controller 114, e.g., to provide timing control signals to the display panel 112, a (e.g., non-linear) clock generator 118 which may be controlled by an emission timing controller 116, and a dimming controller 120. Power module 115 may power the components of display system 100. Emission controller 103 may receive an input of a data (e.g., signals) that contains the display (e.g., pixel) data and provide the data (e.g., signals) to cause the display elements (e.g., LEDs) of the active area 110 to emit light according to the display data. In an embodiment, the depicted display panel 112 includes a (e.g., non-linear) pulse width modulation (PWM) clock routing circuit 106, e.g., to route the clock signals to the active area 110. Depicted display panel 112 includes a serial in parallel out circuit 104, e.g., to route the video signals to the active area 110. Depicted display panel 112 includes a scan control circuit 108, e.g., to route the display data signals to the active area 110. One or more display elements (e.g., LED 101) may connect to a microdriver (e.g., μD 111) that drives (e.g., according to the emission controller 103) the emission of light from the one or more display elements.

Display panel 112 may include a matrix of pixels. Each pixel may include multiple subpixels that emit different colors of lights. In a red-green-blue (RGB) subpixel arrangement, each pixel may include three subpixels that emit red light, green light, and blue light, respectively. It is to be appreciated that the RGB arrangement is exemplary and that this disclosure is not so limited. Examples of other subpixel arrangements that can be utilized include, but are not limited to, red-green-blue-yellow (RGBY), red-green-blue-yellow-cyan (RGBYC), or red-green-blue-white (RGBW), or other subpixel matrix schemes where the pixels may have different number of subpixels. In an embodiment, one or more display elements (e.g., LED 101) may connect to a microdriver (e.g., μD 111) that drives (e.g., according to the emission controller 103) the emission of light from the one or more display elements. For example, the microdrivers 111 and display elements 101 may be surface mounted on the display panel 112. Although the depicted microdrivers include ten display elements, the disclosure is not so limited and a microdriver may drive one display element or any plurality of display elements. In an embodiment, display element (e.g., 101) may be a pixel, for example, with each pixel including three display element subpixels (e.g., a red, green, and blue LED).

In one embodiment, a display driver hardware circuit (e.g., a hardware emission controller) may include one or more of: (e.g., row selection) logic to select a number of rows in an emission group of a display panel, in which the number of rows is adjustable from a single row to a full panel of the display panel, (e.g., column selection) logic to select a number of columns in the emission group of the display panel, in which the number of columns is adjustable from a single column to the full panel of the display panel, and (e.g., emission) logic to select a number of pulses per data frame to be displayed, in which the number of pulses per data frame is adjustable from one to a plurality and a pulse length is adjustable from a continuous duty cycle to a non-continuous duty cycle. An emission controller may include hardware, software, firmware, or any combination thereof.

Figure 1B:
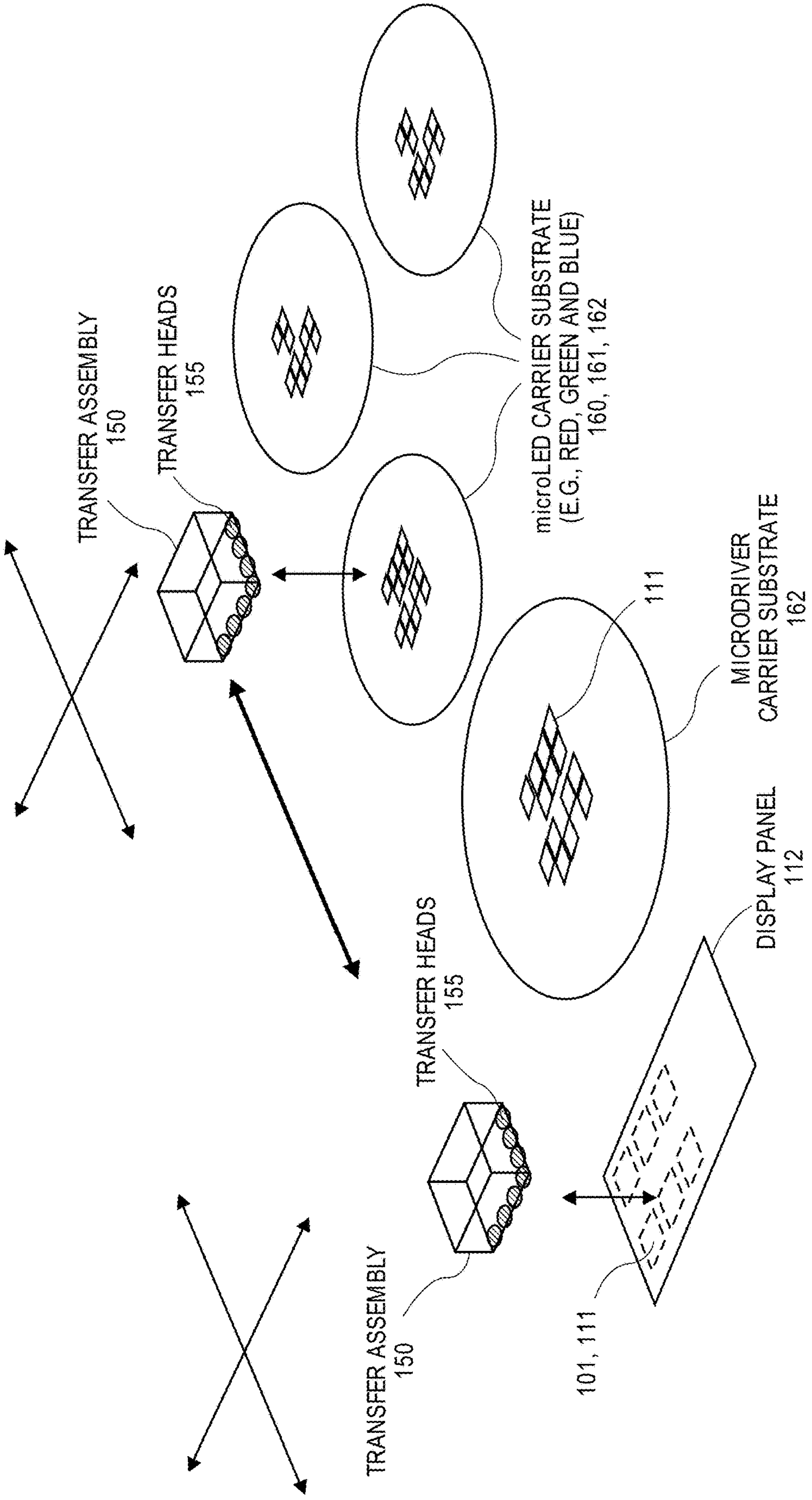
FIG. 1B is an illustration of a process for transferring microdrivers and micro LEDs from carrier substrates to a display panel in accordance with an embodiment.

FIG. 1B is an illustration of a process for transferring microdrivers and micro LEDs from carrier substrates to a display panel in accordance with an embodiment. Separate carrier substrates are used for each micro LED 101 color and for the microdrivers 111. One or more transfer assemblies 150 including an array of electrostatic transfer heads 155 can be used to pick up and transfer microstructures from the carrier substrates (e.g., 160, 161, 162, 163) to the receiving substrate, such as display panel 112. In one embodiment, separate transfer assemblies 150 are used to transfer any combination of micro LED 101 colors and for the microdrivers 111. The display panel is prepared with distribution lines to connect the various the micro LED and microdriver structures. Multiple distribution lines can be coupled to landing pads and an interconnect structure, to electrically couple the micro LEDs and the microdrivers, and to couple the various microdrivers to each other. The receiving substrate can be a display panel 112 of any size ranging from micro displays to large area displays, or can be a lighting substrate, for LED lighting, or for use as an LED backlight for an LCD display. The micro LED and microdriver structures are surface mounted on the same side of the substrate surface.

Bonds (e.g. from surface mounting) can be made using various connections such as, but not limited to, pins, conductive pads, conductive bumps, and conductive balls. Metals, metal alloys, solders, conductive polymers, or conductive oxides can be used as the conductive materials forming the pins, pads, bumps, or balls. In an embodiment, heat and/or pressure can be transferred from the array of transfer heads to facilitate bonding. In an embodiment, conductive contacts on the microdriver and micro LEDs are thermocompression bonded to conductive pads on the substrate. In this manner, the bonds may function as electrical connections to the microdriver chips and micro LEDs. In an embodiment, bonding includes bonding the conductive contacts on the microdriver chips and micro LEDs with the conductive pads on the display panel. For example, the bonds may be intermetallic compounds or alloy bonds of materials such as indium and gold. Other exemplary bonding methods that may be utilized with embodiments of the invention include, but are not limited to, thermal bonding and thermosonic bonding. In an embodiment, the microdriver and micro LEDs are bonded to landing pads in electrical connection with the distribution lines on the substrate to electrically couple one or more micro LEDs, pixels of micro LEDs, to a corresponding microdriver.

Figure 1C:
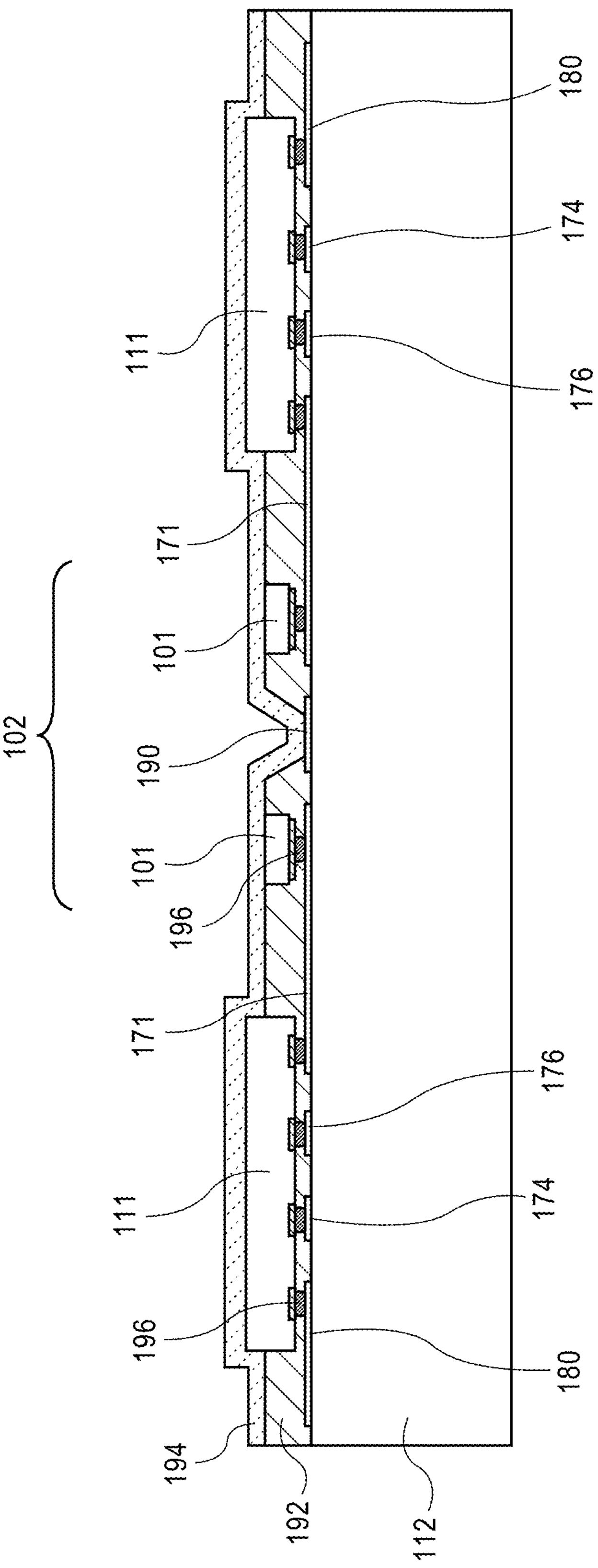
FIG. 1C is a cross-sectional side view illustration of a display panel in accordance with an embodiment.

FIG. 1C is a cross-sectional side view illustration of a display panel in accordance with an embodiment. The particular configuration illustrates a microdriver and LED redundancy scheme consistent with embodiments described herein. As shown, a pair of redundant LEDs 101 are bonded to a pair of electrode (e.g. anode) lines 171. For example, a plurality of bonds 196 may be used to bond each microdriver 111 to a conductive pad on the display substrate 112. Each bond 196 may correspond to an input/output of the microdriver 111. In an embodiment, one or more bonds 196 may be used to bond each LED 101 to a conductive pad on the display substrate 112. For example, the conductive pad may be a part of an electrode line to operate the LED 101. Each electrode line 171 may be electrically connected to a microdriver 111 to control the respective LED 101. In an embodiment, the pair of LEDs 101 are formed within a display row 102. One or both of the LEDs 101 may be used during operation of the display. In an embodiment, one LED 101 is a primary LED while the other LED is a spare LED such that only one of the LEDs is used during operation of the display panel. The LEDs 101 may optionally be passivated and/or additionally secured on the display substrate 112 with a passivation layer 192. One or more top electrode (e.g. cathode) layer 194 may be formed over and in electrical contact with the LEDs 101 and an electrode (e.g. cathode, ground, $V_{ss}$) line 190. The pair of LEDs 101 illustrated in FIG. 1C may correspond to a redundant pair of LEDs within a subpixel in a display row 102. In an embodiment, each LED 101 is on a separate electrode (e.g. anode) line 171, which may be controlled by a separate microdriver 111, and a single top electrode (e.g. cathode) line or layer 194 is formed over and in electrical contact with both LEDs 101 within the subpixel. Separate top electrode line or layers 194 may also be used. Each microdriver 111 may have a plurality of input/output pads or pins. By way of example, the pads or pins may used for connection with electrode (e.g. anode) lines 171, emission clock signal lines 180, data clock signal lines 174, and emission counter reset signal lines 176, amongst others. Accordingly, the specific input/output connections illustrated in FIG. 1C is intended to be exemplary and not limiting.

Figure 2:
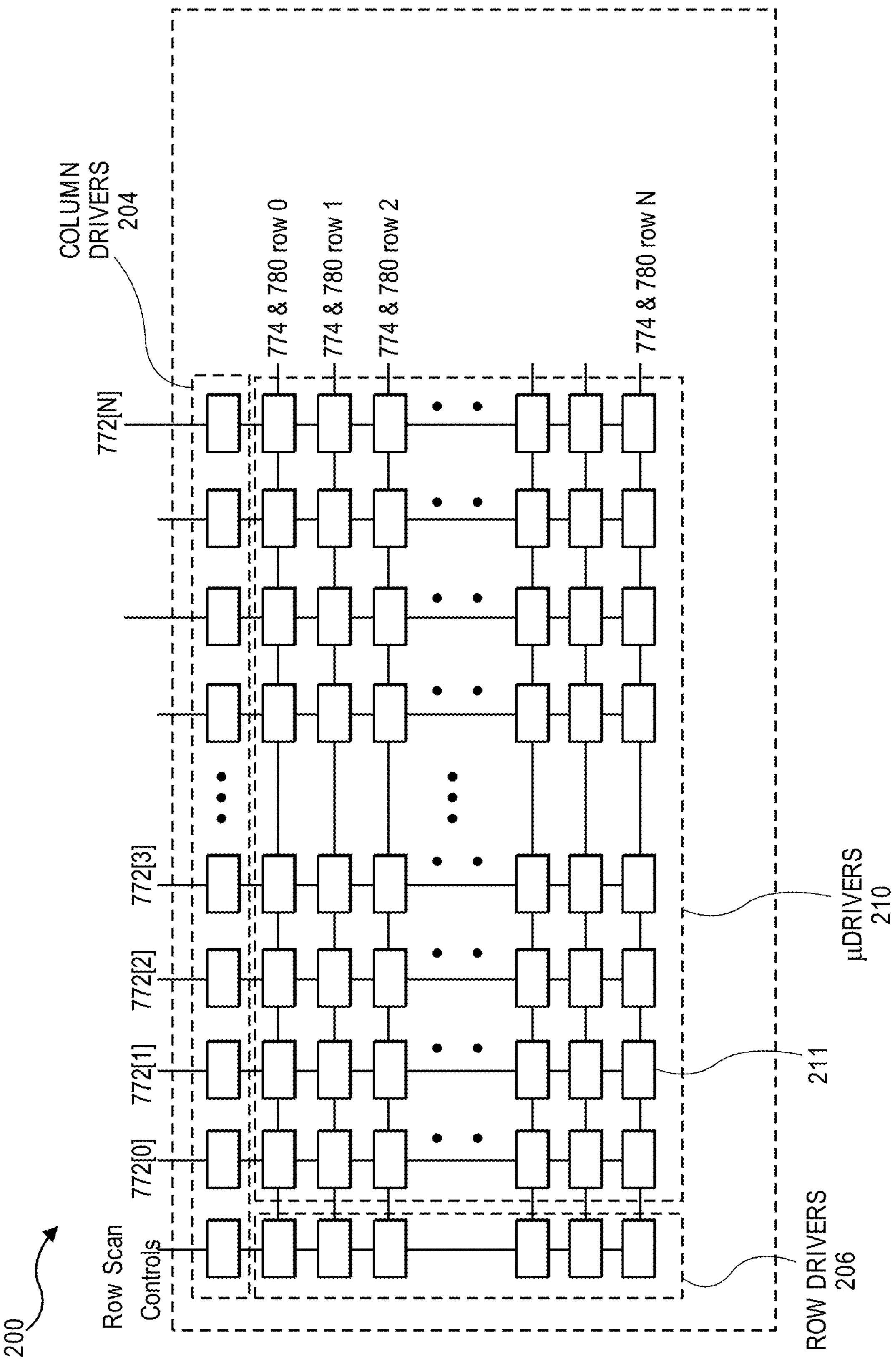
FIG. 2 is a block diagram of a display system in accordance with an embodiment.

Referring now to FIG. 2, a block diagram is provided of a display system 200 according to one embodiment. Active (e.g., display) area 210 includes multiple drivers (e.g., microdriver 211 as an example). A microdriver may selectively illuminate its corresponding display element(s) (e.g., LED(s)). Display system 200 may (e.g., via an emission controller, not shown) include column driver(s) 204 (e.g. including column selection logic) and/or row driver(s) 206 (e.g. including column selection logic). Column drivers 204 may include individual drivers for each column. Row drivers 206 may include individual drivers for each row. In one embodiment, column driver(s): provide electrostatic discharge (ESD) protection for the interface signals, e.g., that are exposed to the external world, provide buffering for the incoming data 772 (e.g., 772[column number]) and row scan controls (e.g., data clock 774 and emission (gray scale) clock 780); provide emission column selection signals to turn on and off a column or columns selectively; and/or perform analog muxing for emission current read-out. Each column driver may control one microdriver column (e.g., which may be equivalent to four display element (e.g. pixel) columns).

In one embodiment, row driver(s) (e.g., placed along the left or right edge of the active area 210): provide ESD protection for row routings during display element (e.g., LED) transfer process; for example, based on incoming row scan controls, generate a data clock 774 signal for each display row, e.g., which may be used as the latching clock of incoming data 772 in each microdriver; and/or for example, based on incoming row scan controls, generate an emission clock 780 signal (e.g. gray scale clock signal) for each display row, e.g., which may be used for emission control in each microdriver. In an embodiment, each row driver 206 may control one display row.

In one embodiment, microdriver(s): latch the (e.g., pixel) values on the data 772 routing, for example, coming from column drivers; and/or use the data clock 774 signal, which may come from the row drivers, to count the number of emission (e.g., gray scale) clock 780 pulses (e.g., emission clock cycles) up to the received pixel value for each sub-pixel, for example, to control each display element's (e.g., LED's) luminance as a function of gray code (e.g., by a pulse width modulation method, amplitude modulation method, or hybrid thereof).

Figure 3:
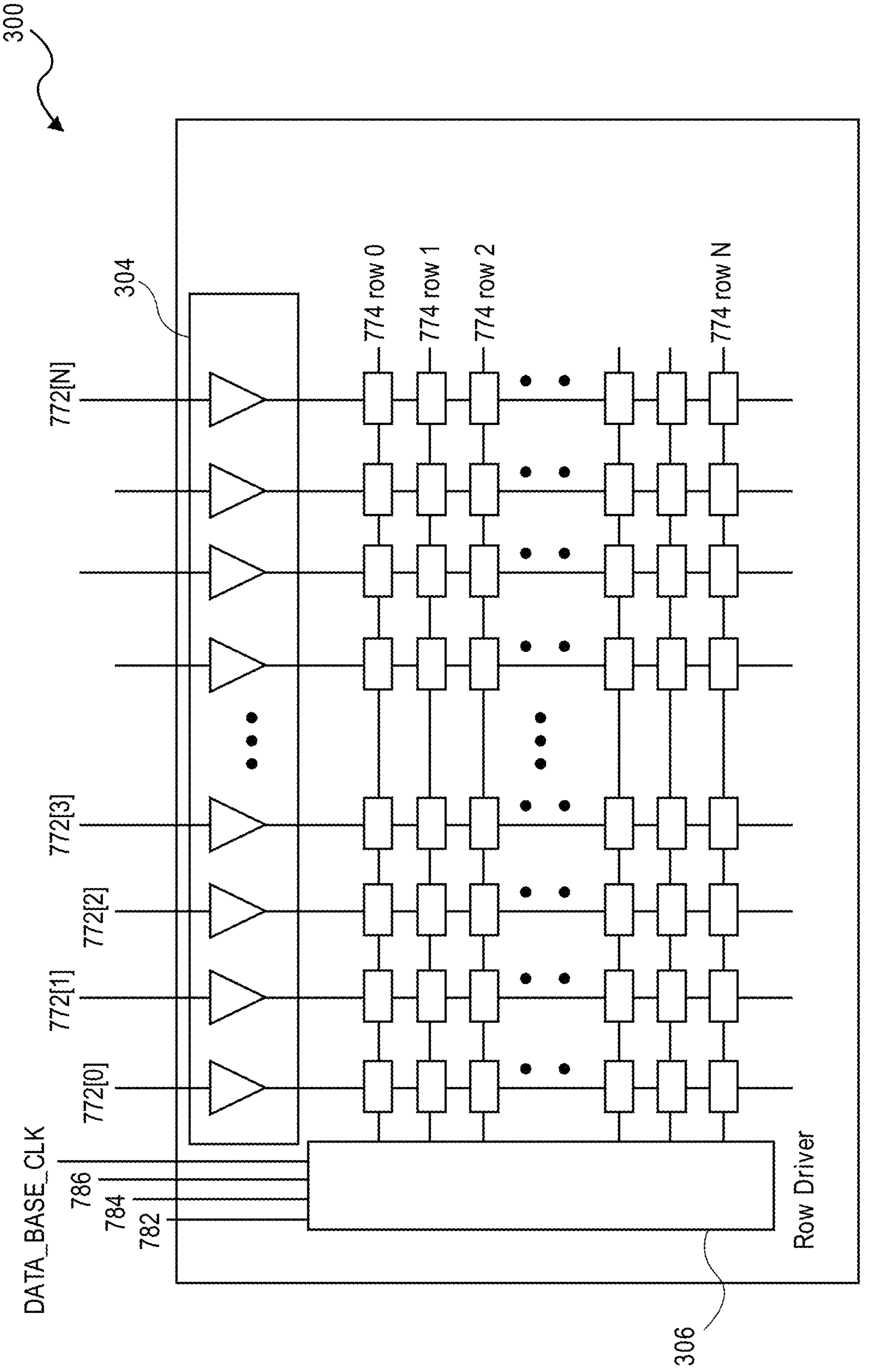
FIG. 3 is a diagram of pixel data distribution in accordance with an embodiment.

FIG. 3 is a diagram of pixel data distribution 300 according to one embodiment of the disclosure. Data scan may be based on the raster scan by using the vertical data 772 signals (e.g., generated by the emission controller and/or buffered by the column drivers 304) and the horizontal data clock 774 signals (e.g., generated by the row drivers 306 using the scan control signals from the emission controller). Data 772 signals may contain the (e.g., pixel) data signals for the microdrivers (e.g., generated by the emission controller and/or buffered by column drivers). Each column driver may provide data for one column of microdrivers, which may correspond to multiple (e.g., 4) columns of display elements (e.g., pixels). Row drivers 306 may generate the data clock 774 for each display row, and each microdriver may use the incoming data clock 774 to latch the incoming data 772 from the column drivers 304. Row drivers together may form a shift register to generate the data clocks 774. The data clock shift register may be composed of a 1st stage shift register, a 2nd stage latch, and a 3rd stage clock gating array. The 1st stage may be controlled by the scan shift clock 782 signal (e.g., from row scan shift register clock) and scan start 784 signal (e.g., row scan start). Panel clock 786 signal (e.g., from row scan latch clock) may be used to load the contents of the 1st stage to the 2nd stage latch.

Figure 4:
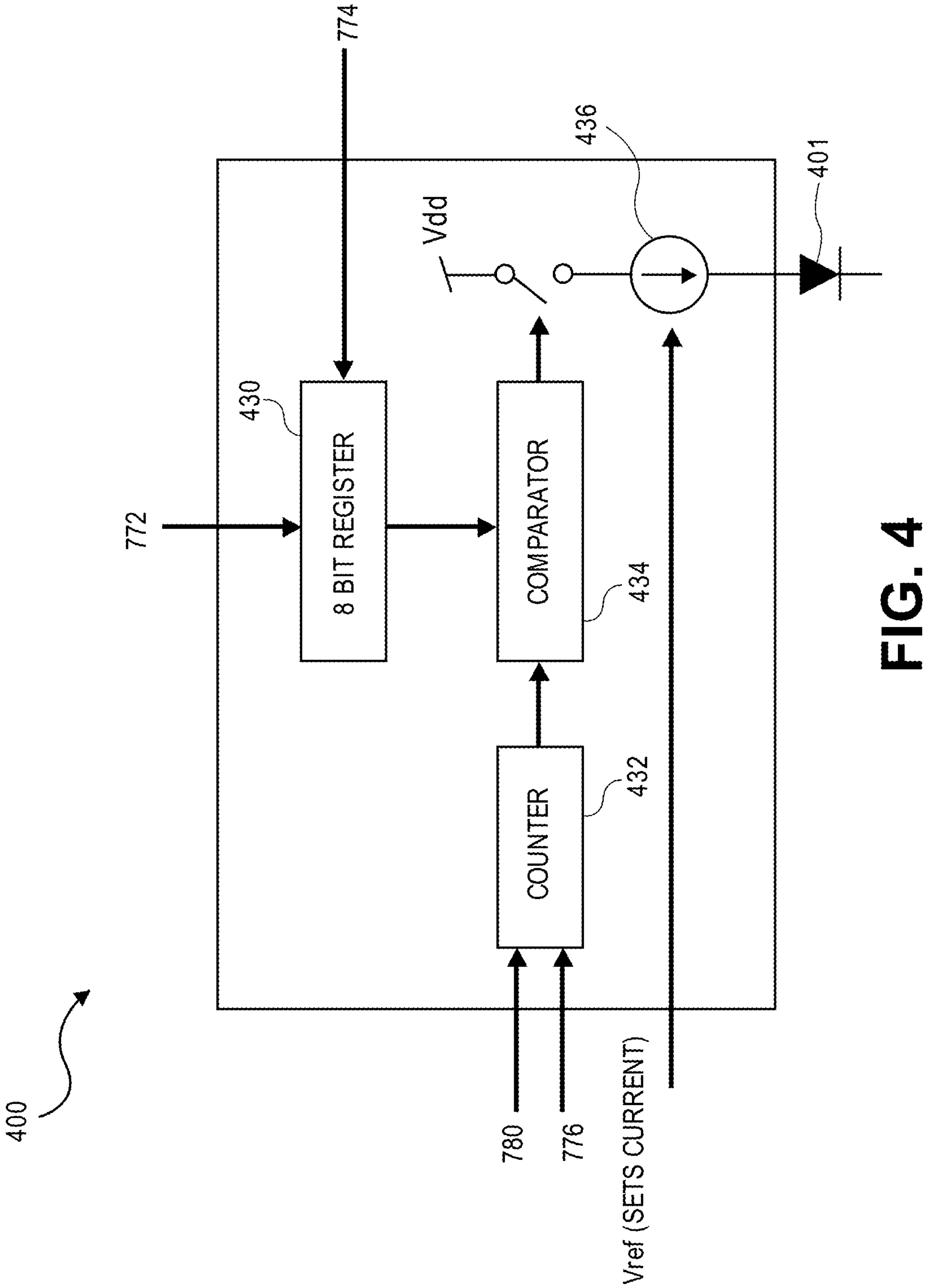
FIG. 4 is a unit cell of a microdriver in accordance with an embodiment.
Figure 5:
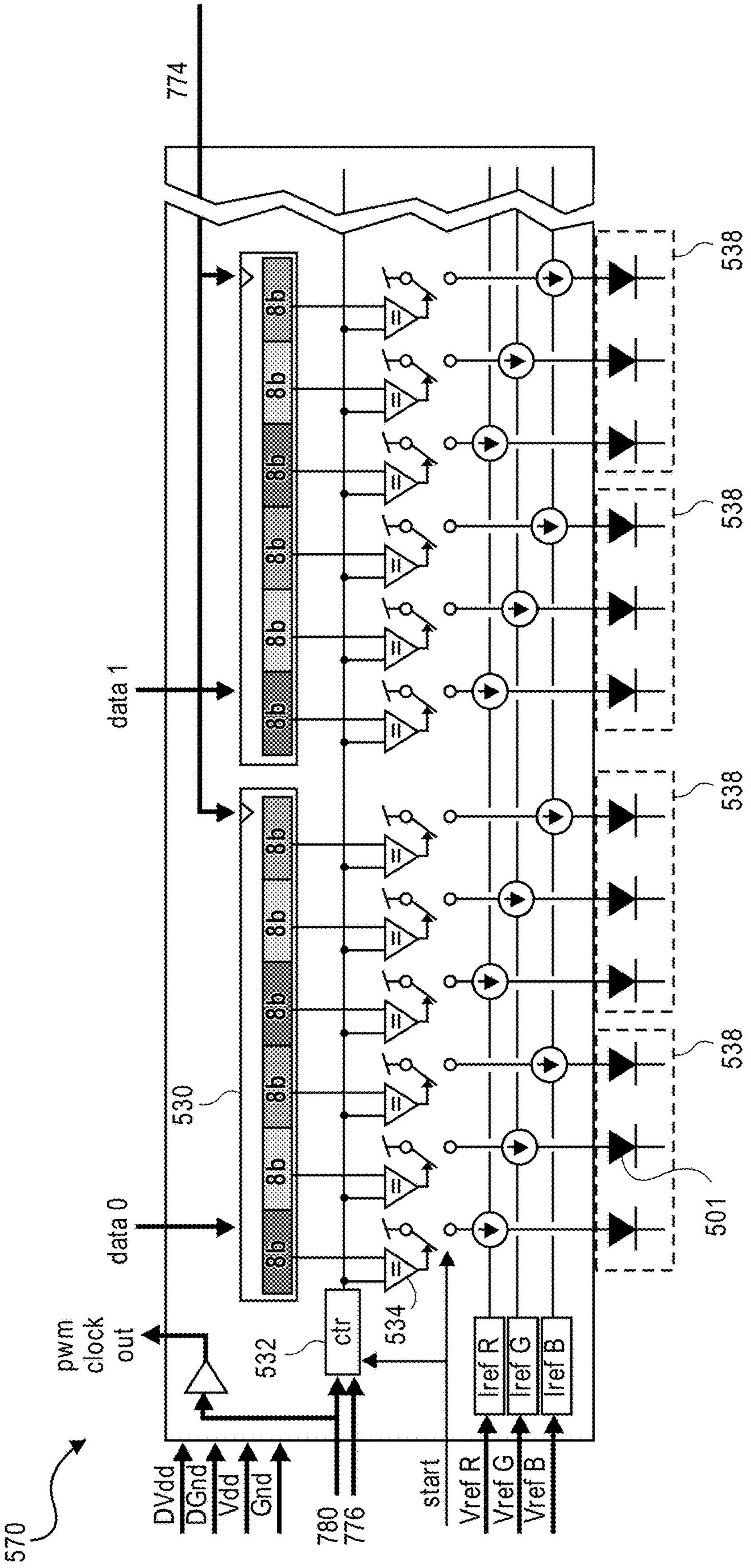
FIG. 5 is a microdriver slice in accordance with an embodiment.

FIG. 4 is a unit cell 400 of a microdriver according to one embodiment of the disclosure. FIG. 5 is a microdriver slice 570 according to one embodiment of the disclosure. In the following discussion, microdriver slice 570 may be included in any of the microdrivers described herein, (e.g. 111, 211, etc.). Likewise, any of the microdrivers described herein may include multiple slices 570. For example, many of the embodiments described below describe microdrivers that include two microdriver slices (e.g. 570). Each microdriver slice 570 may include one or more unit cells (e.g., 400). A microdriver slice 570 may include one or more components of unit cells (e.g., 400). Depicted unit cell 400 includes a register 430 (e.g., digital data storage device) to store a data 772 signal corresponding to the emission to-be-output from the display element (e.g., LED 401). Data stored in a register 430 may be referred to as digital data, e.g., in contrast to analog data stored in a capacitor. Data (e.g., video) signal may be loaded (e.g., stored) into the register by any method, for example, by being clocked in according to a data clock 774. In one embodiment, the data clock 774 signal being active (e.g., goes high) allows data to enter the register and then the data is latched into the register when the data clock signal is inactive (e.g., goes low). An emission clock 780 signal (e.g., non-linear gray scale signal) may increment a counter 432. In an embodiment, an emission counter reset 776 signal may reset the counter 432 to its original value (e.g., zero).

Unit cell 400 also includes a comparator 434. Comparator may compare a data signal from the register 430 to a number of pulses from an emission clock counted by counter 432 to cause an emission by display element (e.g., LED 401), e.g., when the data signal differs from (e.g., or is greater or less than) the number of pulses from the emission clock (e.g. non-linear gray scale). Depicted comparator may cause a switch to activate a current source 436 to cause the display element (e.g., LED 401) to illuminate accordingly. A current source (e.g., adjusted via an input, such as, but not limited to a reference voltage (Vref)) may provide current to operate a display element (e.g., LED) at its optimum current, e.g., for efficiency. A current source may have its current set by a control signal, such as a bias voltage setting the current, use of a (e.g., Vth) compensation pixel circuit, or adjusting a resistor of a constant current operational amplifier (opamp) to control the output of the opamp's current.

FIG. 5 is a microdriver slice 570 according to one embodiment of the disclosure. Microdriver slice 570 may be included as a part of a microdriver in a display system. Microdriver slice 570 includes multiple of certain components of a unit cell 400. Although a single counter 532 is depicted, each display element or each group of (e.g., same or similar colored) display elements may have its own counter (e.g., and its own emission clock). Other components may function as in the description of FIG. 4. In an embodiment, each display element or each group has its own comparator 534. Emission controller may provide the (e.g., input) signals in FIG. 5. Display data (e.g., data 0 and data 1 in FIG. 5) may be provided by emission controller, e.g., as sourced from video or other visual content. Each current source for a display element(s) or a group of (e.g., same or similar colored) display elements may receive a control signal (e.g., from emission controller) and output a constant current when on. The current of a current source may be set during manufacture (e.g., once) or it may be dynamically adjustable (e.g., during use of the display system). Each pixel (e.g., 538) including multiple LEDs 501 of different color emissions may have its own microdriver slice 570. Alternatively, a microdriver slice 570 may control a plurality of pixels 538 as illustrated. Register 530 may be a vector register, e.g., such that each element of vector stores the data signal for its particular display element.

Figure 6:
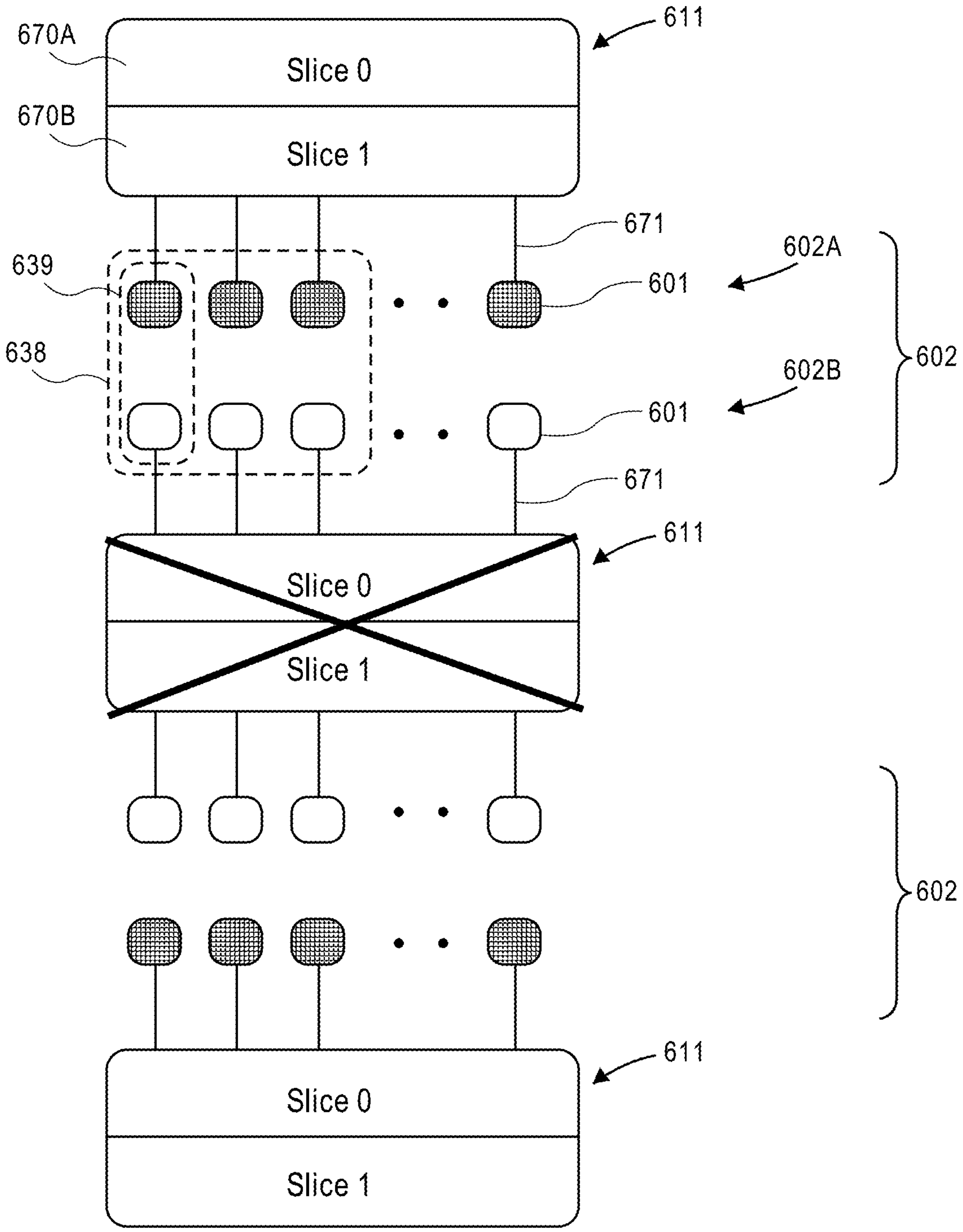
FIG. 6 is diagram of redundant LEDs operated separately by different microdrivers in accordance with an embodiment.
Figure 7:
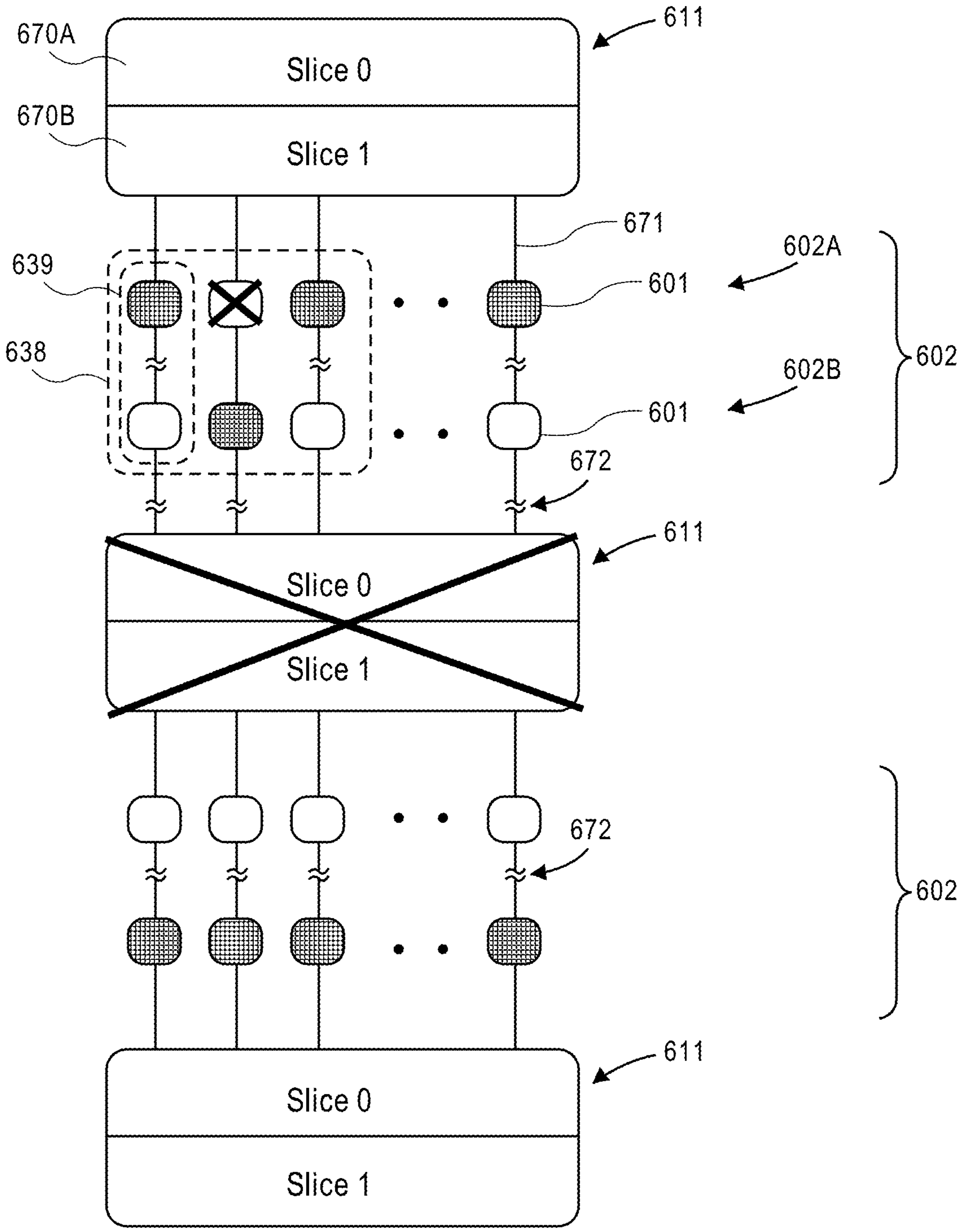
FIG. 7 is a diagram of redundant LEDs in parallel, and connected to two microdrivers in accordance with an embodiment.
Figure 8:
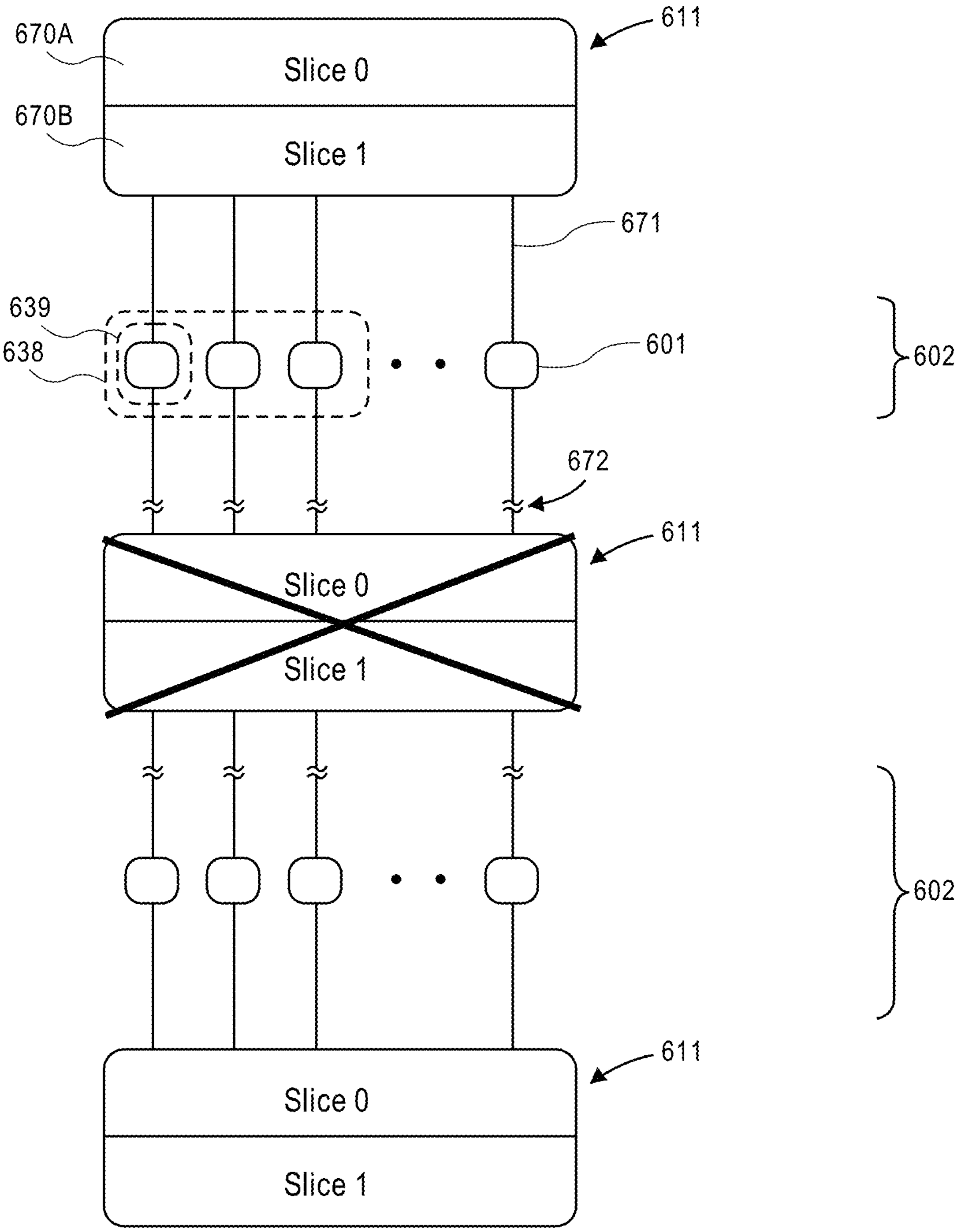
FIG. 8 is a diagram of a microdriver disconnected from adjacent LEDs in accordance with an embodiment.

Referring now to FIGS. 6-8 various redundancy schemes are illustrated in which each microdriver includes multiple slices. In one aspect, microdriver redundancy can be achieved by forming multiple slices within a microdriver. Thus, in accordance with embodiments overall yield of the display panel may be achieved despite some level of microdriver or LED defects.

A display panel may include an array of microdrivers 611 arranged in rows and columns. In accordance with embodiments described herein the microdrivers 611 are described and illustrated as microdriver chips (e.g. surface mounted onto a display substrate of the display panel). In accordance with other embodiments the microdrivers 611 may represent logic formed within the display substrate, for example, within a monocrystalline silicon substrate. In an embodiment, a portion of a display panel includes a first microdriver 611 arranged in a first row of microdrivers, and a second microdriver 611 arranged in a second row of microdrivers. A plurality of pixels 638 are arranged in a display row 602 between the first and second microdrivers 611. In embodiments illustrated in FIGS. 6-8 each pixel 638 of the plurality of pixels includes a first group 602A of emission elements (e.g. LEDs) and a redundant group 602B of emission elements (e.g. LEDs). For example, one LED from the first group 602A and one LED from the second group 602B may form a subpixel 639 including a redundant LED. In an embodiment illustrated in FIG. 6C each pixel 638 and subpixel 639 includes a single row of emission elements (e.g. LEDs). In accordance with some embodiments illustrated in each of FIGS. 6-8, each of the first and second microdrivers includes a first slice 670B (slice 1) and a second slice 670A (slice 0), and the first and second slices are to independently receive (e.g. capture) control bits and pixel bits. In accordance with embodiments illustrated in FIGS. 6-8, the first slice 670B (slice 1) of the first microdriver is to drive the first group 602A of LEDs of the plurality of pixels, and the second slice 670A (slice 0) of the second microdriver is to drive the redundant group 602B of LEDs of the plurality of pixels 638. The first group of LEDs may include a first LED that is on a first electrode (e.g. anode) line 671 electrically coupled with the first microdriver, and the second group of LEDs includes a second LED on a second electrode (e.g. anode) line 671 electrically coupled with the second microdriver. For example, the first and second LEDs may be within a subpixel 639, or pixel 638. A common electrode (e.g. cathode) line 194 may be formed on top of and in electrical connection with the first LED and the second LED as described above with regard to FIG. 1C. In accordance with an embodiment illustrated in FIG. 8 the first slice 670B (slice 1) of the first microdriver is to and the second slice 670A (slice 0) of the second microdriver are to drive the same group of LEDs within the display row 602.

FIG. 6 is diagram of an emission row including redundant rows of LEDs operated separately by different microdrivers in accordance with an embodiment. As illustrated, each microdriver 611 includes multiple slices 670A (slice 0), 670B (slice 1). Each slice 670A, 670B may include components as described above with regard to microdriver slice 570, and may include multiple unit cells 400. A plurality of pixels 638 are arranged in a display row 602 between the adjacent columns of microdrivers 611. Each display row 602 may include a first group 602A of LEDs 601 and a second (redundant) group 602B of LEDs 601. Together, a pair of LEDs from the first and second groups forms a subpixel 639.

Each slice 670A, 670B may independently receive control and data pixel bits, where slice 670A (slice 0) is to drive the first group 602B of LEDs in an adjacent display row 602 and slice 670B of an adjacent microdriver 611 in the same column of microdrivers is to driver the second (redundant) group 602A of LEDs in the adjacent display row 602. In an embodiment, separate electrode (e.g. anode) lines 671 connect the LEDs 601 in group 602A to a corresponding slice 670B, and separate electrode lines 671 connect the LEDs 601 in group 602B to a corresponding slice 670A. Thus, electrode lines 671 to the redundant LEDs within a subpixel 639 are separate. In accordance with embodiments a common cathode line may be formed over both LEDs 601 within a subpixel 639, or over all LEDs 601 within a pixel 638 or pixels similarly as described with regard to FIG. 1C. In an alternative embodiment, electrode lines 671 may be cathode lines rather than anode lines.

In an embodiment, if a microdriver 611 is defective then the defective microdriver 611 may be disabled, and the microdriver slices above and below the defective microdriver 611 take over operation of pixels in the affected display rows 602, for example, as discussed with regard to FIGS. 10-11. In the particular embodiment illustrated in FIG. 6, the center microdriver 611 is illustrated as defective (crossed-out), and the LEDs operated are shown as non-emissive (white), while redundant LEDs within the shared pixels and subpixels are illustrated as emissive (black) and operated by adjacent slices in the adjacent microdrivers 611 within the same column of microdrivers. While the scheme illustrated in FIG. 6 is described with a defective microdriver 611, the scheme is also applicable for a defective LED 601, in which an entire slice 670A, 670B associated with the defective LED is disabled such that a corresponding group of redundant LEDs operated by an adjacent microdriver slice can take over. In this aspect, such a redundancy scheme assumes that where either a microdriver slice or corresponding LED is defective, that the adjacent microdriver slice and corresponding LEDs are operable in order to compensate for the defect.

Referring now to FIG. 7, a diagram shows redundant LEDs in parallel, and connected to two microdrivers in accordance with an embodiment. A difference of the embodiment illustrated in FIG. 7 from that illustrated in FIG. 6 is a common electrode (e.g. anode) line 671 for each subpixel 639 extends between two adjacent microdrivers 611 in a column of microdrivers. In such a configuration, locations along the common electrode lines 671 may be disconnected, such as with an antifuse or laser cut 672. In accordance with embodiments a common cathode line may be formed over both LEDs 601 within a subpixel 639, or over all LEDs 601 within a pixel 638 or pixels similarly as described with regard to FIG. 1C. In an embodiment, where a microdriver 611 or associated LED 601 is defective, at most one row (602A or/and 602B) of LEDs is disconnected from the defective microdriver 611 (illustrated as crossed-out) and the adjacent microdriver slices above and below the defective microdriver 611 are enabled to control the affected display rows 602. Location of the antifuse or laser cut 672 may depend on whether one or both of the LEDs 601 are operational or also defective (illustrated as crossed-out).

FIG. 8 is a diagram of one row of LEDs connected to two microdrivers in accordance with an embodiment. A difference of the embodiment illustrated in FIG. 8 from that illustrated in FIG. 7 is a single LED 601 is located within each subpixel 639 between adjacent microdrivers 611 in a column of microdrivers. In such an embodiment, where a microdriver 611 is defective, then the electrode lines 671 may be disconnected, such as with an antifuse or laser cut 672, and adjacent microdriver slices above and below the defective microdriver 611 are enabled.

In order to support the various redundancy schemes described herein, such as those described and illustrated with regard to FIGS. 6-8, various routing schemes to and between the microdrivers are possible. In an embodiment, the first microdriver 611 (e.g. top microdriver) includes a first data register 430, 530 (see FIGS. 4-5) in its corresponding first slice 670B (slice 1) to store first control bits and first pixel bits from a first data 772 input and a first data clock 774 input. Similarly, the second microdriver 611 (e.g. bottom microdriver) may include a second data register 430, 530 in its corresponding second slice 670A (slice 0) to store second control bits and second pixel bits from a second data 772 input and a second data clock 774 input. In an embodiment, the first data 772 input and the second data 772 input are connected to a first column driver chip 204 (e.g. surface mounted on the display substrate, see also FIG. 2), the first data clock 774 input is connected to a first row driver chip 206 (e.g. surface mounted on the display substrate, see also FIG. 2), and the second data clock 774 input is connected to a second row driver chip 206 (e.g. surface mounted on the display substrate, see also FIG. 2). The first and second row driver chips 206 may be discrete, separate chips. In an embodiment, each of the first and second microdrivers 611 includes an emission counter reset 776 input to provide an asynchronous reset signal to the emission control logic for the corresponding first and second slices of the corresponding microdrivers. For example, the emission counter reset 776 input for the first and second microdrivers 611 may be connected to the first and second row driver chips 206, respectively. In an embodiment, the display panel includes a plurality of rows of emission clock lines 180, in which each emission clock 780 row (corresponding to a row of emission clock lines 180) is to control a row of bottom microdriver 611 second slices 670B (slice 0) and a row of top microdriver 611 first slices 670A (slice 1) on opposite sides of a display row 702. Each of the emission clock lines 180 from each emission clock 780 row may be connected to a row driver chip 206. For example, the emission clock lines 180 from a first emission clock 780 row may be connected to the first row driver chip 206, while the emission clock lines 180 from a second emission clock 780 row may be connected to a second row driver chip 206.

Figure 9A:
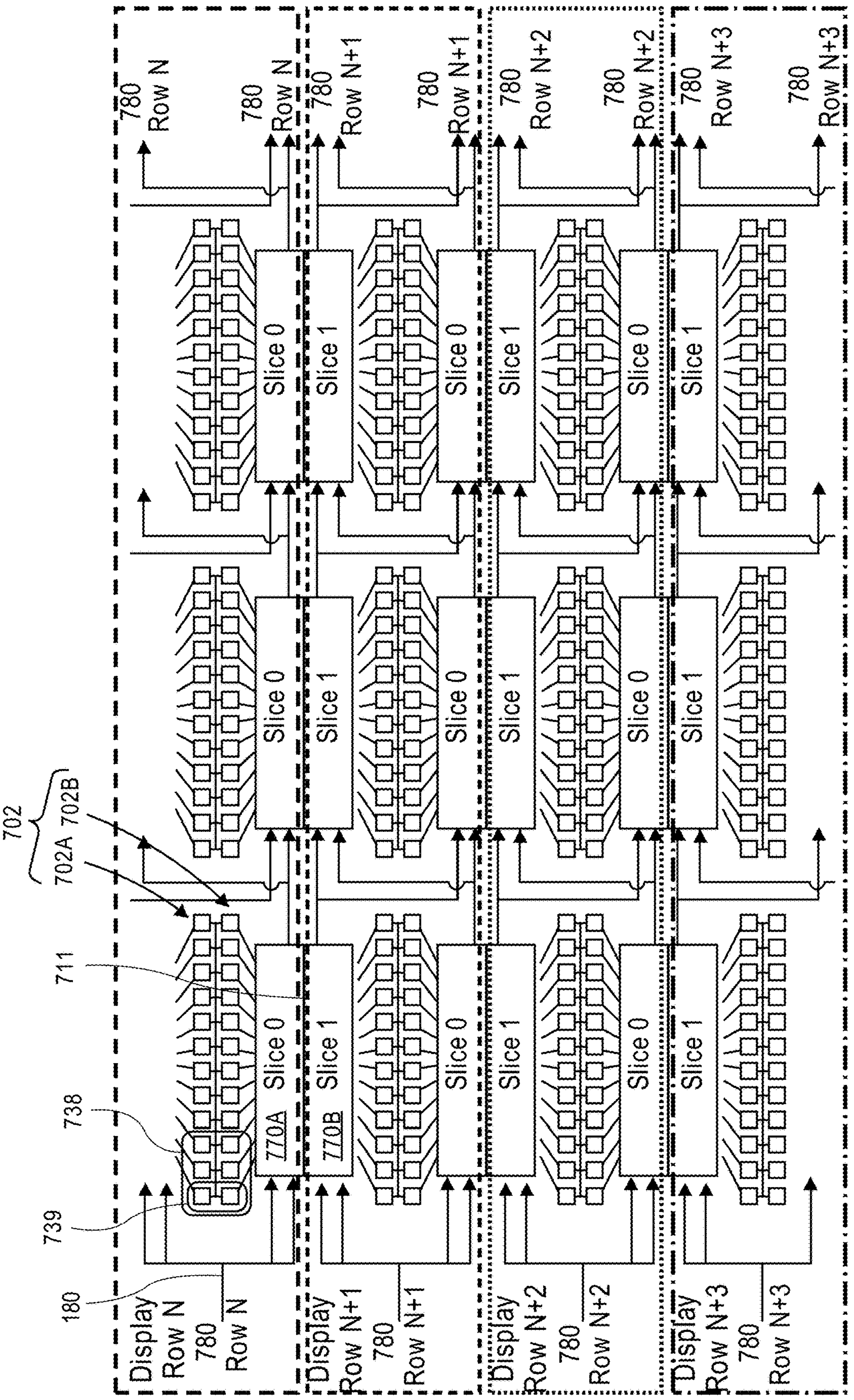
FIG. 9A is a diagram of a microdriver redundancy scheme illustrating emission clock routing in accordance with an embodiment.

FIG. 9A is a diagram of a microdriver redundancy scheme illustrating emission clock routing in accordance with an embodiment. The particular redundancy scheme illustrated in FIG. 9A includes redundant pairs of LEDs in a display row between microdriver rows (similar to FIGS. 6-7), though redundant LEDs within the emission row are not necessarily required to support the emission clock 780 routing (including emission clock lines 180) illustrated in FIG. 9A. Thus, the emission clock routing illustrated in FIG. 9A may also be compatible with the redundancy scheme illustrated in FIG. 8. In the following description separate figures and description are not provided for the redundancy scheme illustrated in FIG. 8 in interests of conciseness. Referring now to FIG. 9A each microdriver 711 includes two slices 770A (slice 0) and 770B (slice 1) as previously described. Each slice is independently responsible for reception of the control and data pixel bits, and driving the LEDs for a group of display pixels in the display row 702 (e.g. 4 pixels 738 in the display row). Each subpixel 739 may have two LEDs for redundancy, though this is not necessarily required to support microdriver redundancy. In an embodiment, only one LED of the two LEDs per subpixel is intended to be used for operation. In an embodiment, the top electrode lines 194 (e.g. cathode lines, see FIG. 1C) connecting the pair of redundant LEDs per subpixel are tied together, though the bottom electrode lines 671 (anode lines) per subpixel are separate nodes so that the redundant LEDs can be controlled separately. For example, the separate anode lines 671 may be patterned separately as illustrated in FIG. 6, or separated with an antifuse or laser cut 672 as illustrated in FIG. 7.

Of the two LEDs for each subpixel 739, one LED is driven by slice 1 of the microdriver 711 directly above (in the y-direction), and the other LED is driven by slice 0 of the microdriver directly below (in the y-direction). In the embodiment illustrated in FIG. 9A, each display row 702 (illustrated as Rows N, N+1, N+2, and N+3) is controlled by two slices 770A (slice 0), 770B (slice 1) of microdriver logic and two rows 702A, 702B of LEDs (two rows of 12 LEDs in the embodiment illustrated). In accordance with embodiments, when either of the two LEDs per subpixel or either of the microdriver slices controlling a display row is defective, the control bits embedded in the data stream, for example a slice select control bit, may be used to disable the defective microdriver slice and enable a non-defective microdriver slice sharing the same display row. In an embodiment, the level of granularity of control is per microdriver slice, not per LED. In such a configuration, where a defective LED is connected with slice 0, and another defective LED is connected with slice 1 in the same display row (and column of microdrivers), the redundancy scheme may not recover the overall display yield, even if the two defects do not belong to the same subpixel.

In order to support the redundancy scheme illustrated in FIG. 9A, each microdriver 711 slice (slice 0, slice 1) may include two input connections (e.g., pad, pin) and one output connection (e.g. pad, pin) coupled to (e.g. bonded to) a corresponding emission clock line 180 on the display panel. The emission clock lines 180 may be connected to the row drivers 206 illustrated in FIG. 2, for example. A general emission clock line 180 routing is illustrated in FIG. 9A to illustrate the general emission clock input/output for each microdriver slice. In an embodiment, there is a factor for emission clock lines 180 to support independent emission colors, e.g. a factor of 3 to support R/G/B pixels. A factor of 2 may also be included in the output connection count to support differential driving, as explained in further detail below with regard to FIGS. 18A-18D and FIG. 19. In an embodiment the total connection count (which may be referred to as pin count) for the emission clock input/output connection is 12 per microdriver slice 770A and 770B, with a total emission clock pin count of 24 per microdriver 711. Table 1 below details emission clock pin count per microdriver in accordance with an embodiment.

TABLE 1

| Microdriver pin count | Input | Output |
|---|---|---|
| Separate emission clock for R/G/B | x3 | x3 |
| Input mux to support redundancy | x2 | x1 |
| Differential driving | x1 | x2 |
| 2 slices per μD | x2 | x2 |
| Total pin count for emission clock per μD | 12 | 12 |

In an embodiment a display panel includes an array of microdrivers arranged in rows and columns and a plurality of emission elements (e.g. LEDs) arranged in a plurality of display rows. Each microdriver may include a top slice and a bottom slice, where the top slice is to control a display row adjacent the top slice and the bottom slice is to control a display row adjacent the bottom slice. The display panel additionally includes a plurality of rows of emission clock lines 180. Each emission clock 780 row is to control a row of bottom microdriver slices and a row of top microdriver slices on opposite sides of a display row.

Emission clock lines 180 may have a variety of routing paths between the microdrivers 711 and row drivers. For example, an emission clock routing path may run between top slices 770A of laterally adjacent microdrivers in a row of microdrivers, or between bottom slices 770B of laterally adjacent microdrivers in a row of microdrivers. Emission clock routing paths may also run between microdrivers in a pair of rows of microdrivers that shares the same display row. For example, an emission clock path may run between diagonally located microdrivers, top to bottom or bottom to top. In an embodiment an emission clock routing path runs between a bottom slice 770B of a first microdriver in a first row of microdrivers to a top slice 770A of a second microdriver in a second row of microdrivers, where the first row of microdrivers is above the second row of microdrivers, and vice versa.

Figure 9B:
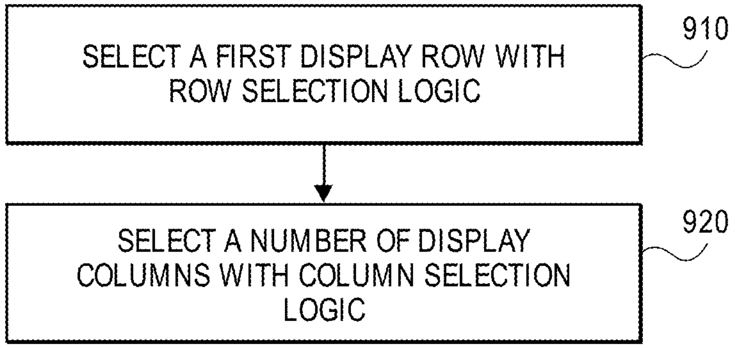
FIG. 9B is an illustration of a method of operating a display panel in accordance with an embodiment.

FIG. 9B is an illustration of a method of operating a display panel in accordance with an embodiment. At operation 910 a first display row in the display panel is selected with a row selection logic, such as that contained with a row driver. At operation 920 a number of display columns is selected with column selection logic, such as that contained within one or more column drivers. In an embodiment, selecting the first display row includes sending a first emission clock signal from a row driver to a first row of microdrivers adjacent the first display row, and each microdriver in the first row of microdrivers includes a "master" slice and a "spare" slice, with each of the master and spare slices including independent logic, for example, to independently receive control bits and pixel bits. For example, the "master" or "spare" slice can correspond to either of the slices (slice 0, slice 1) referred to herein.

Figure 9C:
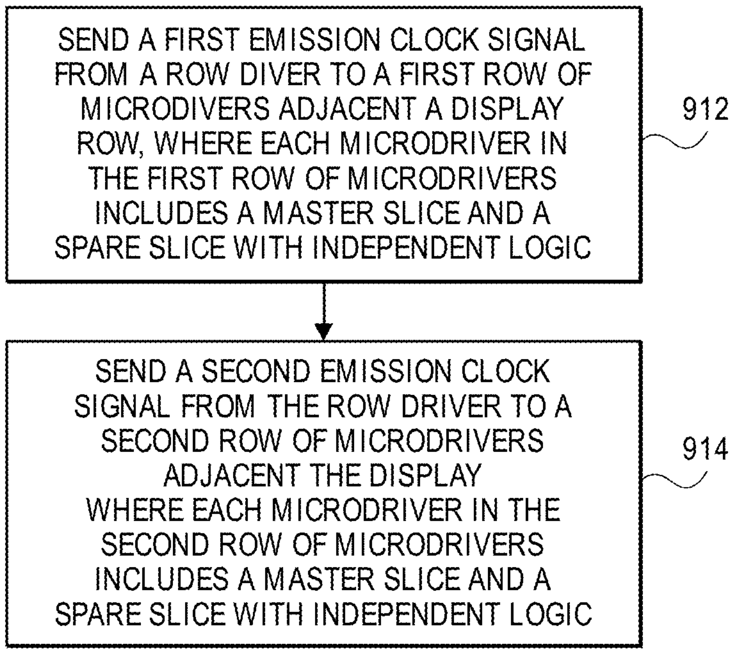
FIG. 9C is an illustration of a method of operating a display panel in accordance with an embodiment.

FIG. 9C is an illustration of a method of operating a display panel in accordance with an embodiment. In an embodiment, the method illustrated in FIG. 9C is a method of selecting a row with row selection logic, such as operation 910. At operation 912, a first emission clock signal is sent from a row driver to a first row of microdrivers adjacent the first display row, and each microdriver in the first row of microdrivers includes a master slice and a spare slice, with each of the master and spare slices including independent logic, for example, to independently receive control bits and pixel bits. At operation 914, a second emission clock signal is sent from the same row driver referred to in operation 912 to a second row of microdrivers adjacent the first display row, and each microdriver in the second row of microdrivers includes a master slice and a spare slice, with each of the master and spare slices including independent logic, for example, to independently receive control bits and pixel bits. In an embodiment, the first emission clock signal of operation 910 is sent to master slices in the first row of microdrivers. In an embodiment, the second emission clock signal is sent to spare slices in the second row of microdrivers. For example, this may correspond to a default case for operating the display panel in which there are no defective LEDs or microdrivers.

Figure 10:
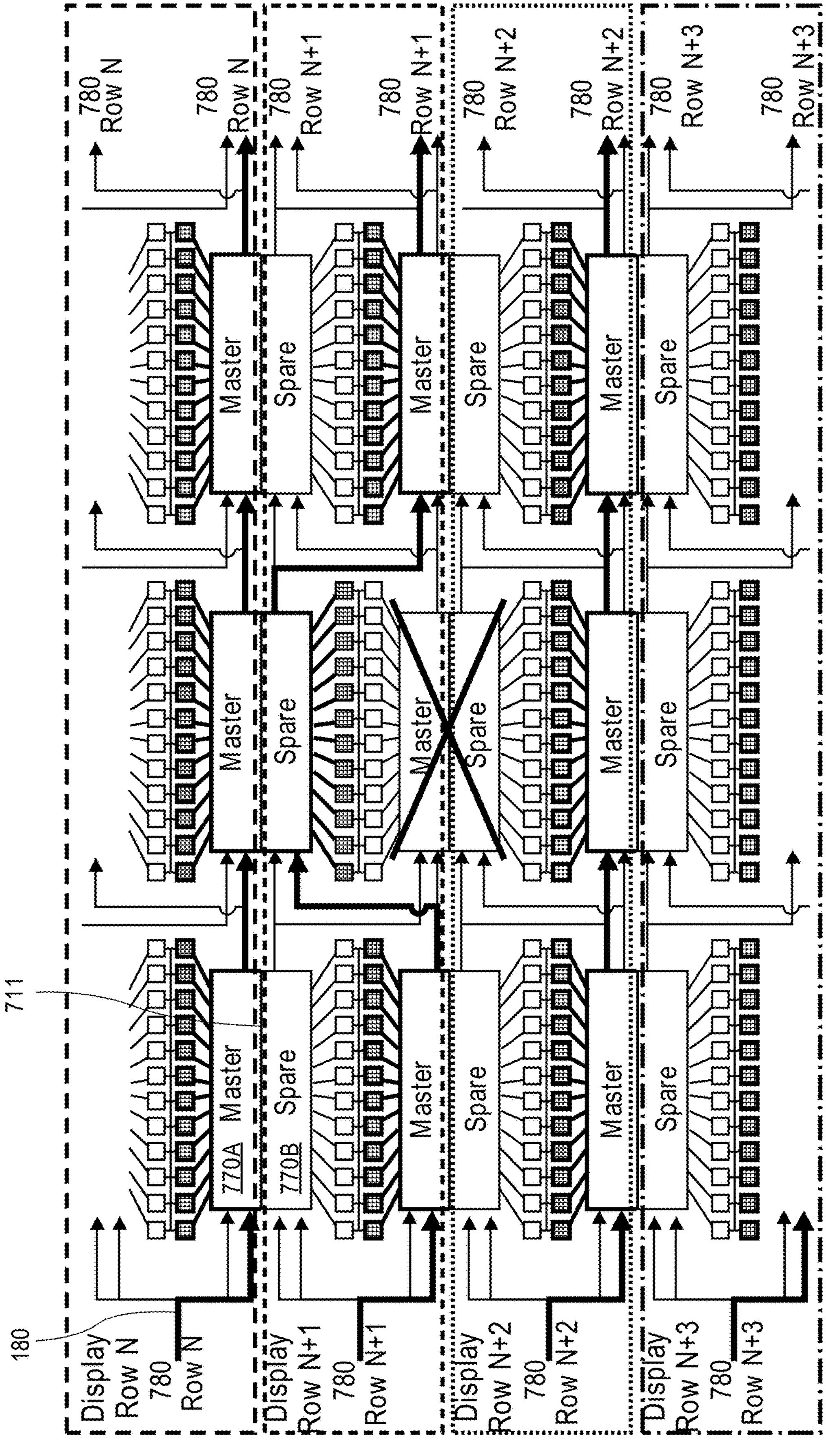
FIG. 10 is a diagram of the microdriver redundancy scheme including master and spare microdriver slices in accordance with an embodiment.
Figure 11:
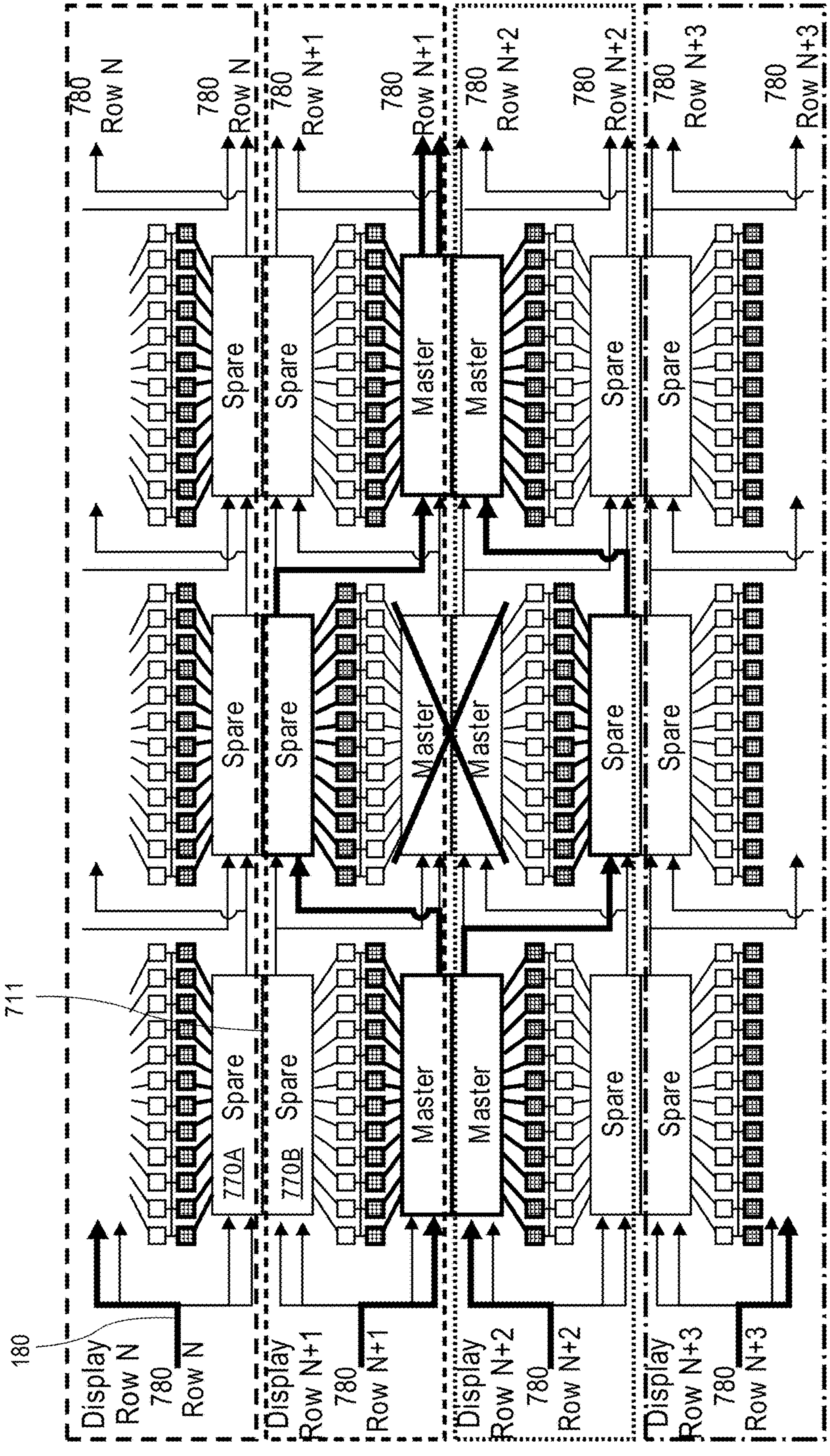
FIG. 11 is a diagram of the microdriver redundancy scheme including master and spare microdrivers in accordance with an embodiment.

Referring now to FIGS. 10-11 various operation methods can be used for operation of the display panel in the default case (e.g. when there are no defective LEDs or microdrivers) and for the repair methods. In the embodiments illustrated in FIGS. 10-11, the active LEDs are shaded (while the inactive LEDs are illustrated as white) and the active emission clock 780 routings (e.g. along emission clock lines 180) are indicated with the thicker lines. In an embodiment using the redundancy scheme illustrated in FIG. 10, slice 0 of every microdriver is a default driver of the LEDs, and may be referred to as the "master" (or primary), while slice 1 of every microdriver is used as a "spare" driver in the case of a master-side slice or LED is defective. Where a microdriver is defective (illustrated as crossed-out) the emission clock signals intended for a "master" microdriver slice are directed to a "spare" microdriver slice directly above the defective "master" microdriver slice. As shown, the group of redundant LEDs is driven by the "spare" micro driver slice in the display row directly above the defective "master" microdriver slice. It is to be appreciated that the selection of top/bottom slices as "master" or "spare" is exemplary, and the orientations may be reversed.

In an embodiment using the redundancy scheme illustrated in FIG. 11, slice 0 and slice 1 of every other microdriver (y-direction) in a column of microdrivers is the default "master" (or primary) driver of the LEDs, while slice 0 and slice 1 of adjacent (y-direction) microdrivers in the column of microdrivers are the default "spare" drivers in the case of an adjacent "master" microdriver or LED being defective. In an embodiment, every other row of microdrivers includes "master" slices 0, 1 and every other row of microdrivers includes "spare" slices 0, 1. Still referring to FIG. 11, where a "master" microdriver is defective (illustrated as crossed-out) the emission clock 780 signals intended for the "master" microdriver are directed to "spare" microdriver slices directly above and below the defective "master" microdriver. As shown, the group of redundant LEDs is driven by the "spare" micro driver slice in the display row directly above the defective "master" microdriver, and a group of redundant LEDs is driven by the "spare" micro driver slice in the display row directly below the defective "master" microdriver.

In addition to the emission clock lines 180, for example as illustrated in FIG. 9A and FIGS. 10-11, the display panel may additionally include a plurality of rows of data clock 774 lines 174, and a plurality of rows of emission counter reset 776 lines 176. In an embodiment, the data clock lines 174 and the emission counter reset lines 176 are to program control bits of adjacent rows of microdrivers, while the emission clock lines 180 and emission counter reset lines 176 are to control emission timing.

Figure 12:
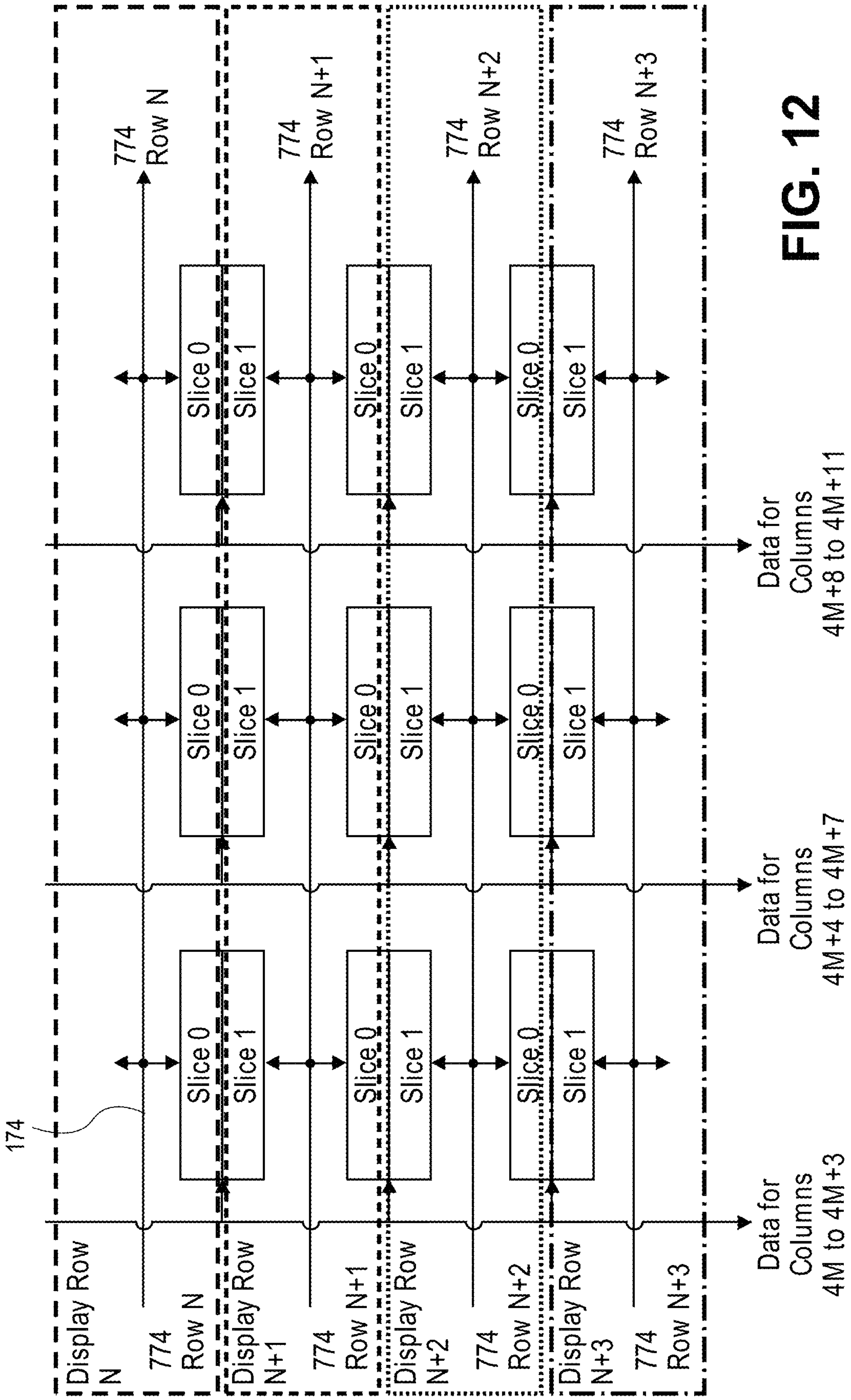
FIG. 12 is a diagram of a microdriver redundancy scheme illustrating data and data clock routing in accordance with an embodiment.

Referring now to FIG. 12 a diagram of a microdriver redundancy scheme illustrating data and data clock routing is provided in accordance with an embodiment. In an embodiment, the data clock line 174 for each display row is connected to both the slice 1 of one row of microdrivers and the slice 0 of another row of microdrivers immediately below (in the y-direction), such that the two slices each receive the same control bits and data bits. The data clock lines 174 may be connected to the row drivers 206 illustrated in FIG. 2, for example. In an embodiment, depending upon the control bits, only one slice is chosen to be active during normal display operation. However, it may be possible to turn on both slices, for example for testing purposes. In an embodiment, routing of the data clock lines 174 and data lines 172 does not use any repeaters to ensure that the data clock 774 and data 772 signals reliably reach all of the microdrivers to configure the redundancy scheme even in the case of microdriver defects.

Figure 13:
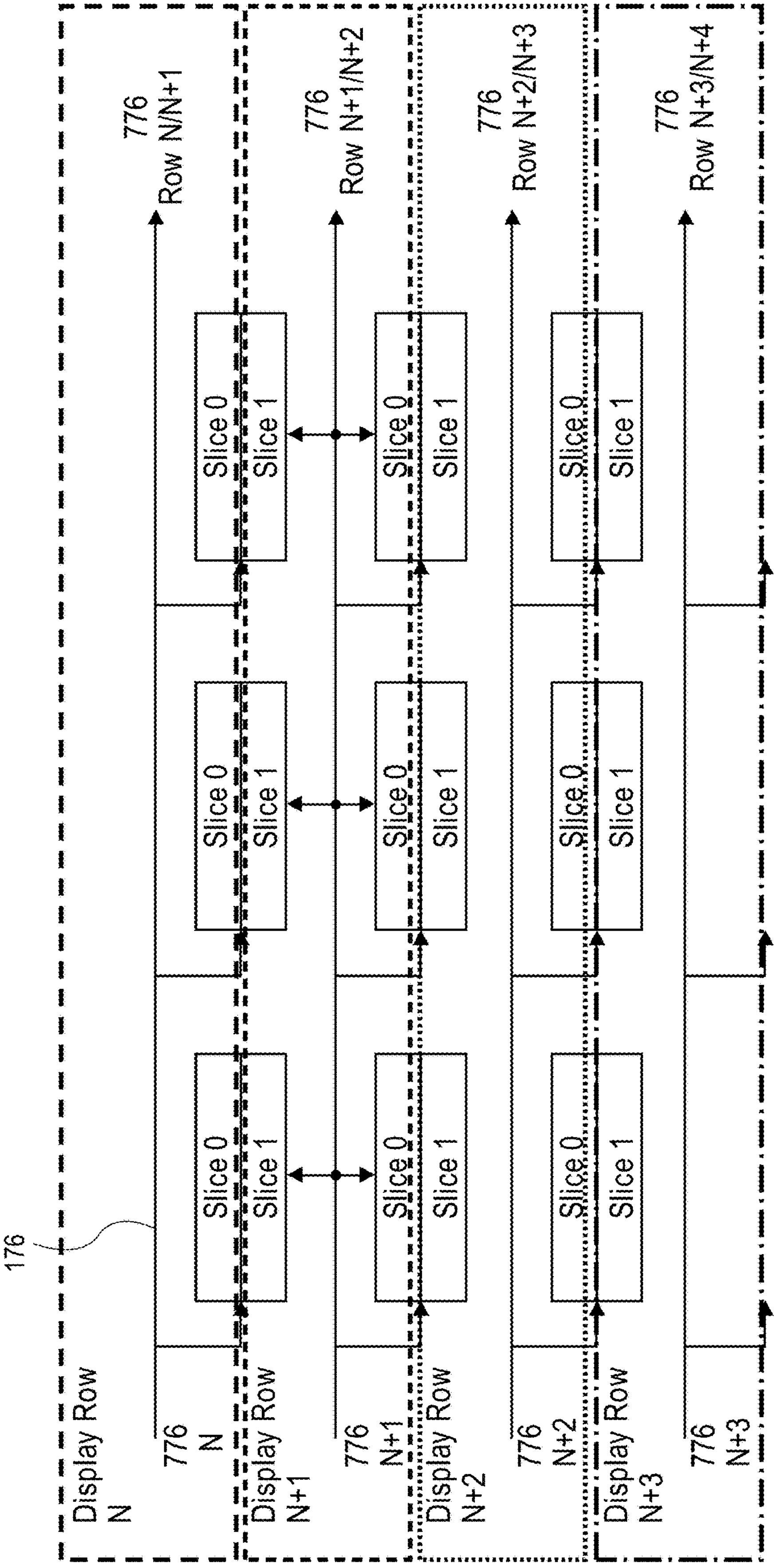
FIG. 13 is a diagram of a microdriver redundancy scheme illustrating emission counter reset routing in accordance with an embodiment.

Referring now to FIG. 13 a diagram of a microdriver redundancy scheme illustrating emission counter reset 776 routing (e.g. emission counter reset lines 176) is provided in accordance with an embodiment. As shown in FIG. 13, each row of microdrivers includes an emission counter reset line 176 connected to each microdriver in the row. The emission counter reset line 176 may be connected to the row drivers 206 illustrated in FIG. 2, for example. In accordance with embodiments, the emission counter reset lines 176 are routed differently than the emission clock lines 180 and data clock lines 174 described with regard to FIGS. 9A-12, in that each emission clock and data clock routing line 180, 174 belongs to a display row, while each emission counter reset line 176 belongs to a row of microdrivers. Thus, each emission counter reset line 176 may control a single row of microdrivers. In operation, the data clock and emission counter reset lines 174, 176 may be used for programming the control bits of the microdrivers, and the emission clock and emission counter reset lines 180, 176 may be used to control the emission timing.

Figure 14:
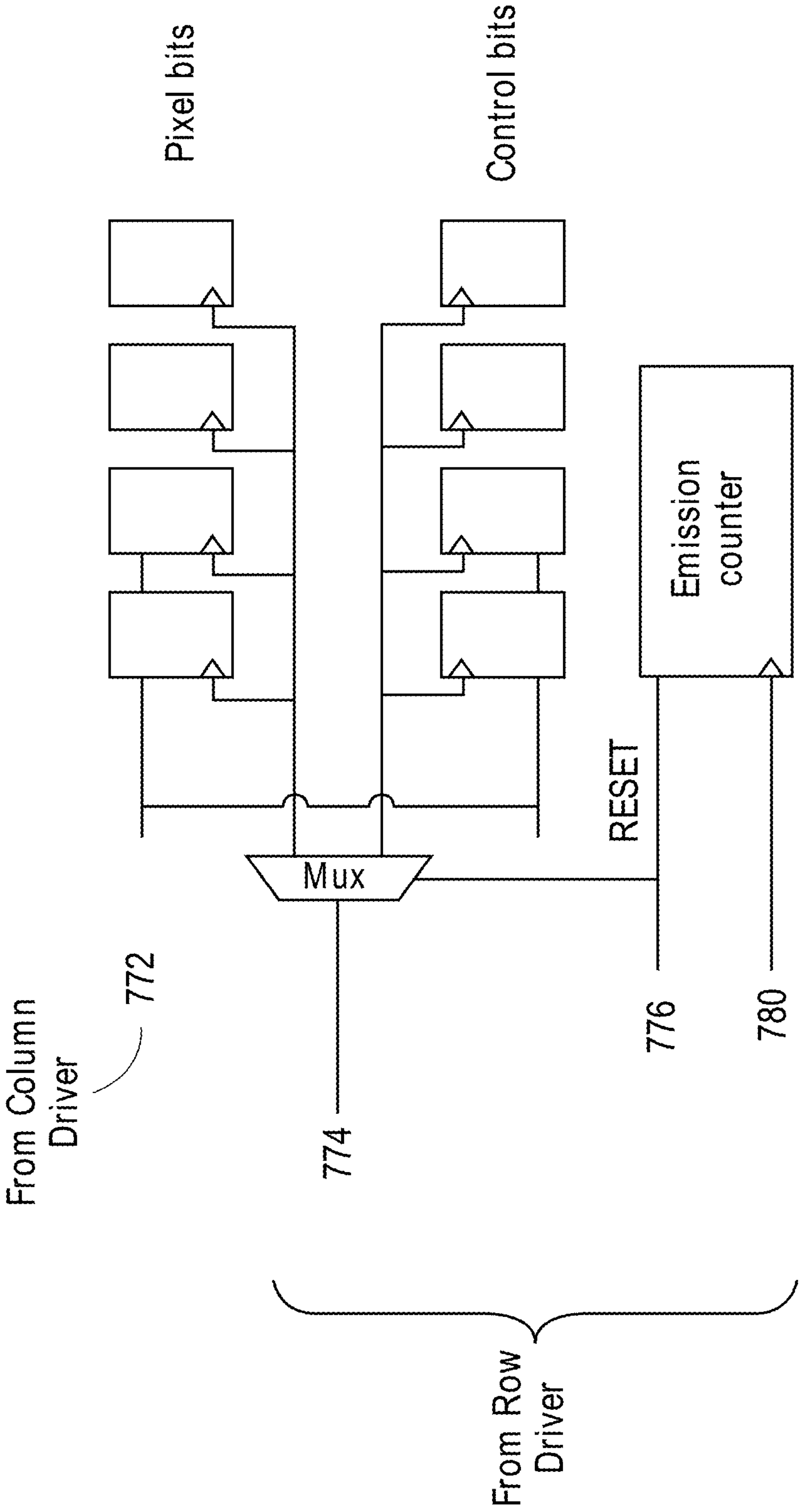
FIG. 14 is a block diagram illustrating logic within a microdriver slice for latching of pixel data bits in accordance with an embodiment.

FIG. 14 is a block diagram illustrating logic within a microdriver slice for latching of pixel data bits in accordance with an embodiment. In the embodiment illustrated, each slice in a microdriver has logic to receive and capture the incoming pixel bits and the incoming control bits through data 772 and data clock 774 input. In an embodiment, pixel bits specify the color data value for each subpixel emission element. In an embodiment, control bits can perform configuration operations for the slice, for example, slice selection with a slice select control bit. Emission counter reset 776 is an asynchronous reset signal for the emission control logic, but it may also act as an indicator to latch the control bits (instead of the pixel bits) from the data 772 input. When emission counter reset=0, the incoming data bit is stored as a pixel bit. The external FPGA provides the correct number and order of bits so that the data bits for all the microdrivers are latched correctly.

While the emission counter reset 776 is an asynchronous reset signal for the emission control logic, it also may act as in indicator to latch the control bits (instead of the pixel bits) from the data 772 input. When emission counter reset=1, the incoming data bit is stored as a control bit. The external FPGA provides the correct number and order of bits so that the control bits for all the microdrivers are latched correctly.

Figure 15:
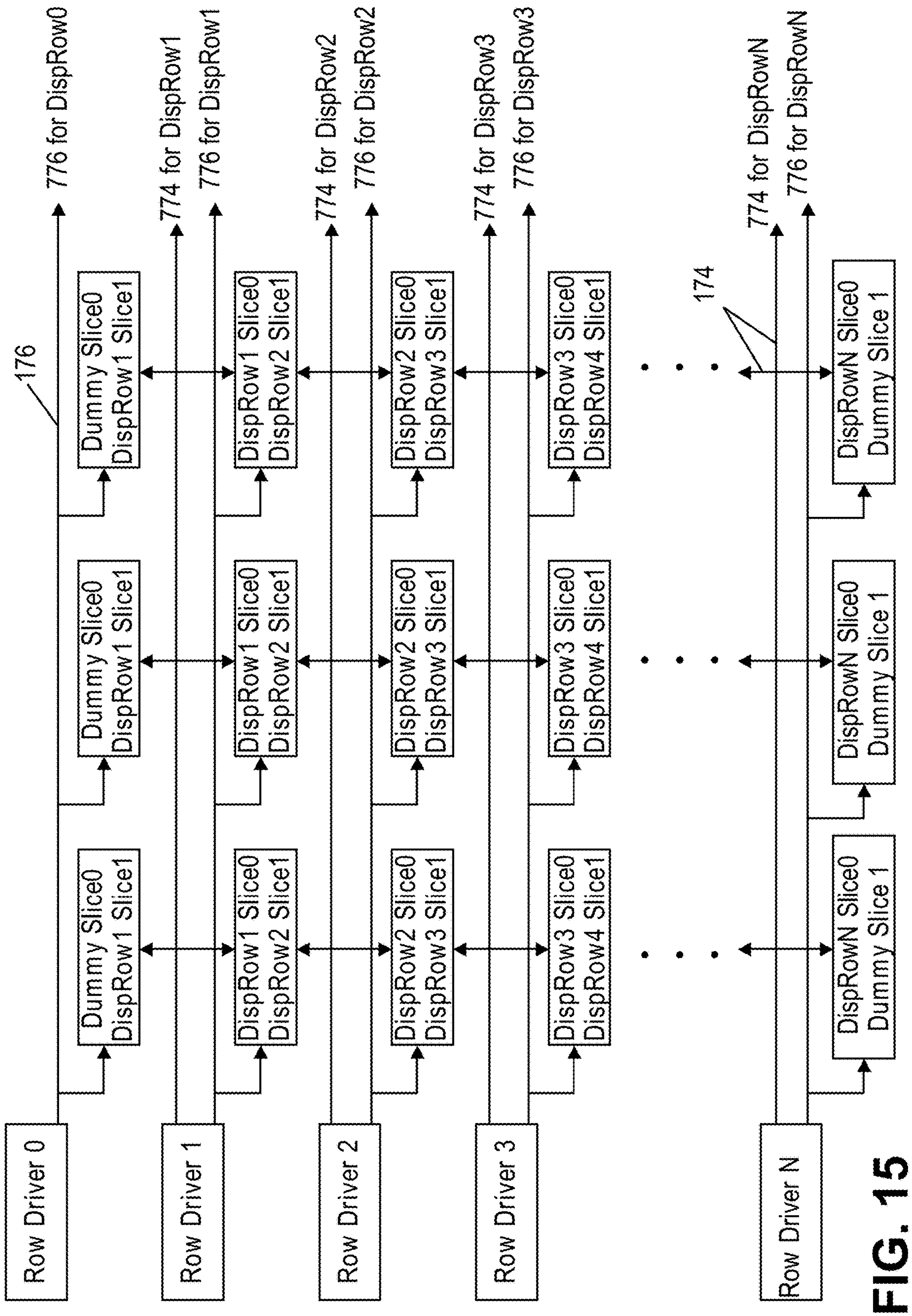
FIG. 15 is a diagram of a microdriver redundancy scheme illustrating data clock and emission counter reset connections in accordance with an embodiment.

FIG. 15 is a diagram of a microdriver redundancy scheme illustrating data clock 774 and emission counter reset 776 routing (e.g. including data clock lines 174 and emission counter reset lines 176) in accordance with an embodiment. Referring to FIGS. 12-13 along with FIG. 15 the two redundant slices for a given display row are located in two different microdrivers. Thus, while each data clock 774 belongs to one logical display row, each emission counter reset 776 belongs to one physical row of microdrivers. The different routings from the data clock and emission counter reset lines support the following two schemes (Scheme 1 and Scheme 2) of control bit programming to the microdrivers. Both schemes can be supported by proper timing control of emission counter reset and data clock by the external FPGA. In an embodiment, there is no control bit necessary in the microdrivers, row drivers, or column drivers to support the two schemes.

Figure 16A:
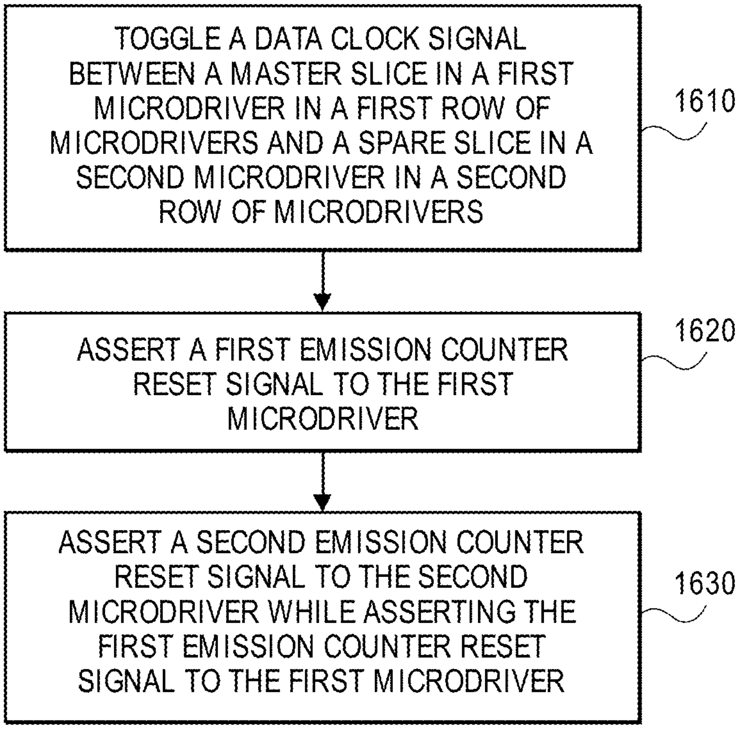
FIG. 16A is a flow diagram of a control bit loading scheme in accordance with an embodiment.

FIG. 16A is a flow diagram of a control bit loading scheme 1 in accordance with an embodiment. In an embodiment, the programming of microdrivers according to scheme 1 proceeds one display row at a time. At operation 1610 a data clock 774 signal is toggled between a master slice in a first microdriver in a first row of microdrivers and a spare slice in a second microdriver in a second row of microdrivers. At operation 1620 a first emission counter reset 776 signal is asserted to the first microdriver. At operation 1630 a second emission counter reset 776 signal is asserted to the second microdriver while asserting the first emission counter reset 776 signal to the first microdriver.

Figure 16B:
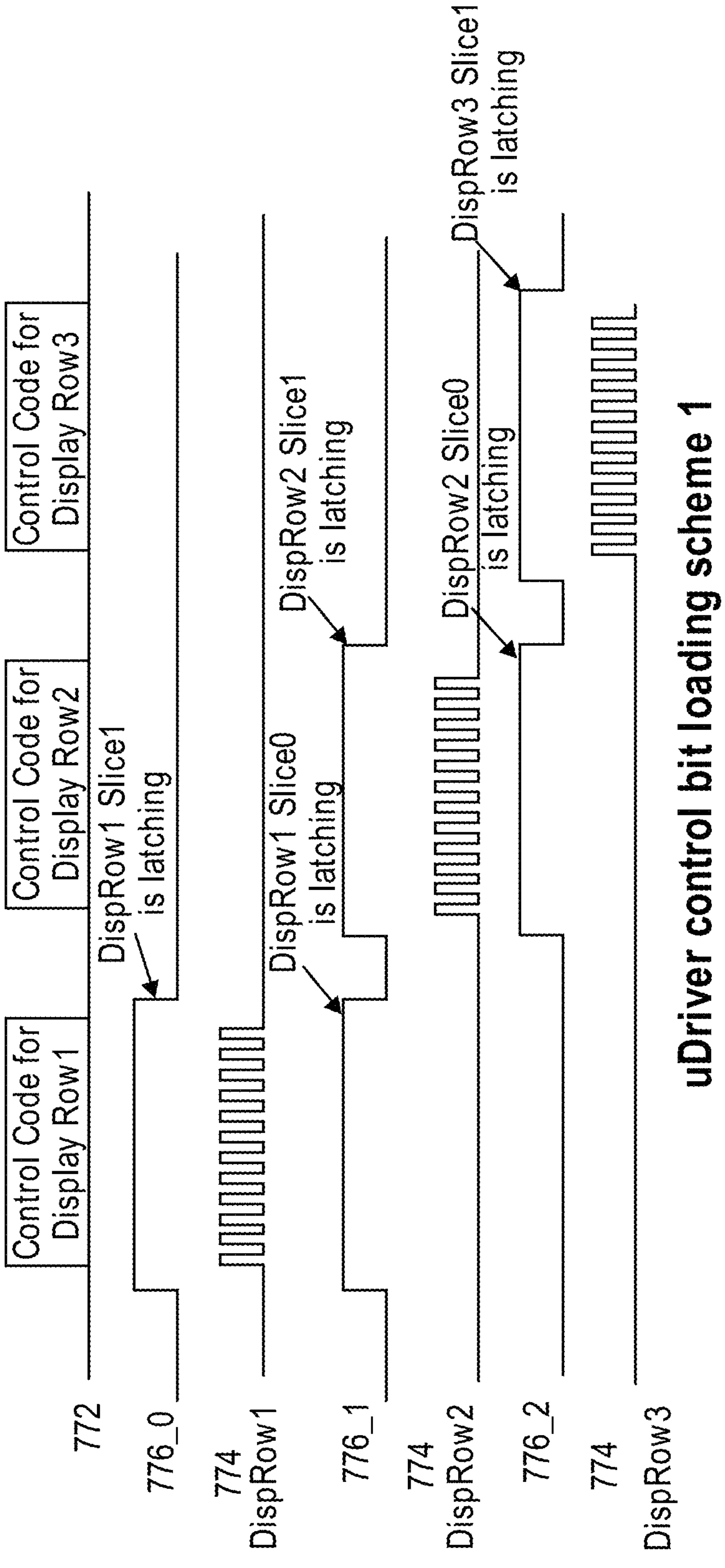
FIG. 16B is a microdriver control bit loading scheme in accordance with an embodiment.

FIG. 16B is an illustration of the microdriver control bit loading scheme 1 in accordance with an embodiment. In an embodiment, scheme 1 is the default operating mode. When the data clock 774 for a given display row is toggling, both microdrivers belonging to the display row have their emission counter reset 776 asserted at the same time. Therefore, both the slices for the display row get exactly the same control bits. As one of the slices is the slice 1 of the upper (in the y-direction) microdriver and the other slice is the slice 0 of the lower (in the y-direction) microdriver, one bit slice select can control the two slices so that only one slice per display row is active. In operation, when slice select=1, slice 0 is OFF, and slice 1 is ON. In operation, when slice select=0, slice 0 is ON, and slice 1 is OFF.

Figure 17A:
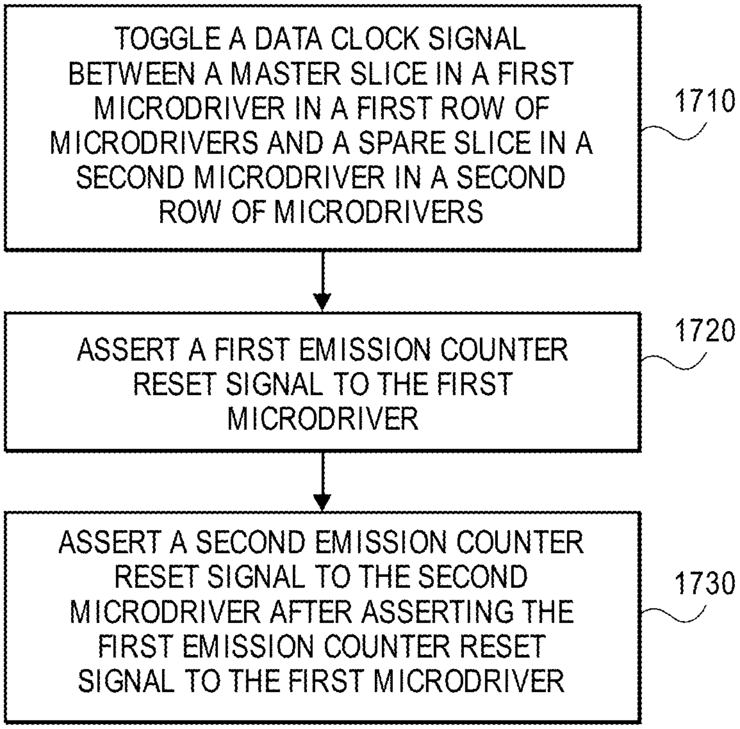
FIG. 17A is a flow diagram of a control bit loading scheme in accordance with an embodiment.

FIG. 17A is a flow diagram of a control bit loading scheme 2 in accordance with an embodiment. In an embodiment, the programming of microdrivers according to scheme 2 proceeds one slice at a time. At operation 1710 a data clock 774 signal is toggled between a master slice in a first microdriver in a first row of microdrivers and a spare slice in a second microdriver in a second row of microdrivers. At operation 1720 a first emission counter reset 776 signal is asserted to the first microdriver. At operation 1730 a second emission counter reset 776 signal is asserted to the second microdriver after asserting the first emission counter reset 776 signal to the first microdriver.

Figure 17B:
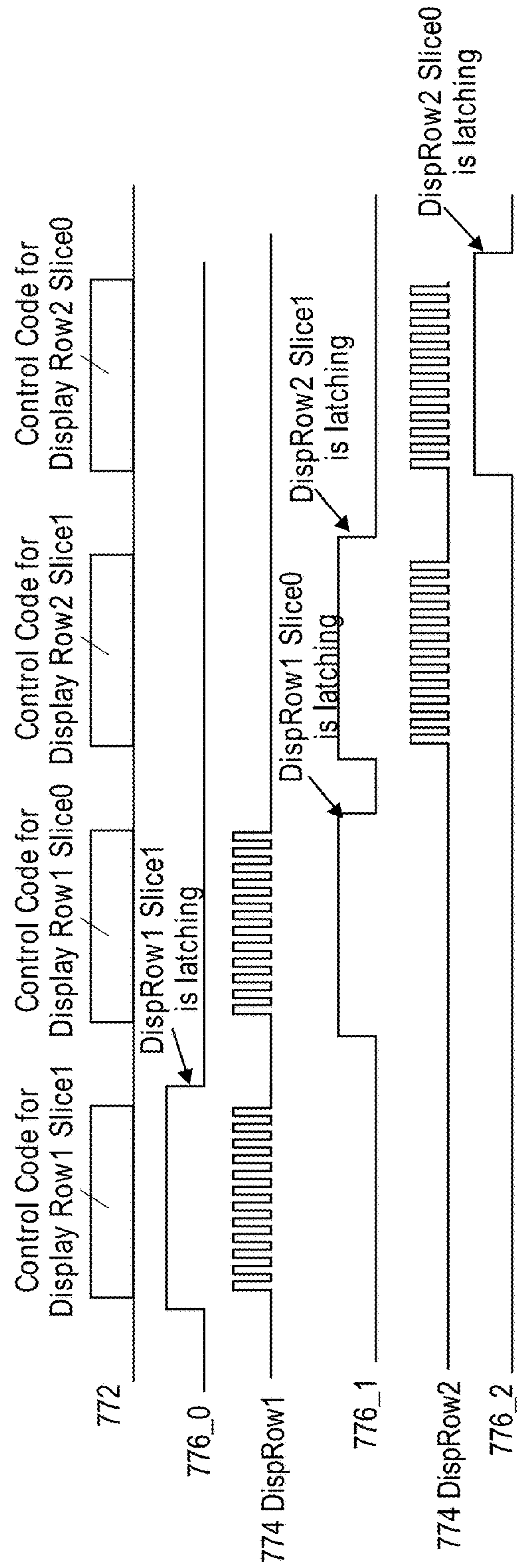
FIG. 17B is a microdriver control bit loading scheme in accordance with an embodiment.
Figure 18A:
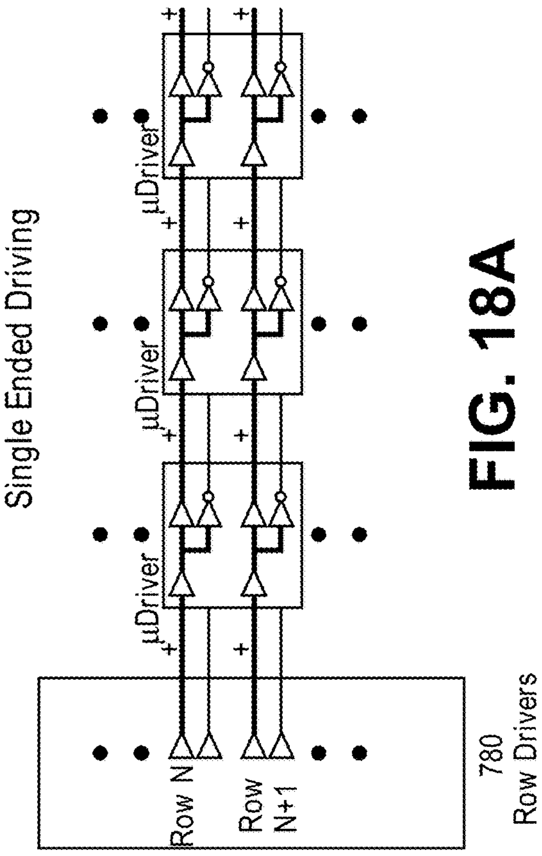
FIGS. 18A-18D are clock polarity options according to embodiments of the disclosure.
Figure 18B:
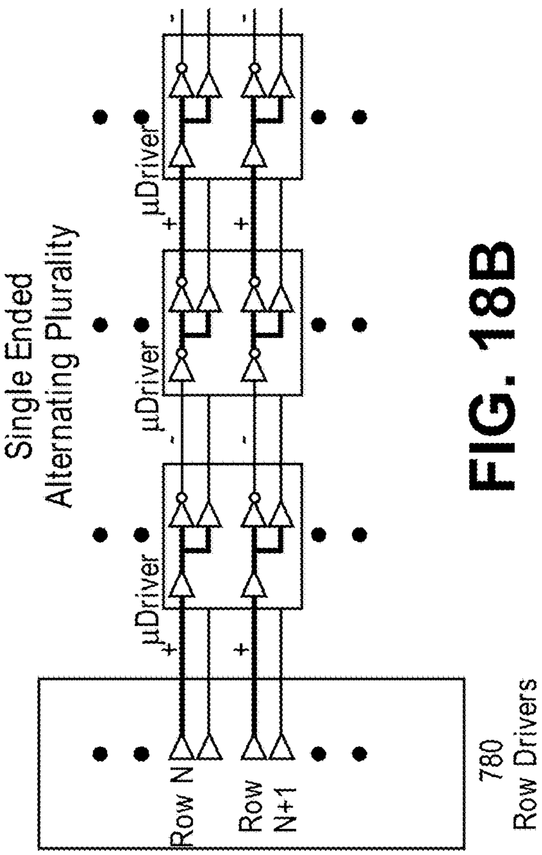
Figure 18C:
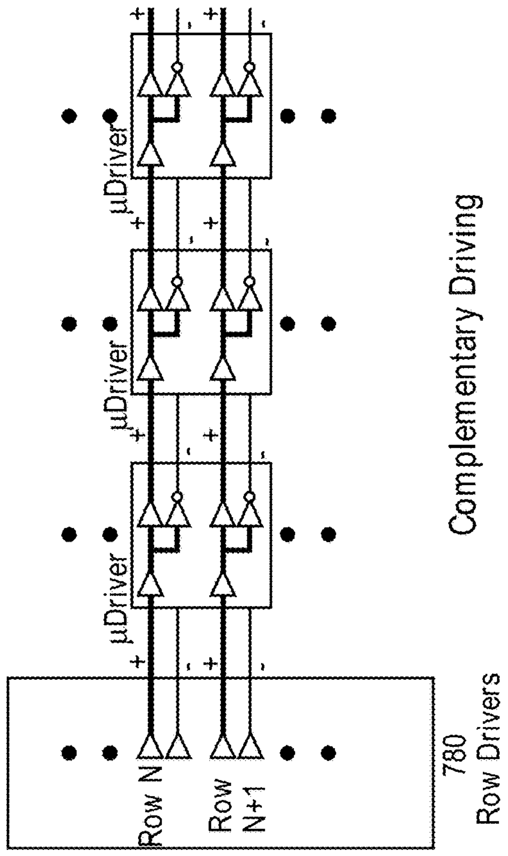
Figure 18D:
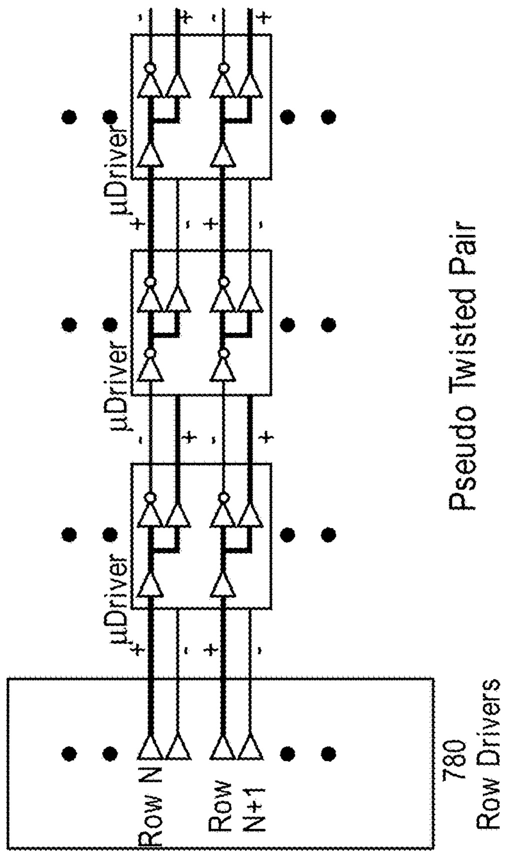

FIG. 17B is an illustration of the microdriver control bit loading scheme 2 in accordance with an embodiment. When the data clock 774 for a given display row is toggling, only one microdriver has its emission counter reset 776 asserted. Therefore, at any given time, only one slice is updating its control bits. In this manner each slice may have its own independent setting. Thus, both slices in a given display row can be turned ON at the same time by doing the following: slice 1 of the upper microdriver for a given display row is turned on by slice select=1, while slice 0 of the lower microdriver for the given display row is turned on by slice select=0.

As described above with regard to the redundancy scheme illustrated in FIG. 9A, differential driving methods may be used. In accordance with embodiments the emission clock 780 output from each row driver and/or microdriver may have an option to drive either single-ended or differential and/or to compare electromagnetic interference (EMI) performance, e.g., to minimize the EMI. In one embodiment, each microdriver has the option of inverting the incoming emission clock signal before using it for internal logic and/or relaying to the next microdriver. By combining the two options, the following 4 clock polarity options in FIGS. 18A-18D may be supported, e.g., to compare EMI performance. Note that for the single-ended alternating polarity and the pseudo twisted pair, every other microdriver (e.g., odd or even columns) may utilize an inverted, incoming emission clock signal, for example, including an option to invert the incoming emission clock signal.

Figure 19:
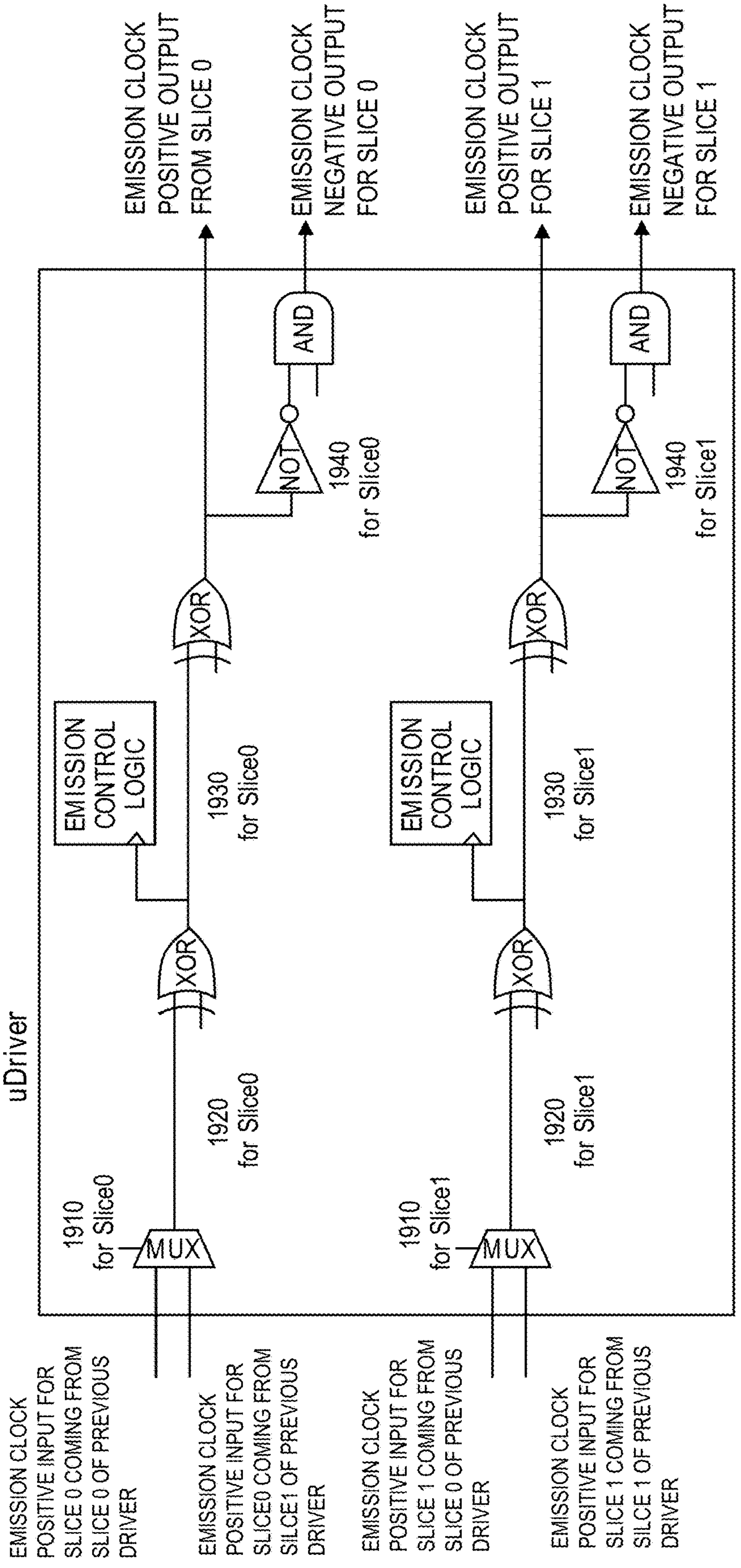
FIG. 19 is a block diagram for emission clock redundancy and polarity options in accordance with an embodiment.

FIG. 19 is a block diagram for emission clock redundancy and polarity options in accordance with an embodiment. Various options regarding emission clock 780 redundancy and polarity are available. As shown, emission clock select 1910 may select whether to use the emission clock output of slice 0 or slice 1 of the previous microdriver. Signal 1920 may give the option to invert the incoming emission clock polarity before using it for internal logic or relaying to the next microdriver. Signal 1930 may give the option to invert the outgoing emission clock polarity before relaying to the next microdriver. Signal 1930 may enable the emission clock negative output. If the signal 1930=0, then the emission clock negative output stays at 0.

Up until this point, many of the redundancy configurations have been described using a full microdriver and LED redundancy scheme similar to that illustrated in FIG. 6, though embodiments are not necessarily so limited, and many embodiments may be combined with alternative redundancy configurations. In the following description with regard to FIGS. 20A-34B various additional redundancy configurations are described.

Figure 20A:
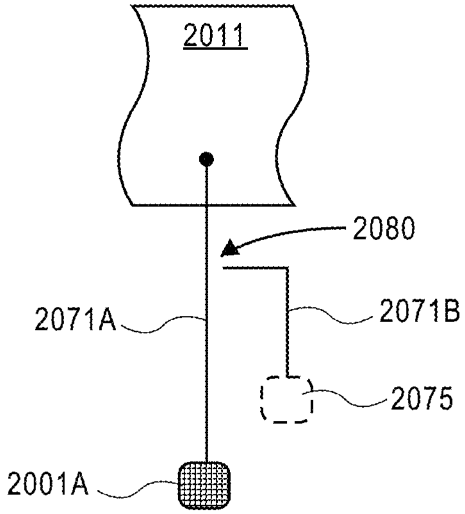
FIG. 20A is an LED redundancy scheme without a spare LED in accordance with an embodiment.
Figure 20B:
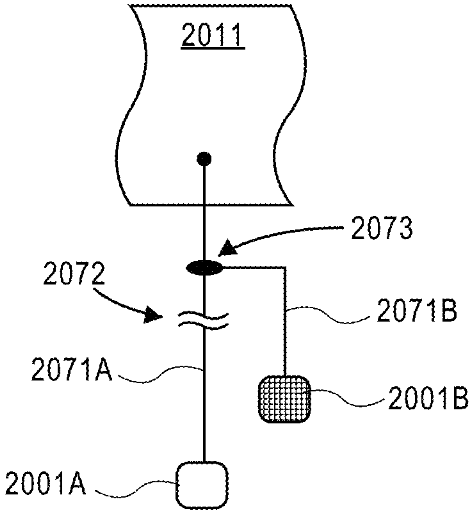
FIG. 20B is an LED redundancy scheme with connected spare LED in accordance with an embodiment.

Referring now to FIGS. 20A-20B a redundancy scheme is illustrated including redundant LEDs, without redundant microdrivers. Such a configuration may reduce to the total silicon cost and silicon area for full microdriver redundancy. In such an embodiment, redundancy is placed on the backplane instead of within the microdrivers, e.g. within silicon microdriver chips. FIG. 20A is an illustration of a display panel after a pick-and-place (P&P) operation has been performed to transfer an array of microdrivers 2011 from a carrier substrate to the display panel, and a P&P operation has been performed to transfer an array of LEDs from a carrier substrate to the display panel as described with regard to FIG. 1B. As shown, a primary LED 2001A is placed onto an electrode contact of an electrode line (e.g. anode line) 2071A which is electrically connected to the microdriver 2011. In the embodiment illustrated, an electrode line (e.g. anode line) 2071B is located near the electrode line 2071A, but is disconnected at gap 2080. An electrode contact 2075 for P&P of a spare LED is illustrated as a dotted line to indicate that the spare LED has not been placed on the display panel. In the embodiment illustrated in FIG. 20A, the primary LED 2001A is operational, and it is not necessary to place a spare LED on the display panel. In an embodiment illustrated in FIG. 20B, the primary LED 2001A is missing or not working. For example, this may be caused by a variety of sources such as a mis-transferred or non-transferred LED during the P&P operation, a defective LED from manufacturing, defective bond to the electrode contact during the P&P operation, contamination, etc. In such an embodiment, a P&P operation may be performed to bond a spare LED 2001B onto the spare electrode contact 2075 of electrode line 2071B. The primary LED 2001A may optionally be electrically disconnected form the electrode line 2071A, for example, by an antifuse or laser cut 2072. The spare electrode line 2071B may be electrically connected with the electrode line 2071A, for example, with a laser weld 2073. In an embodiment, laser cutting and/or welding may be used to resolve a P&P failure. In accordance with embodiments a common cathode line may be formed over both LEDs 2001A, 2001B within a subpixel, or over all LEDs within a pixel or pixels similarly as described with regard to FIG. 1C.

Referring now to FIGS. 21A-21E, various redundancy and repair configurations are illustrated in accordance with embodiments. In an embodiment a display panel redundancy scheme includes an array of microdrivers 2111A, 2111B arranged in rows and columns and a plurality of display rows 2102, with each display row being between two rows of microdrivers 2111A, 2111B. A display row may include a subpixel including a first emission element 2101A (e.g. primary LED) and a redundant emission element 2101B (e.g. spare LED). The first emission element 2101A may be on a first electrode line 2171A to a first microdriver 2111A in a first row of microdrivers, and the redundant emission element 2101B may be on a second electrode line 2171B to a second microdriver 2111B in a second row of microdrivers. The first or second electrode lines may be electrically disconnected from the first and second microdrivers to support redundancy. For example, the first electrode line is electrically disconnected (e.g. with an antifuse or laser cut) from the first microdriver, and the second electrode line is electrically connected to the second microdriver, or vice versa. The first or second electrode lines can also be joined to support redundancy, for example with a joint such as a laser weld. In an embodiment, a joint electrically connects the first electrode line to the second electrode line, or vice versa.

Figure 21A:
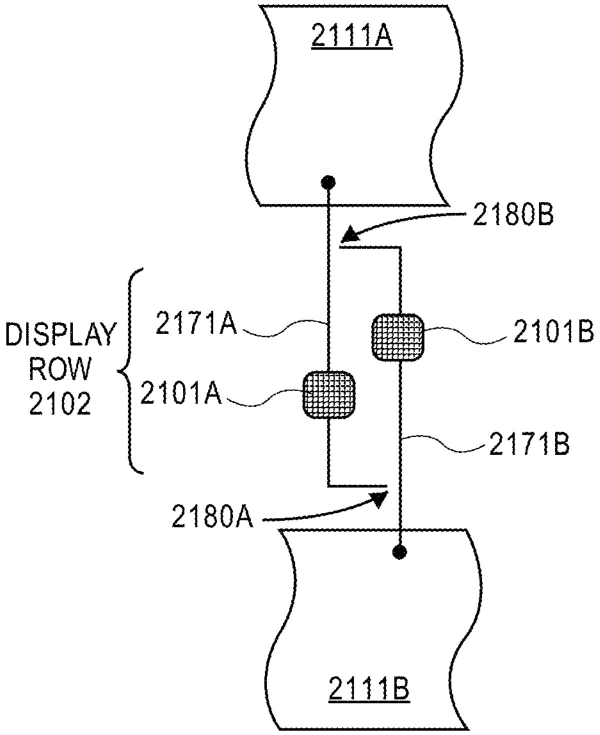
FIGS. 21A-21F are redundant microdriver and LED repair configurations in accordance with embodiments.
Figure 21B:
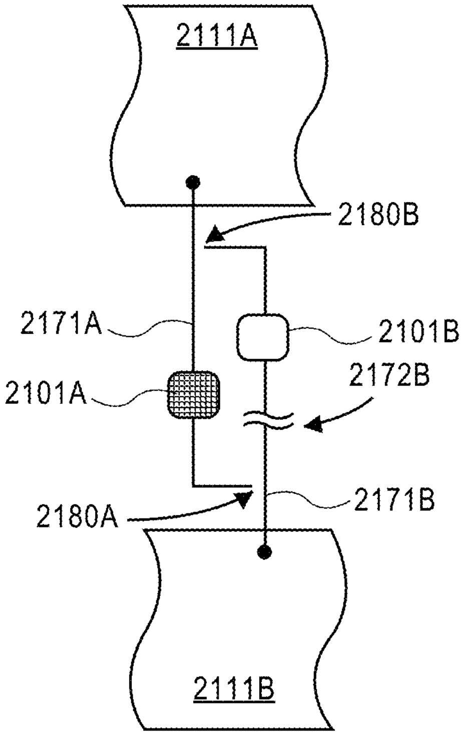

FIG. 21A illustrates an initial redundancy scheme in which a redundant pair of microdrivers and a redundant pair of LEDs have been placed in a display row. The particular layout illustrated is a close-up view of bottom electrode (e.g. anode) routing after the P&P operations of the microdrivers and LEDs. In some embodiments, the redundancy scheme illustrated in FIG. 21A may be similar to that illustrated in FIG. 6 previously described. One difference may be that the microdrivers 2111A, 2111B illustrated in FIG. 21A do not include separately operable slices, as described with regard to FIG. 6. In this aspect, total silicon cost and silicon area for full microdriver redundancy may be reduced.

Referring to FIG. 21A, similar to FIG. 20A described above, a primary LED 2101A is placed onto an electrode contact of an electrode line (e.g. anode line) 2171A electrically connected to the top (in the y-axis) microdriver 2111A. As shown, a spare LED 2101B is placed onto an electrode contact of an electrode line (e.g. anode line) 2171B electrically connected to the bottom (in the y-axis) microdriver 2111B. A gap 2180A exists between an end of electrode line 2171A and electrode line 2171B, and a gap 2180B exists between an end of electrode line 2171B and electrode line 2171A. The gaps 2180A, 2180B may represent electrode line repair sites or welding sites where the two lines can optionally be joined together with further processing. In an embodiment, LEDs 2101A, 2101B are a redundant pair of LEDs within a subpixel in a display row 2102. The LEDs 2101A, 2101B illustrated in FIG. 21A are illustrated as operational LEDs in the ON/emission state, indicated by dark shading. In an embodiment, both LEDs 2101A, 2101B illustrated in FIG. 21A can be used as emissive LEDs. In accordance with embodiments, either of the LEDs can be disconnected from their respective microdrivers 2111A, 2111B, for example, with an antifuse or laser cut along electrode lines 2171A, 2171B. In an embodiment illustrated in FIG. 21B, LED 2101A is a primary LED. When the LED 2101A and microdriver 2111A are tested and determined to be operational, the LED 2101B and/or microdriver 2111B can be disconnected with an antifuse or laser cut 2172B. In accordance with embodiments a common cathode line may be formed over both LEDs 2101A, 2101B within a subpixel, or over all LEDs within a pixel or pixels similarly as described with regard to FIG. 1C.

Figure 21C:
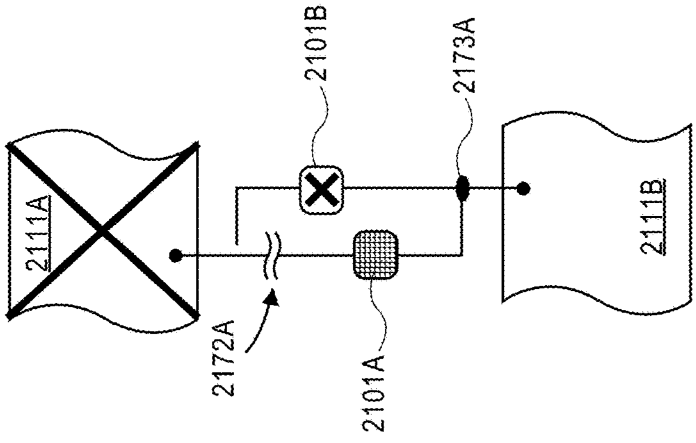

Referring to FIG. 21C, a redundancy and repair scheme is illustrated in which the top microdriver 2111A is not working and the redundant LED 2101B is not working. In such a configuration, the electrode line 2171A may be operably joined to electrode line 2171B, for example, with a weld 2173A which may be formed using a suitable technique such as laser welding. The electrode line 2171A may be disconnected from the top microdriver 2111A or example, using an antifuse or laser cut 2172A. In this manner, LED 2101A is driven by bottom microdriver 2111B. An additional antifuse or laser cut may optionally be used to disconnect the LED 2101B from the bottom microdriver 2111B.

Figure 21D:
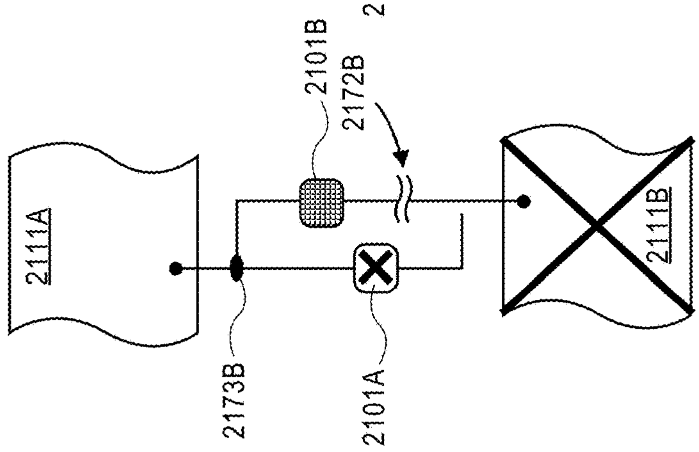

FIG. 21D is an illustration of a redundancy and repair scheme opposite to that illustrated and described with regard to FIG. 21C, where the bottom microdriver 2111B is not working and the primary LED 2101A is not working. In such a configuration, the electrode line 2171B may be operably joined to electrode line 2171A, for example, with a weld 2173B which may be formed using a suitable technique such as laser welding. The electrode line 2171B may be disconnected from the bottom microdriver 2111B for example, using an antifuse or laser cut 2172B. In this manner, LED 2101B is driven by top microdriver 2111A. An additional antifuse or laser cut may optionally be used to disconnect the LED 2101A from the top microdriver 2111A.

Figure 21E:
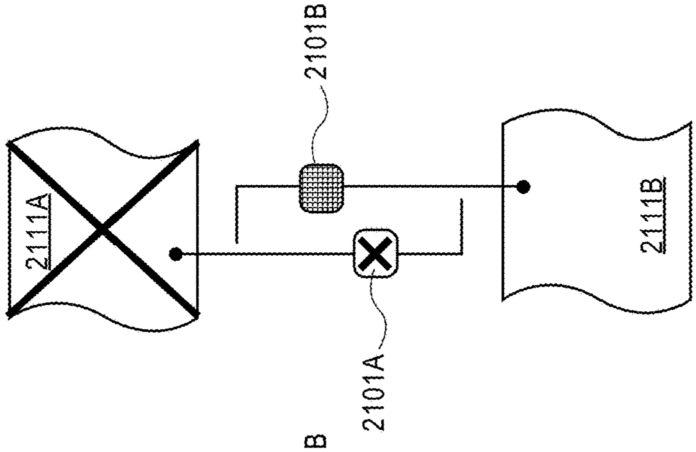

FIG. 21E is an illustration of a redundancy and repair scheme in which the top microdriver 2111A is not working and/or the primary LED 2101A is not working. In such a configuration, the bottom microdriver 2111B drives the redundant LED 2101B and additional processing may not be required. An additional antifuse or laser cut may optionally be used to disconnect the LED 2101A from the top microdriver 2111A.

Figure 21F:
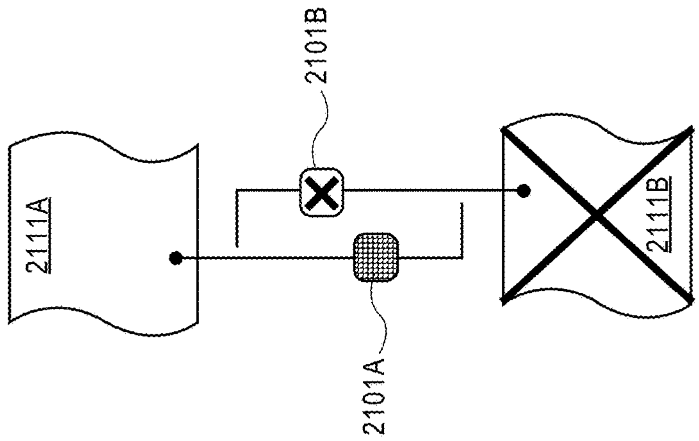

FIG. 21F is an illustration similar to FIG. 21D in which the bottom microdriver 2111B is not working and/or the redundant LED 2101B is not working. In such a configuration, the top microdriver 2111A drives the primary LED 2101A and additional processing may not be required. An additional antifuse or laser cut may optionally be used to disconnect the LED 2101B from the bottom microdriver 2111B.

Figure 22:
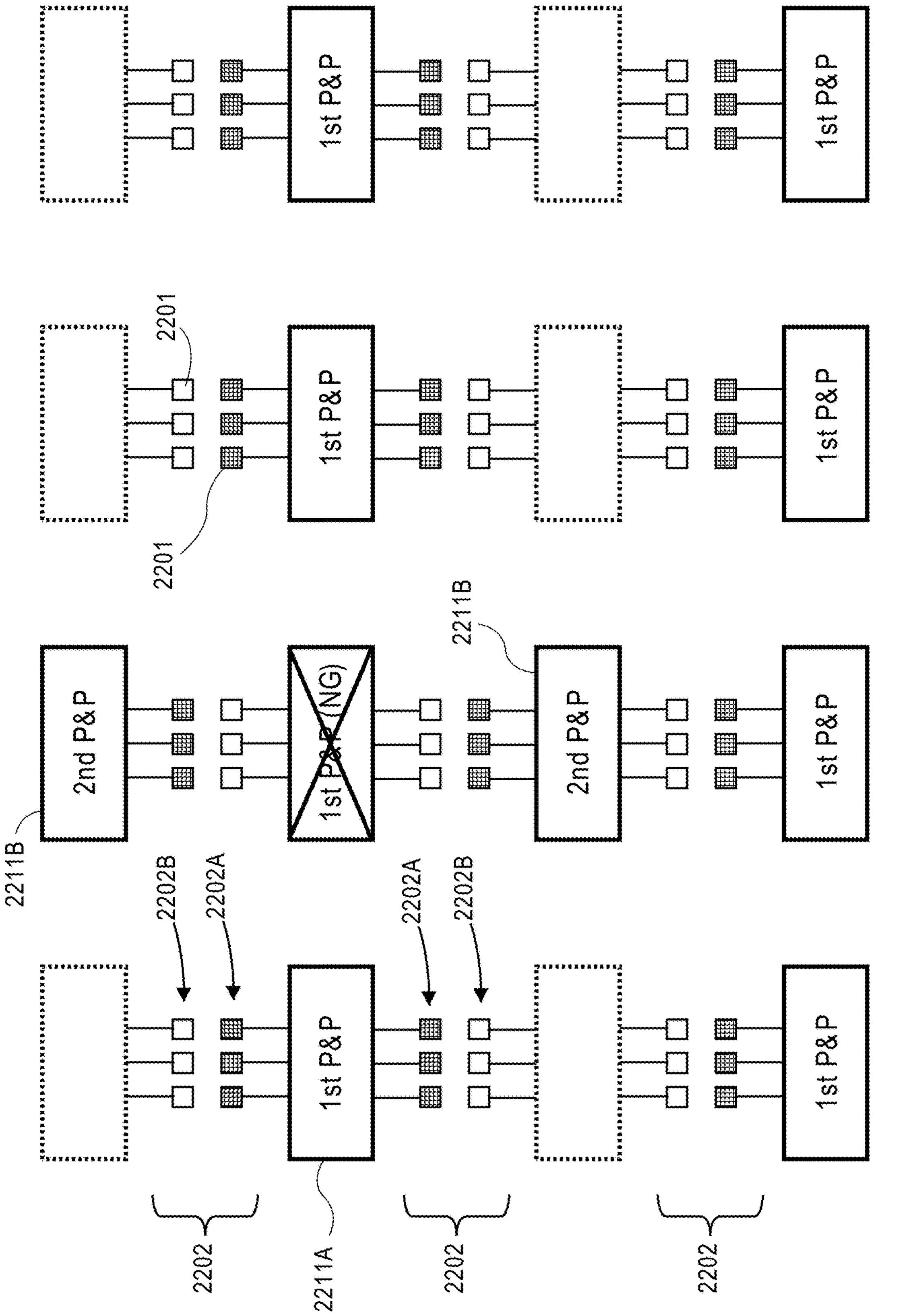
FIG. 22 is a diagram illustrating selectively placed spare microdrivers in accordance with an embodiment.

Referring now to FIG. 22 a diagram illustrating selectively placed spare microdrivers is provided in accordance with an embodiment. In an embodiment a display panel redundancy scheme includes an array of primary microdrivers 2211A arranged in columns and primary rows, and a plurality of display rows 2202 in which two display rows are arranged between two adjacent primary rows of microdrivers. In such a configuration, each display row may include a first group 2202B of emission elements (e.g. LEDs) on primary electrode lines to be driven by an adjacent row of primary microdrivers, and a second group 2202A of emission elements (e.g. LEDs) on spare electrode lines running to a row of spare microdriver placement regions. In an embodiment, one or more spare microdrivers 2211B are located (e.g. surface mounted) in the row of spare microdriver placement regions.

The redundancy scheme illustrated in FIG. 22 may have many similarities to the previously described and illustrated above with regard to FIG. 6 and FIG. 9A. In an embodiment one difference is that the microdrivers 2211A, 2211B illustrated in FIG. 22 do not include separate slices (slice 0, slice 1) to support redundancy, though separate slices is a possible. In an embodiment, each display row 2202 may include a primary and redundant rows of LEDs 2201 as previously described. In the event that a defective microdriver 2211A or primary LED 2201 is found to be defective or missing, then a spare microdriver 2211B is placed in a spare microdriver location. The spare locations are illustrated by dotted lines in FIG. 22. The particular embodiment illustrated in FIG. 22 is in the ON state, in which emissive LEDs 2201 are shaded and the unused LEDs 2201 that are not emitting are unshaded. Thus, the primary microdrivers 2211A control primary LED rows. Where a primary microdriver is defective (indicated by being crossed-out), then a replacement pair of microdrivers 2211B is placed at spare sites immediately above and below the defective primary microdriver 2211A, across from the adjacent display rows 2202. The spare microdrivers 2211B control the redundant rows of LEDs 2201 within the respective display rows 2202. In accordance with embodiments a common cathode line may be formed over both LEDs 2201 within a subpixel, or over all LEDs within a pixel or pixels similarly as described with regard to FIG. 1C.

The redundancy scheme illustrated in FIG. 22 may potentially reduce silicon cost by placing spare microdrivers 2211B only after a defective microdriver or LED is detected. The redundancy scheme may potentially reduce silicon cost, the amount of logic required, and routing layers by removing the independently controlled slices, slice 0 and slice 1.

Figure 23:
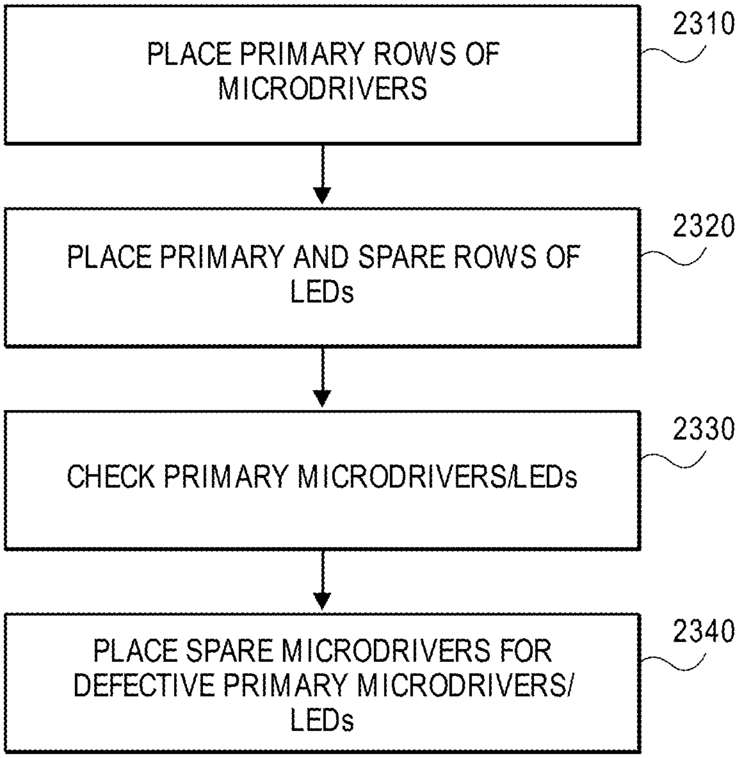
FIG. 23 is a flow diagram in accordance with an embodiment.

FIG. 23 is a flow diagram for fabricating the redundancy scheme illustrated in FIG. 22 in accordance with an embodiment. At operation 2310 the primary rows (every other row) of microdrivers 2211A are placed on the display substrate. At operation 2320 the primary and spare rows of LEDs 2201 are placed on the display substrate. An inspection operation 2330 is then performed to check if the primary microdrivers 2211A and primary LEDs 2201 (e.g. in group 2202B) are operational. In an embodiment the inspection operation is performed by powering on the display panel and verifying whether or not all primary LEDs 2201 are operating. At operation 2340 spare microdrivers 2211B are only placed at locations for defective primary microdrivers or primary LEDs. As shown, spare microdrivers 2211B may be placed in spare rows immediately above and below the corresponding display rows 2202 associated with the defective primary microdrivers or primary LEDs. An inspection operation may then be performed to verify the spare microdrivers 2211B and corresponding spare LEDs 2201 (e.g. in group 2202A) are operating.

Referring now to FIGS. 24-30 schematic illustrations are provided of LED connections to a microdriver 711 including slices 770A (slice 0), 770B (slice 1) in accordance with embodiments. In accordance with embodiments, the each microdriver may include both a “master” slice 770A, and a “spare” slice 770B. Alternatively, the microdrivers can include both “master” slices 770A, 770B, or the microdrivers can include both “spare” slices 770A, 770B. The microdrivers 711 in the embodiments illustrated in FIGS. 24-30 may operate similarly as the microdrivers 711 described and illustrated with regard to FIGS. 10-11 in which the active LEDs are shaded while the inactive LEDs are illustrated as white. In interest of clarity, the microdrivers in FIGS. 24-30 are all illustrated as including both “master” slices 770A, 770B.

Where a microdriver 711 is defective, the emission clock signals intended for a “master” microdriver slice (e.g. 770A) are directed to a “spare” microdriver slice (e.g. 770B) directly above/below the defective “master” microdriver slice. It is to be appreciated that the selection of top/bottom slices as “master” or “spare” is exemplary, and the orientations may be reversed. In accordance with embodiments, the staggered connections to the LEDs may potentially mitigate the origin of a visual artifact or optical distortion due to an emission pitch variation at the boundaries of a defective microdriver 711. This may be achieved by staggering the connections to the redundant LED pairs between adjacent microdrivers 711 so that both operational and defective microdrivers are connected to a portion of LEDs within both redundant rows 702A, 702B.

In an embodiment, a display panel includes a first microdriver 711 arranged in a first row of microdrivers, and a second microdriver 711 arranged in a second row of microdrivers. A plurality of pixels 738 are arranged in a display row 702 (including 702A, 702B) between the first and second microdrivers. Each of the first and second microdrivers 711 includes a first slice 770A and a second slice 770B, and the first and second slices are to independently receive control and pixel bits. In an embodiment, the first slice 770A of the first microdriver 711 is to drive the plurality of pixels 738, and the second slice 770B of the second microdriver 711 is to drive the same plurality of pixels 738. As illustrated, each pixel 738 of the plurality of pixels includes a first group of light emitting diodes (LEDs) (e.g. within row 702A) and a redundant group of LEDs (e.g. within row 702B). In accordance with embodiments illustrated in FIGS. 24-30, the first slice 770A of the first microdriver 711 is to drive a first staggered portion of both the first group of LEDs and the redundant group of LEDs (e.g. the shaded LEDs), and the second slice 770B of a second microdriver 711 (not shown) is to drive a second staggered portion of both the first group of LEDs and the redundant group of LEDs (e.g. the white LEDs).

In each of the embodiments illustrated in FIGS. 24-29 the microdriver 711 connections to the LEDs within the redundant rows 702A, 702B are staggered between the top and bottom rows 702A, 702B. The connections to the LEDs may be staggered between the top/bottom rows 702A/702B with every other subpixel 739 (FIGS. 24-25), every two subpixels (FIGS. 26-27), or every pixel 738 or three subpixels 739 (FIGS. 28-29) in an exemplary RGB pixel arrangement. In the embodiment illustrated in FIG. 30 the redundant rows 702A, 702B are staggered in the same row 702 (e.g. within the same line, and not vertically arranged). In some embodiments, the y-axis pitch of the staggered LED connections above/below each microdriver 711 is constant across the display rows 702 (e.g. FIGS. 24, 26, 28, 30). In some embodiments, the y-axis pitch of the staggered LED connections above/below each microdriver 711 is variable across the display rows (e.g. FIGS. 25, 27, 29).

In accordance with the embodiments illustrated in FIGS. 24-30, the staggered LED connections between rows 702A, 702B allows the center of each display row 702 (including 702A, 702B) to remain the same in the event of defective LEDs or microdrivers. In this aspect, the visual defects may become point defects, as opposed to line defects, which may be more difficult to be observed by a user. Additionally, since a defective microdriver 711 is not necessarily associated with a line defect, the embodiments illustrated in FIGS. 24-30 may potentially allow for the control over a larger number of LEDs and pixels with each microdriver 711.

In accordance with embodiments, the microdrivers 711 with various staggered LED connections, and constant or variable y-axis pitches may be operated using a various operating conditions, for example, as rows of master and spare microdrivers similar to that previously described with regard to FIG. 11 as wells as rows of master and spare microdriver slices similar to that previously described with regard to FIG. 10. In operation, rows of master and spare microdrivers may potentially be associated with reduced power requirements if it is not necessary for each spare microdriver to operate its associated LEDs.

Figure 24:
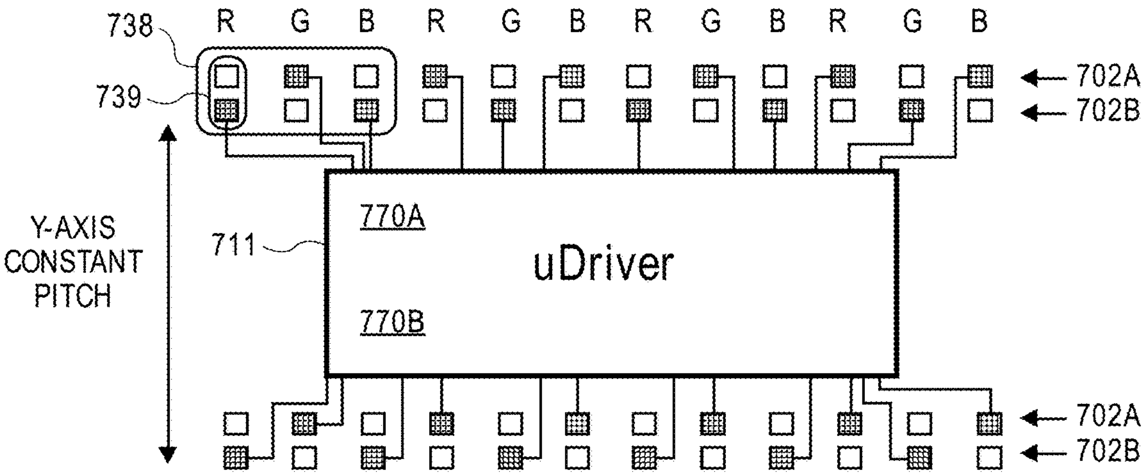
FIGS. 24-30 are schematic illustrations of LED connections to a microdriver including slices in accordance with embodiments.
Figure 31:
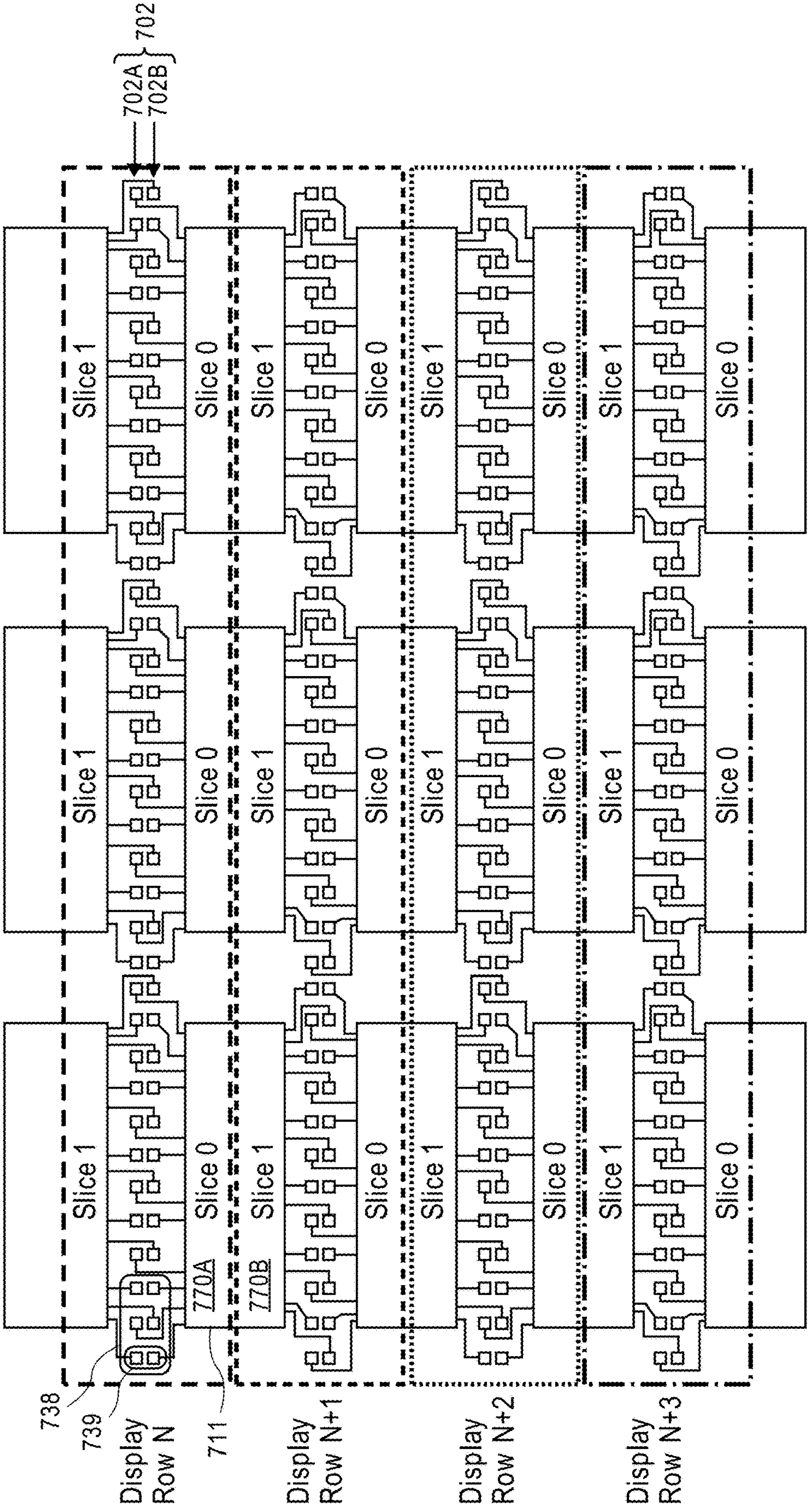
FIG. 31 is a diagram of a redundancy scheme including microdrivers with constant LED connection pitch in accordance with an embodiment.

Referring now to FIG. 31 a redundancy scheme is provided including an array of microdrivers, similar to the one illustrated in FIG. 24, with staggered connections between the top/bottom rows 702A/702B for every other subpixel 739, and the y-axis pitch of the staggered LED connections above/below each microdriver 711 is constant across the display rows 702 in accordance with an embodiment.

Figure 32A:
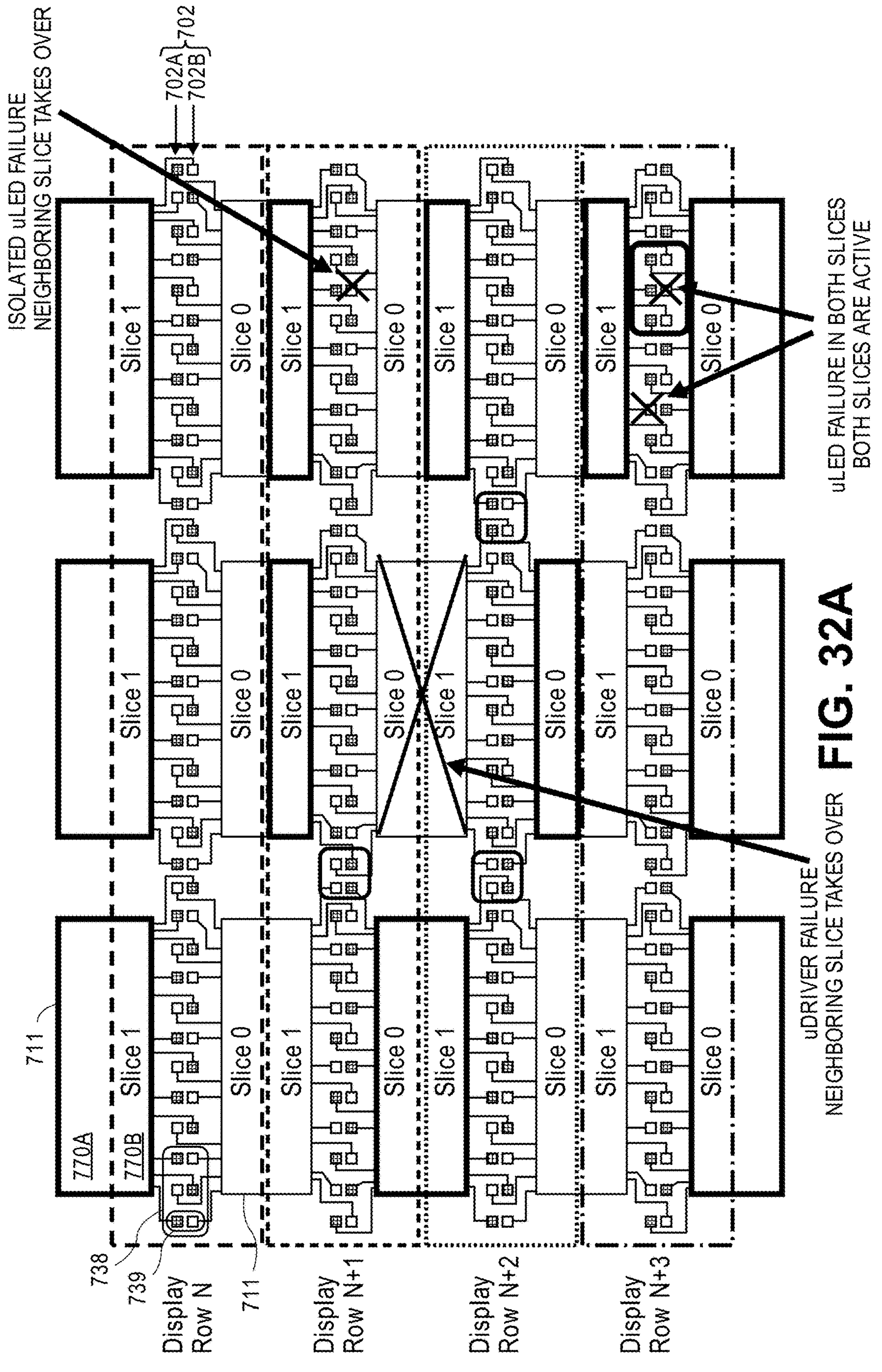
FIG. 32A is a diagram of a driving scheme for FIG. 31 with master and spare microdrivers in accordance with an embodiment.

Referring now to FIG. 32A the redundancy scheme of FIG. 31 is illustrated in which the microdrivers are operated in a condition similar to that described with regard to FIG. 11, with “master” and “spare” microdrivers 711. In the embodiment illustrated in FIG. 32A, the default “master” microdrivers 711 are illustrated in bold outline, every other microdriver (y-direction) in a column of microdrivers is the default “master” (or primary) driver of the LEDs, and the adjacent (y-direction) microdrivers in the column of microdrivers are the default “spare” drivers in the case of an adjacent “master” microdriver being defective. As shown, the staggered LED connections above/below each microdriver are constant. As illustrated, in the default condition both slices 0, 1 of a default “master” microdriver 711 operate the LEDs to which they are connected. If a microdriver 711 is defective, the neighboring slice of the adjacent microdrivers take over. If there is an isolated LED failure, the neighboring slice of the adjacent microdriver will take over. If there are LED failures in both rows 702A, 702B between two adjacent microdrivers, both slices in both microdrivers are active. In interest of clarity, various associated point defects are outlined in bold line to demonstrate the creation of point defects rather than line defects in the event of failed microdrivers or LEDs. Depending upon resolution, these point defects may or may not be observable by a user.

Figure 32B:
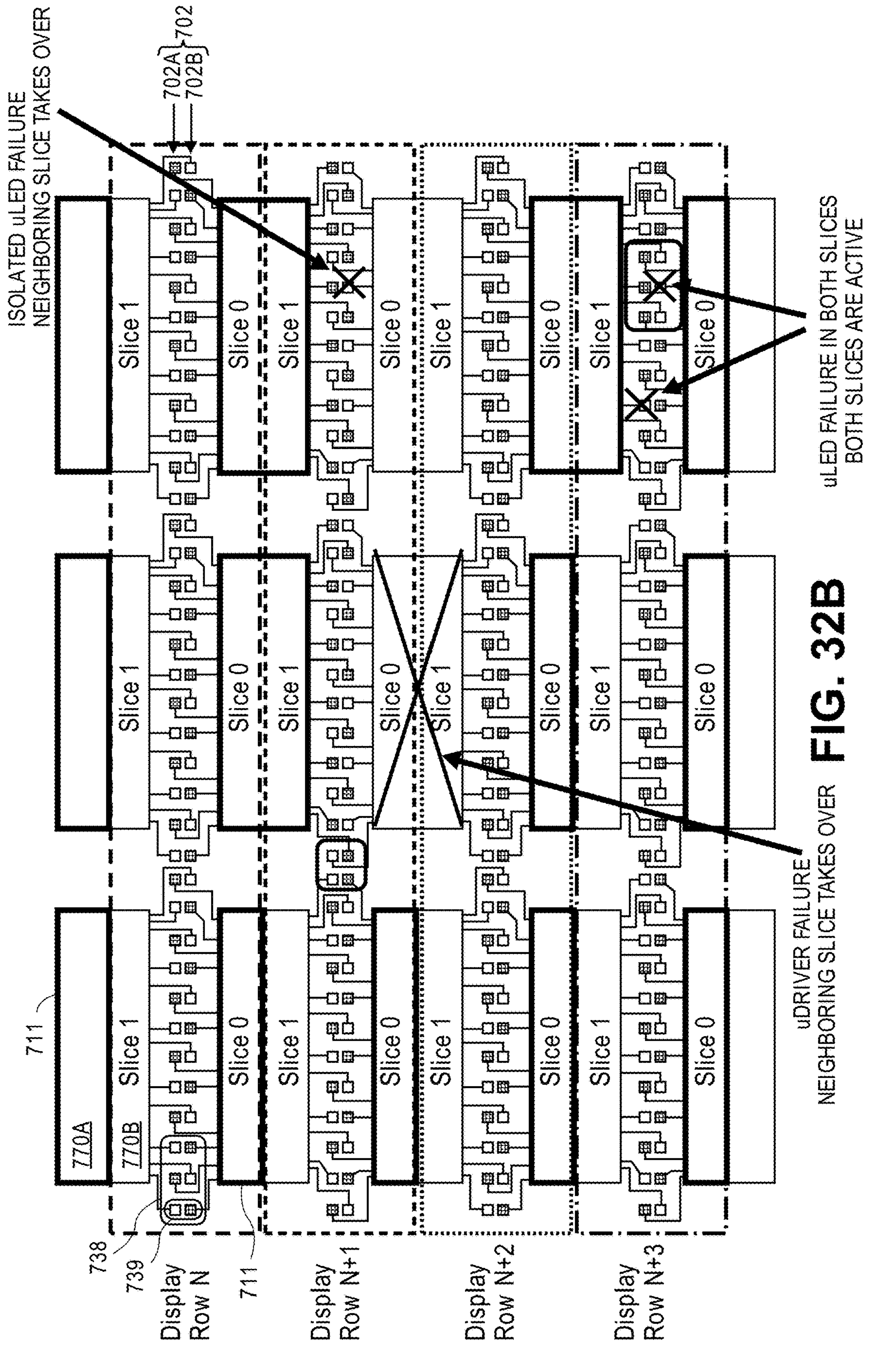
FIG. 32B is a diagram of a driving scheme for FIG. 31 with master and spare microdriver slices in accordance with an embodiment.

Referring now to FIG. 32B the redundancy scheme of FIG. 31 is illustrated in which the microdrivers are operated in a condition similar to that described with regard to FIG. 10, with rows of “master” and “spare” microdriver 711 slices 0, 1. In the embodiment illustrated in FIG. 32B, the default “master” microdriver 711 slices 770A (Slice 0) are illustrated in bold outline, and the default “spare” microdriver 711 slices 770B (Slice 1) are not bolded. As shown, the staggered LED connections above/below each microdriver are constant. In the default condition only the “master” slices 770A (Slices 0) operate the LEDs to which they are connected. Additionally, in the default condition every microdriver 711 may be operational. If a “master” slice 770A (Slice 0) is defective, the neighboring “spare” slice 770B (Slice 1) of the adjacent microdriver takes over. If there is an isolated LED failure, the neighboring slice of the adjacent microdriver will take over. If there are LED failures in both rows 702A, 702B between two adjacent microdrivers, both slices in both microdrivers are active. In interest of clarity, various associated point defects are outlined in bold line to demonstrate the creation of point defects rather than line defects in the event of failed microdrivers or LEDs. Depending upon resolution, these point defects may or may not be observable by a user.

Referring now to FIGS. 32A-32B together, in both embodiments, the y-axis pitch of the staggered LED connections above/below each microdriver 711 is constant across the display rows 702. One distinction can be observed with the two operating conditions in FIGS. 32A-32B is the y-axis pitch of the operating LEDs. In the embodiment illustrated in FIG. 32A, the y-axis pitch of the operating LEDs across the display rows 702 is constant in the default operating condition. In the embodiment illustrated in FIG. 32B, the y-axis pitch of the operating LEDs across the display rows 702 is variable in the default operating condition.

Figure 25:
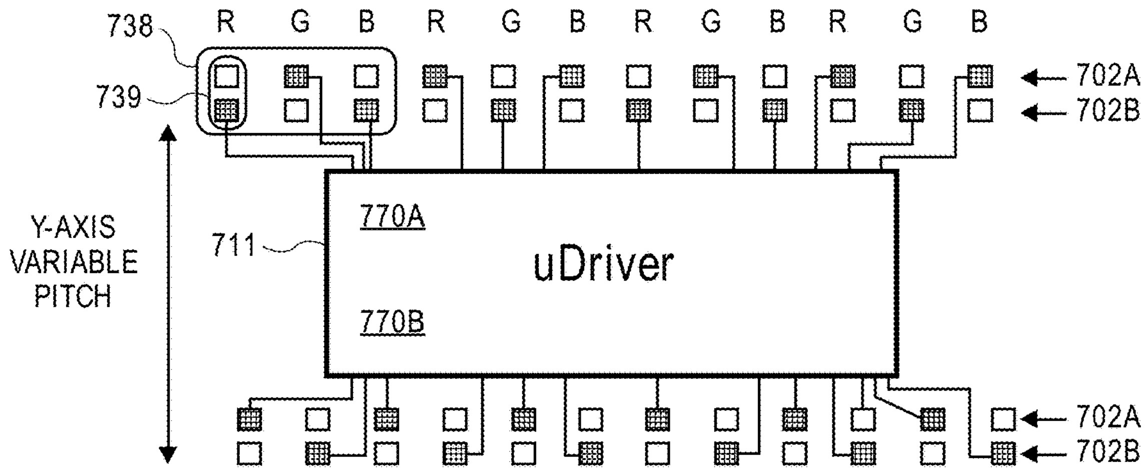
Figure 26:
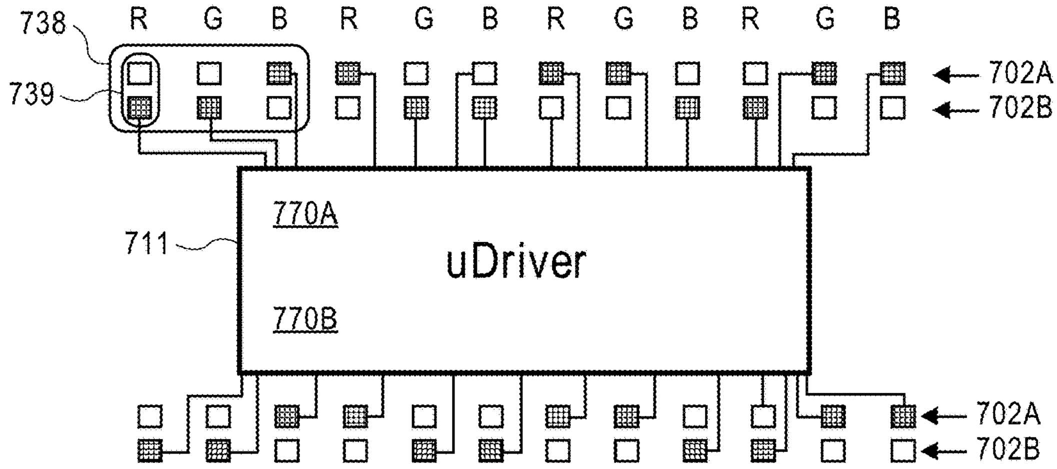
Figure 27:
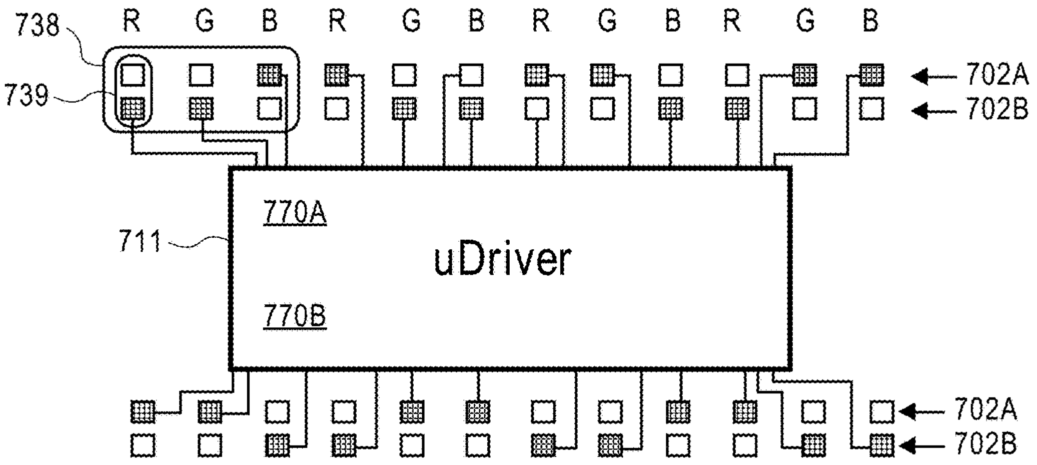
Figure 28:
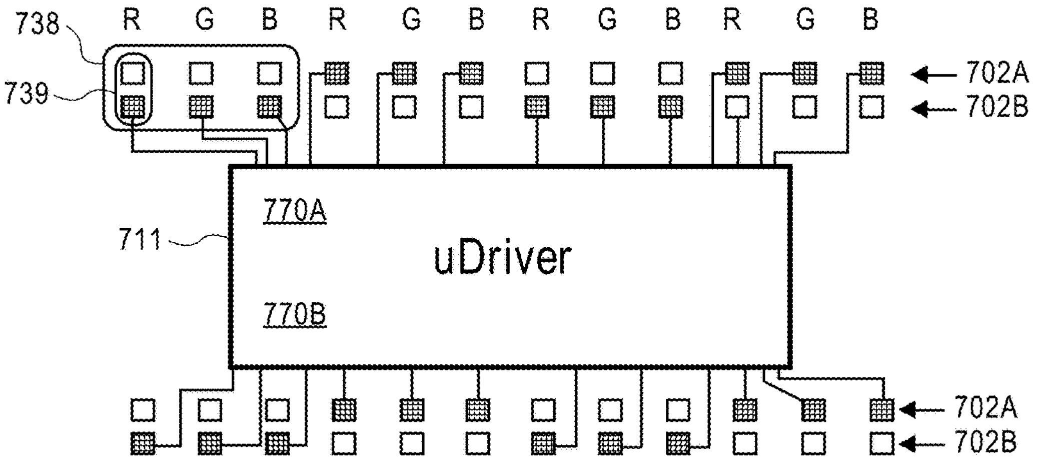
Figure 29:
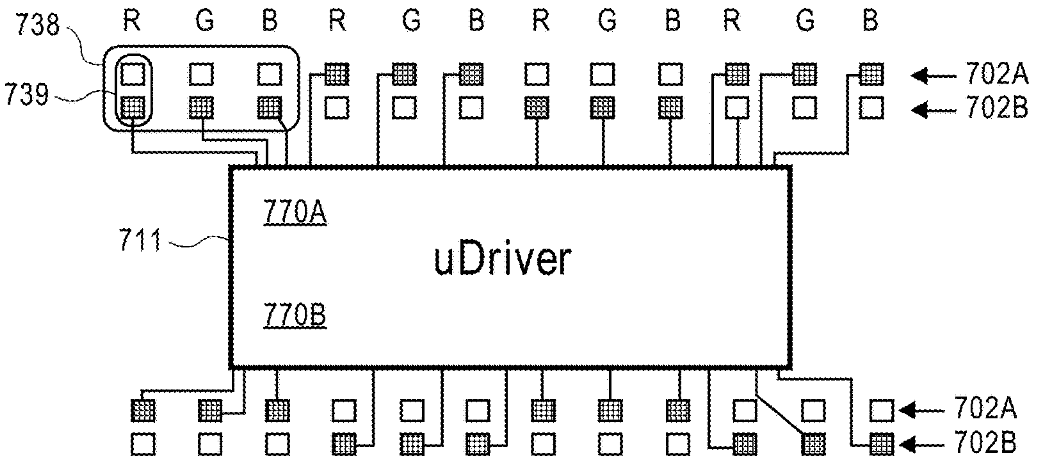
Figure 30:
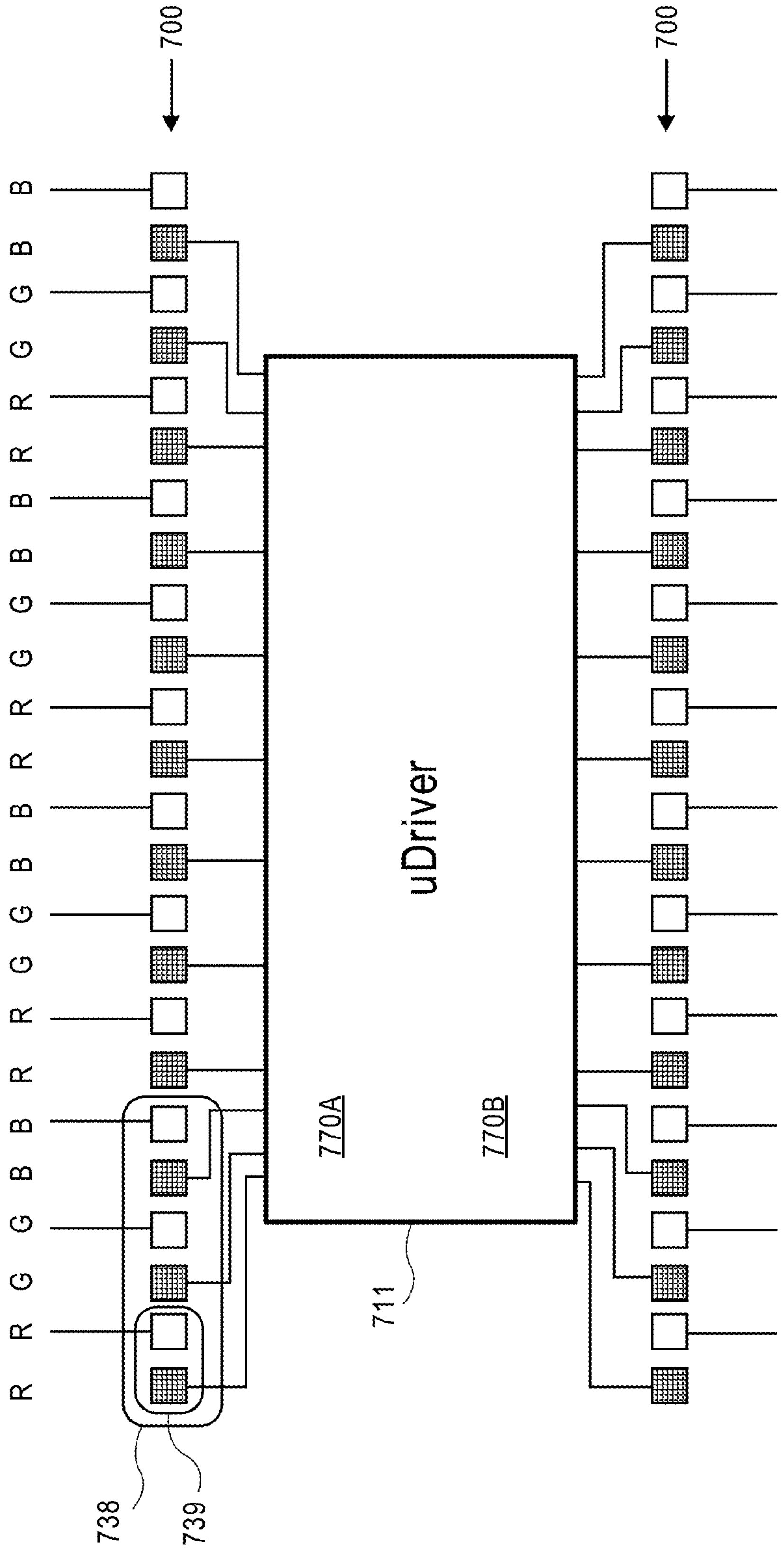
Figure 33:
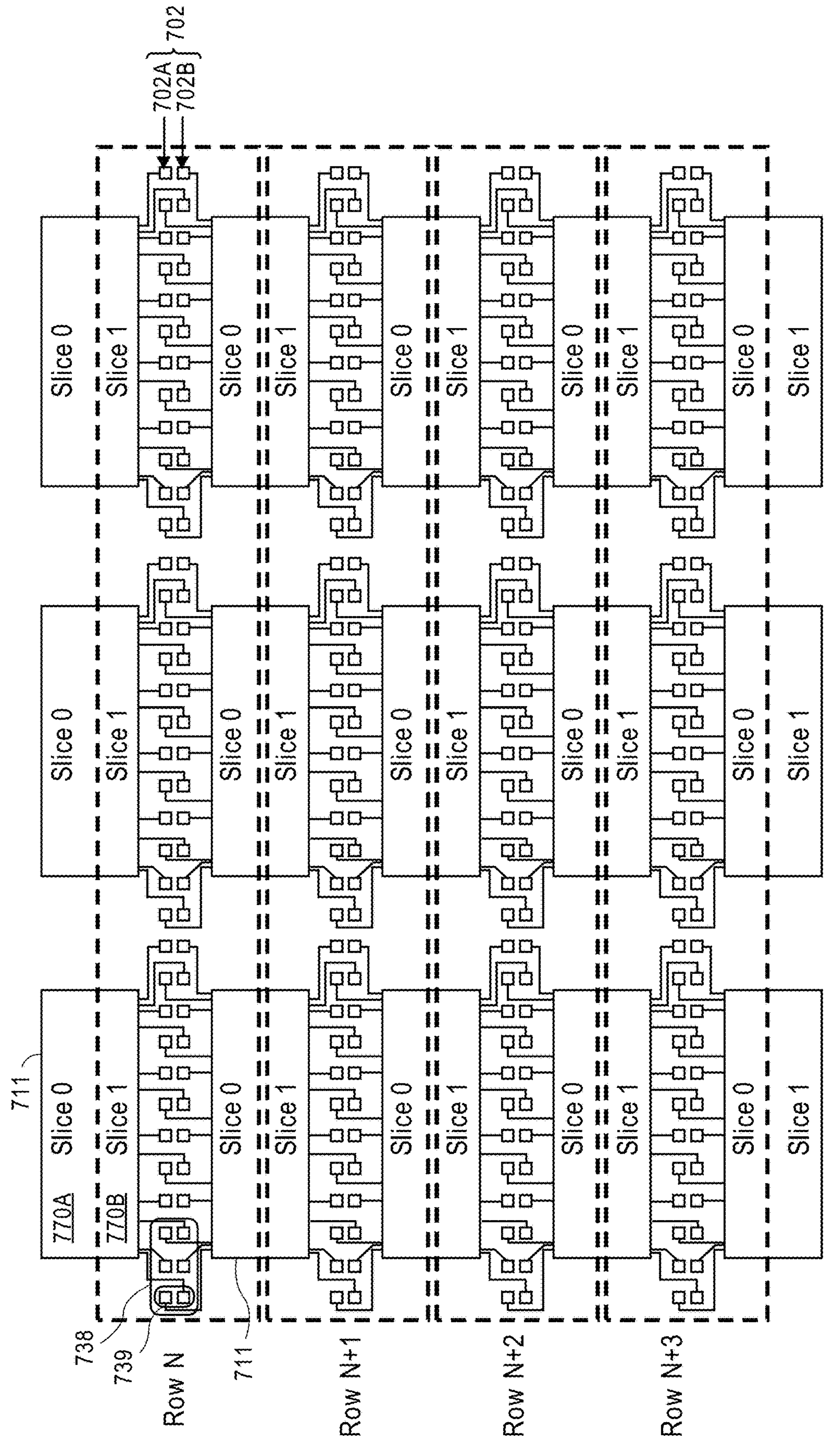
FIG. 33 is a diagram of a redundancy scheme including microdrivers with variable LED connection pitch in accordance with an embodiment.

Referring now to FIG. 33 a redundancy scheme is provided including an array of microdrivers, similar to the one illustrated in FIG. 25, with staggered connections between the top/bottom rows 702A/702B for every other subpixel 739, and the y-axis pitch of the staggered LED connections above/below each microdriver 711 is variable across the display rows 702 in accordance with an embodiment.

Figure 34A:
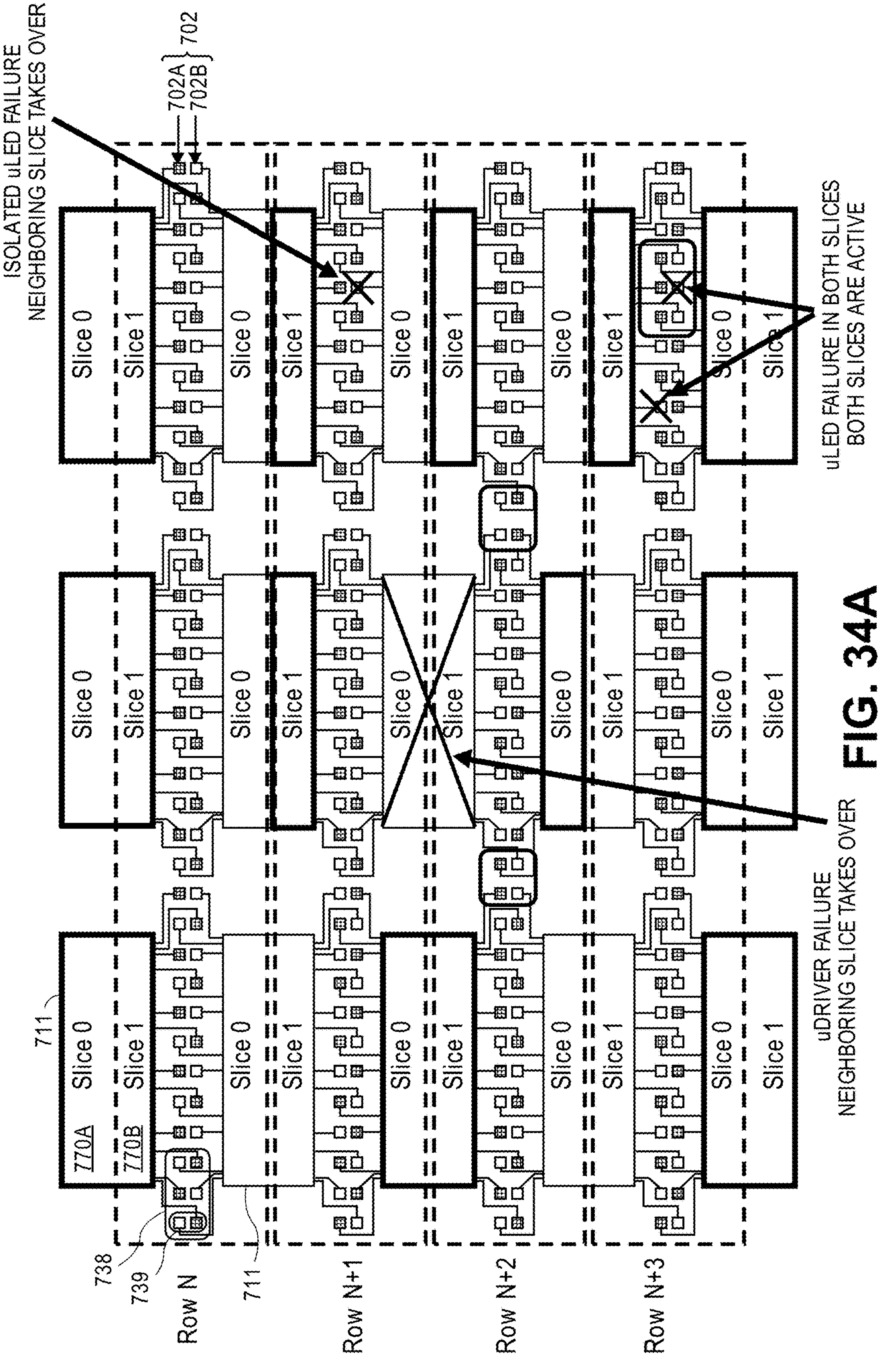
FIG. 34A is a diagram of a driving scheme for FIG. 33 with master and spare microdrivers in accordance with an embodiment.

Referring now to FIG. 34A the redundancy scheme of FIG. 33 is illustrated in which the microdrivers are operated in a condition similar to that described with regard to FIG. 10, with “master” and “spare” microdriver slices 770A, 770B. In the embodiment illustrated in FIG. 34A, the default “master” microdrivers 711 are illustrated in bold outline, every other microdriver (y-direction) in a column of microdrivers is the default “master” (or primary) driver of the LEDs, and the adjacent (y-direction) microdrivers in the column of microdrivers are the default “spare” drivers in the case of an adjacent “master” microdriver being defective. As shown, the staggered LED connections above/below each microdriver are variable. As illustrated, in the default condition both slices 0, 1 of a default “master” microdriver 711 operate the LEDs to which they are connected. If a microdriver 711 is defective, the neighboring slice of the adjacent microdrivers take over. If there is an isolated LED failure, the neighboring slice of the adjacent microdriver will take over. If there are LED failures in both rows 702A, 702B between two adjacent microdrivers, both slices in both microdrivers are active. In interest of clarity, various associated point defects are outlined in bold line to demonstrate the creation of point defects rather than line defects in the event of failed microdrivers or LEDs. Depending upon resolution, these point defects may or may not be observable by a user.

Figure 34B:
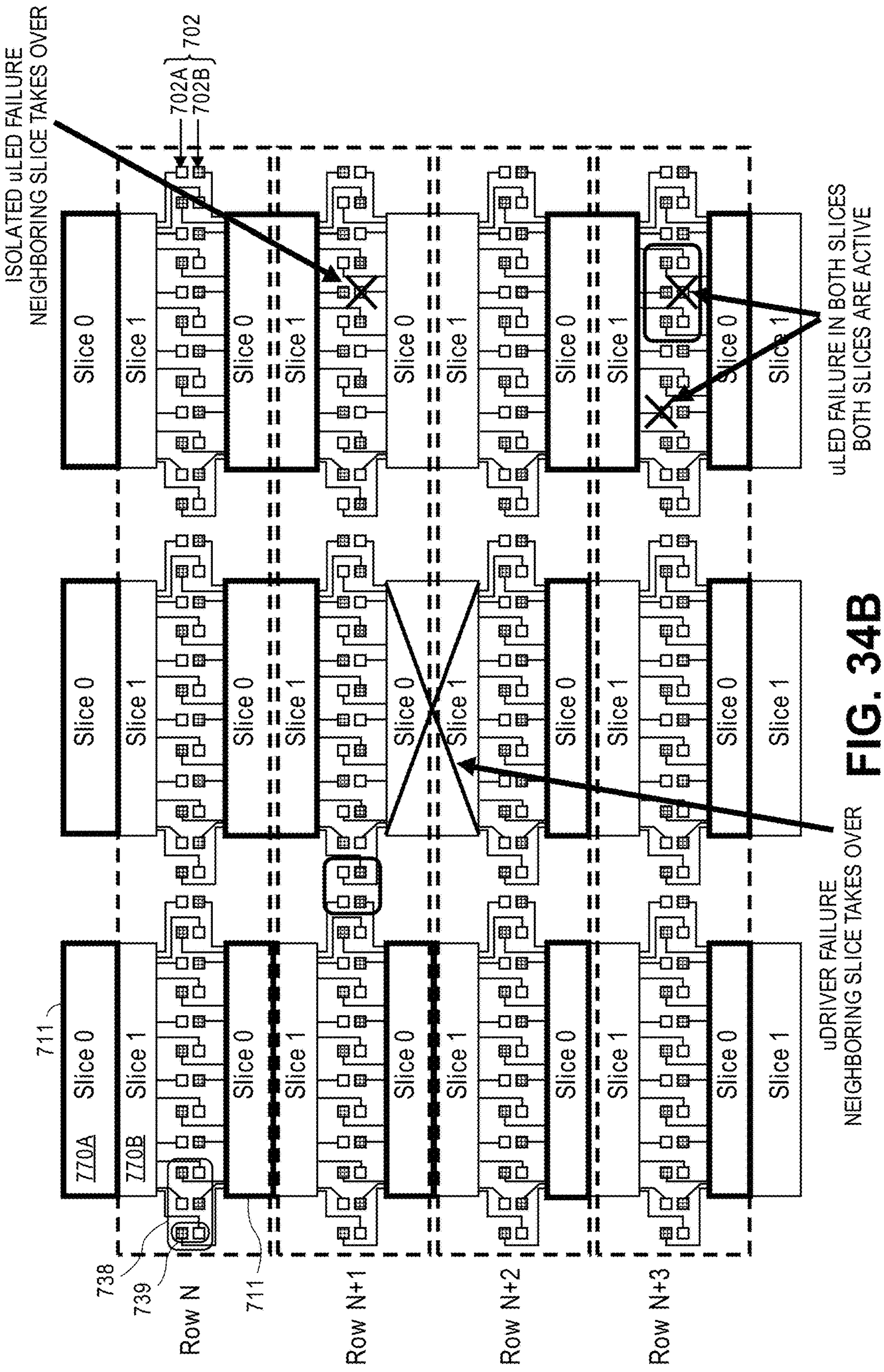
FIG. 34B is a diagram of a driving scheme for FIG. 33 with master and spare microdriver slices in accordance with an embodiment.

Referring now to FIG. 34B the redundancy scheme of FIG. 33 is illustrated in which the microdrivers are operated in a condition similar to that described with regard to FIG. 10, with rows of “master” and “spare” microdriver 711 slices 0, 1. In the embodiment illustrated in FIG. 34B, the default “master” microdriver 711 slices 770A (Slice 0) are illustrated in bold outline, and the default “spare” microdriver 711 slices 770B (Slice 1) are not bolded. As shown, the staggered LED connections above/below each microdriver are variable. In the default condition only the "master" slices 770A (Slices 0) operate the LEDs to which they are connected. Additionally, in the default condition every microdriver 711 may be operational. If a "master" slice 770A (Slice 0) is defective, the neighboring "spare" slice 770B (Slice 1) of the adjacent microdriver takes over. If there is an isolated LED failure, the neighboring slice of the adjacent microdriver will take over. If there are LED failures in both rows 702A, 702B between two adjacent microdrivers, both slices in both microdrivers are active. In interest of clarity, various associated point defects are outlined in bold line to demonstrate the creation of point defects rather than line defects in the event of failed microdrivers or LEDs. Depending upon resolution, these point defects may or may not be observable by a user.

Referring now to FIGS. 34A-34B together, in both embodiments, the y-axis pitch of the staggered LED connections above/below each microdriver 711 is variable across the display rows 702. One distinction can be observed with the two operating conditions in FIGS. 34A-34B is the y-axis pitch of the operating LEDs. In the embodiment illustrated in FIG. 34A, the y-axis pitch of the operating LEDs across the display rows 702 is variable in the default operating condition. In the embodiment illustrated in FIG. 34B, the y-axis pitch of the operating LEDs across the display rows 702 is constant in the default operating condition.

While the above embodiments may have been described and illustrated separately, for example related to redundancy, repair and operating methods, it is to be appreciated that many of the embodiments are combinable.

A display system in accordance with embodiments may include a receiver to receive display data from outside of the display system. The receiver may be configured to receive data wirelessly, by a wire connection, by an optical interconnect, or any other connection. The receiver may receive display data from a processor via an interface controller. In one embodiment, the processor may be a graphics processing unit (GPU), a general-purpose processor having a GPU located therein, and/or a general-purpose processor with graphics processing capabilities. The display data may be generated in real time by a processor executing one or more instructions in a software program, or retrieved from a system memory. A display system may have any refresh rate, e.g., 50 Hz, 60 Hz, 100 Hz, 120 Hz, 200 Hz, or 240 Hz.

Depending on its applications, a display system may include other components. These other components include, but are not limited to, memory, a touch-screen controller, and a battery. In various implementations, the display system may be a television, tablet, phone, laptop, computer monitor, automotive heads-up display, automotive navigation display, kiosk, digital camera, handheld game console, media display, ebook display, or large area signage display.

In utilizing the various aspects of the embodiments, it would become apparent to one skilled in the art that combinations or variations of the above embodiments are possible for forming a display panel and system with built-in redundancy. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A display panel comprising:

an array of driver chips arranged in rows and columns, each driver chip including digital logic coupled with analog circuitry that includes a plurality of switches and plurality of current sources;

wherein each driver chip is connected with a corresponding plurality of light emitting diodes (LEDs) forming a plurality of pixels;

wherein each pixel includes a plurality of subpixels, each subpixel including a primary LED connected to a corresponding driver chip and a spare LED connected to the corresponding driver chip; and wherein the primary LED and the spare LED are coupled to a common switch of the plurality of switches of the driver chip, the common switch is coupled to a common current source of the plurality of current sources that corresponds to the common switch, and the common switch is a transistor that causes the common current source to illuminate either the primary LED or the spare LED;

wherein the digital logic includes a counter, a plurality of comparators, and a register; wherein the common switch is coupled to a common comparator of the plurality of comparators.

2. The display panel of claim 1, wherein the primary LED is electrically connected with a first electrode line, and the spare LED is electrically connected with a spare electrode line.

3. The display panel of claim 2, wherein the first electrode line and the spare electrode line are connected with a weld.

4. The display panel of claim 2, further comprising a common cathode line formed on top of and in electrical connection with the primary LED and the spare LED.

5. The display panel of claim 4, wherein the common cathode line is connected to the plurality of pixels.

6. The display panel of claim 2, wherein each LED has a maximum lateral dimension of 1 to 20 μm.

7. The display panel of claim 2, wherein each LED is bonded to the display panel with a solder bump.

8. The display panel of claim 2, wherein the primary LEDs for each pixel are in a same row.

9. The display panel of claim 2, wherein the primary LEDs and the spare LEDs for each pixel are staggered.

10. The display panel of claim 1, wherein each pixel driver chip includes a reference voltage input.

11. The display panel of claim 1, wherein each pixel driver chip includes a plurality of reference voltage inputs for the plurality of subpixels.

12. The display panel of claim 2, wherein the transistor is a silicon metal-oxide-semiconductor-field-effect-transistor (MOSFET) transistor.

13. The display panel of claim 1, wherein the digital logic includes a digital storage element to store video data.

14. The display panel of claim 1, wherein the digital logic receives digital video data for output via the analog circuitry.

* * * * *